US010991398B2

(12) United States Patent
Krejci et al.

(10) Patent No.: US 10,991,398 B2
(45) Date of Patent: *Apr. 27, 2021

(54) AUTOMATED VIDEO BUMPER SYSTEM

(71) Applicant: Lumanary Inc., San Jose, CA (US)

(72) Inventors: Marc Krejci, San Jose, CA (US); Lucas Parry, San Jose, CA (US)

(73) Assignee: Lumanary Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/790,357

(22) Filed: Feb. 13, 2020

(65) Prior Publication Data

US 2020/0258547 A1 Aug. 13, 2020

Related U.S. Application Data

(63) Continuation of application No. 15/594,415, filed on May 12, 2017, now Pat. No. 10,622,022.

(60) Provisional application No. 62/335,551, filed on May 12, 2016.

(51) Int. Cl.

| G11B 27/036 | (2006.01) |
|---|---|
| H04N 21/2543 | (2011.01) |
| H04N 21/2743 | (2011.01) |
| H04N 21/84 | (2011.01) |
| H04N 21/854 | (2011.01) |
| H04N 21/234 | (2011.01) |
| H04N 21/472 | (2011.01) |
| G11B 27/30 | (2006.01) |

(52) U.S. Cl.
CPC ........ *G11B 27/036* (2013.01); *G11B 27/3027* (2013.01); *H04N 21/23424* (2013.01); *H04N 21/25435* (2013.01); *H04N 21/2743* (2013.01); *H04N 21/47202* (2013.01); *H04N 21/84* (2013.01); *H04N 21/854* (2013.01)

(58) Field of Classification Search
CPC .............. G11B 27/036; G11B 27/3027; H04N 21/23424; H04N 21/25435; H04N 21/2743; H04N 21/47202; H04N 21/84; H04N 21/54

See application file for complete search history.

(56) References Cited

U.S. PATENT DOCUMENTS

| 7,496,527 B2 | 2/2009 | Silverstein et al. |
|---|---|---|
| 10,622,022 B2 | 4/2020 | Krejci et al. |
| 2005/0060229 A1 | 3/2005 | Riedl et al. |
| 2007/0288478 A1 | 12/2007 | DiMaria et al. |
| 2008/0046929 A1 | 2/2008 | Cho et al. |

(Continued)

OTHER PUBLICATIONS

"U.S. Appl. No. 15/594,415, Non Final Office Action dated Jun. 26, 2019", 8 pgs.

(Continued)

*Primary Examiner* — Mishawn N. Hunter
(74) *Attorney, Agent, or Firm* — Schwegman Lundberg & Woessner, P.A.

(57) ABSTRACT

In some embodiments, a method to process video data may include receiving an upload file; using the publication identifier, identifying a bumper video segment and retrieving the bumper video segment from a storage device; concatenating a video payload with the bumper video segment to create a concatenated video; using the publication identifier, identifying at least one third-party video service to which to publish the concatenated video; and/or transmitting the concatenated video, together with publication credentials, to the third-party video service.

20 Claims, 36 Drawing Sheets

(56) References Cited

U.S. PATENT DOCUMENTS

| | | |
|---|---|---|
| 2012/0239469 A1 | 9/2012 | Steinberg et al. |
| 2013/0195429 A1 | 8/2013 | Fay et al. |
| 2013/0283301 A1 | 10/2013 | Avedissian et al. |
| 2013/0302018 A1 | 11/2013 | Jiang et al. |
| 2014/0012666 A1 | 1/2014 | Lohier et al. |
| 2014/0164507 A1 | 6/2014 | Tesch et al. |
| 2014/0313341 A1 | 10/2014 | Stribling |
| 2015/0243329 A1 | 8/2015 | Hadorn et al. |
| 2017/0330597 A1 | 11/2017 | Krejci et al. |

OTHER PUBLICATIONS

"U.S. Appl. No. 15/594,415, Notice of Allowance dated Jan. 23, 2020", 6 pgs.

"U.S. Appl. No. 15/594,415, Preliminary Amendment Filed Jun. 7, 2017", 4 pgs.

"U.S. Appl. No. 15/594,415, PTO Response to Rule 312 Communication dated Mar. 12, 2020", 2 pgs.

"U.S. Appl. No. 15/594,415, Response filed Sep. 26, 2019 to Non-Final Office Action dated Jun. 26, 2019", 7 pgs.

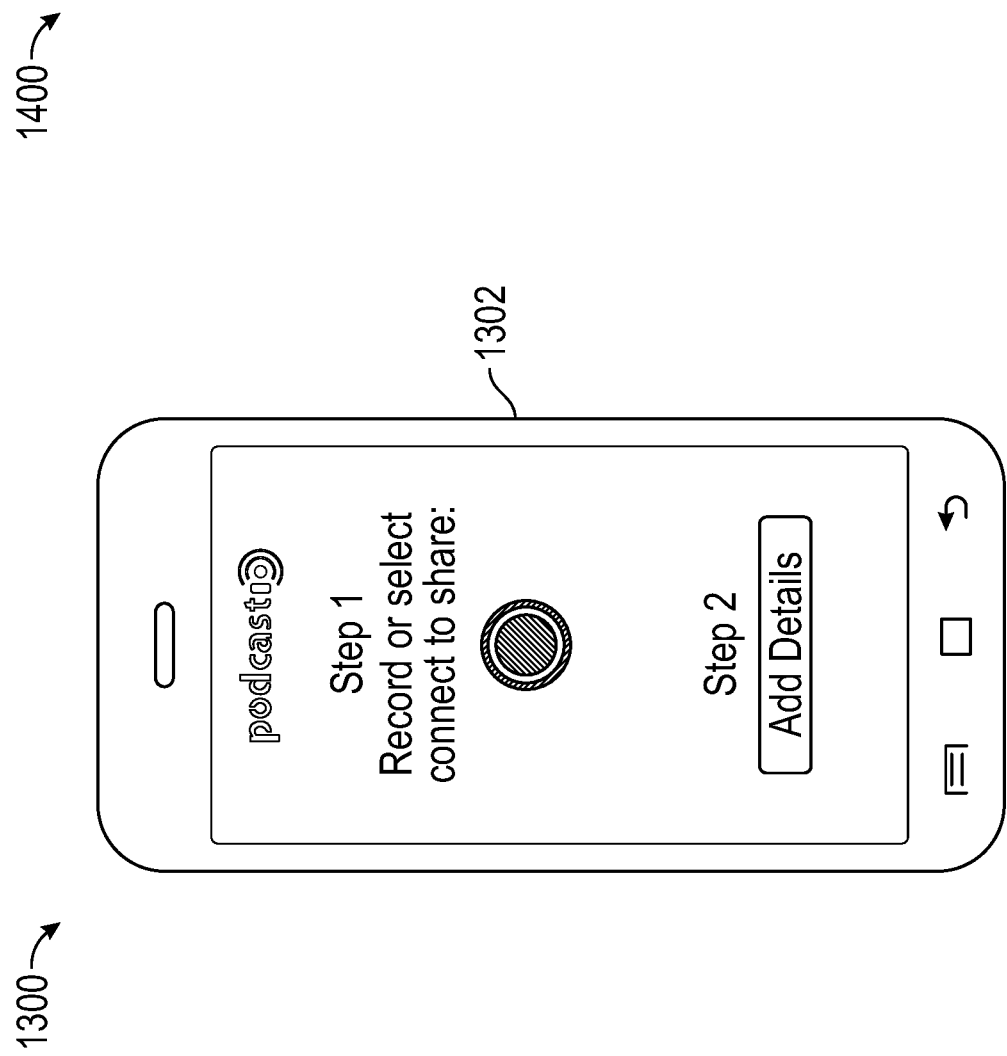

Users podcast(o)

& Account  $Billing  ⊖ Logout

- ⌂ Dashboard
- 🔊 Local area
- 🔊 Podcastio Demo ⌄
  - ✎ Settings
  - 🗎 Content
  - 👥 Users
  - 📡 Syndication
  - 📊 Analytics
- + Start New Show

Contributors

| | Larry Curtis ✕ |
| | Owner |

| | Marrian Herrera ✕ | | John Kelley ✕ | | Invite New User |
| | Admin ⌄ | | Moderator ⌄ | | |
| Auto approve Posts: ON | | Auto approve Posts: ON | | |

| | Jeffrey Foster ✕ | | Amy Patrick ✕ | | Donald Murray ✕ |
| | Publisher ⌄ | | Publisher ⌄ | | Publisher ⌄ |
| Auto approve Posts: OFF | | Auto ap... | Admin | Auto approve Posts: OFF |
| | | | Moderator | |
| | | | ✓ Publisher | |
| | | | Transfer Ownership | |

| | user@email.com ✕ |
| | Invited, Publisher |

Activity

| User | Approval ⇅ | Uploads ⇅ |
|---|---|---|
| Marian Herrera | 100% | 2h 48m |
| Larry Curtis | 93% | 7h 58m |
| Donald Murray | 85% | 12h 02m |
| John Kelley | 62% | 8h 12m |
| Amy Patrick | 50% | 2h 48m |
| Jeffrey Foster | 13% | 6m |

Impact

| User | | Impressions ⇅ |
|---|---|---|
| Marian Herrera | | 1,003,239 |
| Larry Curtis | | 987,234 |
| Donald Murray | | 234,409 |
| John Kelley | | 200,398 |
| Amy Patrick | | 49,238 |
| Jeffrey Foster | | 5 |

FIG. 25 podcastio

- Dashboard
- Movie Moments
- Podcastio Demo
  - Settings
  - Content
  - Users
- Syndication
  - Analytics

[+ Start New Show]

👤 Account   $ Billing   ⏻ Logout

Syndication

Linked Accounts

Connect additional Social accounts to automatically publish to:

- TouTube ✕
- V Connect Vikeo
- 👍 Connect Server
- A Connect AB Profile
- A Connect AB Page
- N Connect Numblr
- 🐦 Connect Nwitter

Feeds (must submit manually)

- 📶 RSS  🔘 Sounds  ▶ Play  ▭ Stitcher
- Video: http://feeds.podcast.io/podcastio-demo-v
- Audio: http://feeds.podcast.io/podcastio-demo-v

Posting Schedule

Auto Post Immediately: [OFF]

When this toggle is on, posts will go live immediately after server process the files uploaded by a user. bootstrap toggle switch from: http://www.bootstrap-switch.org/

Auto Post to Queue:

Lorem ipsum dolor sit amet, consectetur adipiscing elit. Nulla vitae elit libero, a pharetra augue, Aenean eu leo quam. Pellentesque or nare sem lacinia quam venenatis vestibulum.

Time Zone: [PST / Pacific ▾]

|     | Mon | Tue | Wed | Thu | Fri | Sat | Sun |
|-----|-----|-----|-----|-----|-----|-----|-----|
|     | ON  | ON  | ON  | ON  | ON  | ON  | ON  |
| ○ 8 : 10 AM | 8:10 AM | 8:10 AM | 8:10 AM | 8:10 AM | 8:10 AM | 8:10 AM | 8:10 AM |
| ○ 11 : 10 AM | 11:10 AM | 11:10 AM | 11:10 AM | 11:10 AM | 11:10 AM | 11:10 AM | 11:10 AM |
| ○ 3 : 46 PM | 3:46 PM | 3:46 PM | 3:46 PM | 3:46 PM | 3:46 PM | 3:46 PM | 3:46 PM |
| ○ 6 : 44 PM | 6:44 PM | 6:44 PM | 6:44 PM | 6:44 PM | 6:44 PM | 6:44 PM | 6:44 PM |

⊕ Add time slot

AUTOMATED VIDEO BUMPER SYSTEM

BACKGROUND

User Generated Content (UGC) is becoming an increasingly valuable form of content that entities and brands are using to engage their users. The management of such UGC by an entity or brand owner can present a number of technical challenges (e.g., relating to the processing and moderation of such content). One form of UGC is user-captured video content (e.g. captured on the mobile device of the user). Current solutions to process such a video content, both by the user and partners in distribution of the content, are time-consuming and somewhat impractical. The automation of these processes also presents technical challenges that are not fully addressed by current solutions.

One specific example of such technical challenges relates to video and audio production. A "bumper" is a video or audio segment may be used to introduce or terminate main content. In current video production solutions, the generation of these bumper video segments, and the generation of a final video that includes these bumper video segments is a very manual process that is time-consuming In today's fast-paced world that demands the near-real-time video production and publication, the insertion of bumper videos into a final production video can be a especially challenging, particularly for users with limited a video production facilities and experience. Additionally, video content producers are often "out in the field", and may not have access to video production capabilities. Consider the situation in which a video blogger wishes to create video content on the fly, while engaged in an activity (e.g., extreme sports). Currently, such a video blogger would need to capture video content, return to their video production computer, and perform final production there. In addition to introducing unacceptable delay in the publication of video, the time demands on the video blogger may be excessive.

SUMMARY

In some embodiments, a method to process video data may include receiving an upload file; using a publication identifier, identifying a bumper video segment and retrieving the bumper video segment from a storage device; concatenating a video payload with the bumper video segment to create a concatenated video; using the publication identifier, identifying at least one third-party video service to which to publish the concatenated video; and/or transmitting the concatenated video, together with publication credentials, to the third-party video service.

In some embodiments, the receiving of an upload file may include a video payload and metadata.

In some embodiments, the metadata may include a publication identifier identifying a publication entity.

In some embodiments, the method may include using the publication identifier, identifying an introduction bumper video segment and an ending bumper video segment, and retrieving both the introduction and ending bumper video segments from the storage device.

In some embodiments, the method may include concatenating the video payload with the introduction bumper video segment so that the introduction bumper video segment precedes the video payload in the concatenated video, and concatenating the video payload to with it the ending bumper video segment so that the ending bumper video segment proceeds the video payload in the concatenated video.

In some embodiments, the publication identifier is a user identifier, indicating an individual user associated with the video payload.

In some embodiments, the publication identifier is a corporate identifier, indicating a corporate entity associated with a mobile application used to capture the video payload.

In some embodiments, the method may include using the publication identifier, identifying a moderation control for a publication entity, and to selectively presenting the concatenated video to the publication entity for approval based on the moderation control.

In some embodiments, the method may include receiving an approval for publication of the concatenated video from the publication entity, and transmitting the concatenated video to the third-party video service responsive to the receipt of the approval.

In some embodiments, the method may include receiving a rejection of the concatenated video from the publication entity, and selectively not transmitting the concatenated video to the third-party service responsive to receipt of the receipt of the rejection.

BRIEF DESCRIPTION OF THE DRAWINGS

To easily identify the discussion of any particular element or act, the most significant digit or digits in a reference number refer to the figure number in which that element is first introduced.

FIG. 13 is a front view of a mobile device presenting a video capture interface of a hosted video capture application, according to some example embodiments.

FIG. 14 is a front view of a mobile device presenting a metadata input interface of a hosted video capture application, according to some example embodiments.

FIG. 21 is a user interface diagram illustrating a settings user interface, according to some example embodiments.

FIG. 22 is a user interface diagram showing a content user interface, according to some example embodiments.

FIG. 23 is a user interface diagram showing a user management interface, according to some example embodiments.

FIG. 24 is a user interface diagram showing a user invite interface, according to some example embodiments.

FIG. 25 is a user interface diagram showing a syndication user interface, according to some example embodiments.

FIG. 26 is a user interface diagram showing a syndication user interface, according to some example embodiments.

FIG. 27 is a user interface diagram showing an analytics user interface, according to some example embodiments.

DETAILED DESCRIPTION

Glossary

Figure 1:
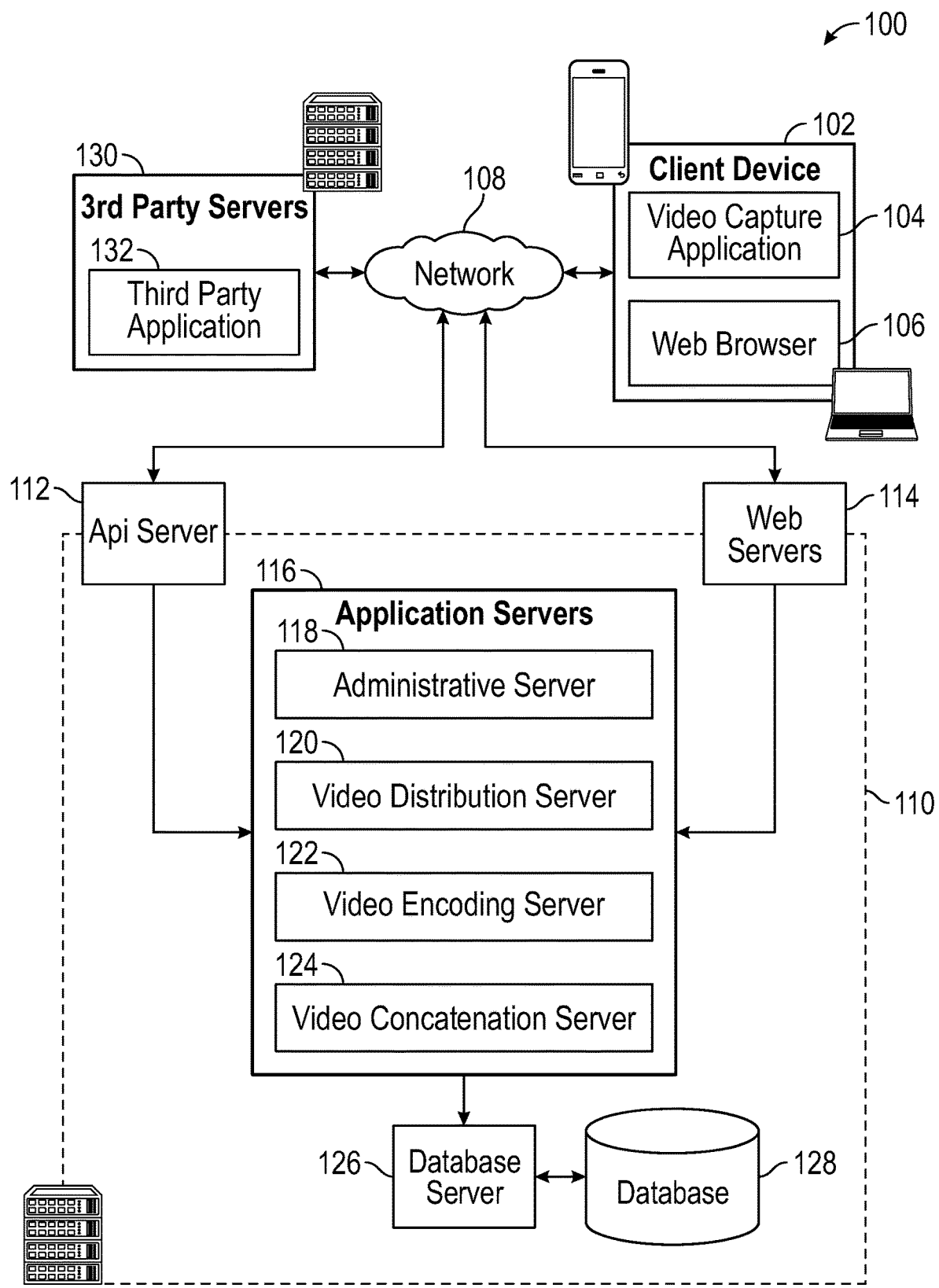
FIG. 1 is a block diagram illustrating a networked video concatenation system, according to some example embodiments.

"CARRIER SIGNAL" in this context refers to any intangible medium that is capable of storing, encoding, or carrying instructions for execution by the machine, and includes digital or analog communications signals or other intangible medium to facilitate communication of such instructions. Instructions may be transmitted or received over the network using a transmission medium via a network interface device and using any one of a number of well-known transfer protocols.

"CLIENT DEVICE" in this context refers to any machine that interfaces to a communications network to obtain resources from one or more server systems or other client devices. A client device may be, but is not limited to, a mobile phone, desktop computer, laptop, portable digital assistants (PDAs), smart phones, tablets, ultra books, netbooks, laptops, multi-processor systems, microprocessor-based or programmable consumer electronics, game consoles, set-top boxes, or any other communication device that a user may use to access a network.

"COMMUNICATIONS NETWORK" in this context refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other type of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

"COMPONENT" in this context refers to a device, physical entity or logic having boundaries defined by function or subroutine calls, branch points, application program interfaces (APIs), or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors) may be configured by software (e.g., an application or application portion)

as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a Field-Programmable Gate Array (FPGA) or an Application Specific Integrated Circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software) may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)). The performance of certain of the operations may be distributed among the processors, not only residing within a single machine, but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

"MACHINE-READABLE MEDIUM" in this context refers to a component, device or other tangible media able to store instructions and data temporarily or permanently and may include, but is not be limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions (e.g., code) for execution by a machine, such that the instructions, when executed by one or more processors of the machine, cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"PROCESSOR" in this context refers to any circuit or virtual circuit (a physical circuit emulated by logic executing on an actual processor) that manipulates data values according to control signals (e.g., "commands", "op codes", "machine code", etc.) and which produces corresponding output signals that are applied to operate a machine. A processor may, for example, be a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC) or any combination thereof. A processor may further be a multi-core processor having two or more independent processors (sometimes referred to as "cores") that may execute instructions contemporaneously.

DESCRIPTION

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document: Copyright 2017, LUMANARY INC., All Rights Reserved.

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

DRAWINGS

With reference to FIG. 1, an example embodiment of a high-level SaaS network architecture 100 is shown. A video processing system 110 provides server-side functionality via a network 108 (e.g., the Internet or wide area network (WAN)) to a client device 102. A programmatic client, in the example form of a video capture application 104 are hosted and execute on the client device 102. The video processing system 110 includes application servers 116, which in turn include an administrative server 118, a video distribution server 120, a video encoding server 122 and a video concatenation server 124, which collectively provide a number of functions and services to the video capture application 104 and the web browser 106 that accesses the video processing system 110. The video capture application 104 also provides a number of interfaces described herein, which present output of the tracking and analysis operations to a user of the client device 102.

The client device 102 enables a user to access and interact with the video processing system 110. For instance, the user provides input (e.g., touch screen input or alphanumeric input) to the client device 102, and the input is communicated to the video processing system 110 via the network 108. In this instance, the video processing system 110, in response to receiving the input from the user, communicates information back to the client device 102 via the network 108 to be presented to the user.

Application Program Interface (API) servers 112 and web servers 114 are coupled to, and provide programmatic and web interfaces respectively, to application servers 116. The application servers 116 are, in turn, shown to be coupled to a database server 126 that facilitates access to information storage repositories (e.g., a database 128). In an example embodiment, the database 128 includes storage devices that store information accessed and generated by the application servers 116.

Additionally, a third party application 132, executing on a third party server 130, is shown as having programmatic access to the video processing system 110 via the programmatic interface provided by the Application Program Interface (API) servers 112. For example, the third party application 132, using information retrieved from the video processing system 110, may support one or more features or functions on a website hosted by the third party.

Turning now specifically to the applications hosted by the client device 102, the web browser 106 may access the various systems (e.g., the administrative server 118, the video distribution server 120 the video encoding server 122 or the video concatenation server 124) via the web interface supported by the web servers 114. Similarly, the video capture application 104 (e.g., an "app") accesses the various services and functions provided by the application servers application servers 116 via the programmatic interface provided by the Application Program Interface (API) servers 112. The video capture application 104 may, for example, be an "app" executing on a client device 102. The video capture application 104 may, for example, be an iOS or Android OS application and enables user to access and input data on the video processing system 110 in an off-line manner, and performs batch-mode communications with the networked system video processing system 110.

Further, while the SaaS network architecture 100 shown in FIG. 1 employs a client-server architecture, the present inventive subject matter is of course not limited to such an architecture, and could equally well find application in a distributed, or peer-to-peer, architecture system, for example. The components of the application servers 116 could also be implemented as a standalone software program, which do not necessarily have networking capabilities.

Figure 2:
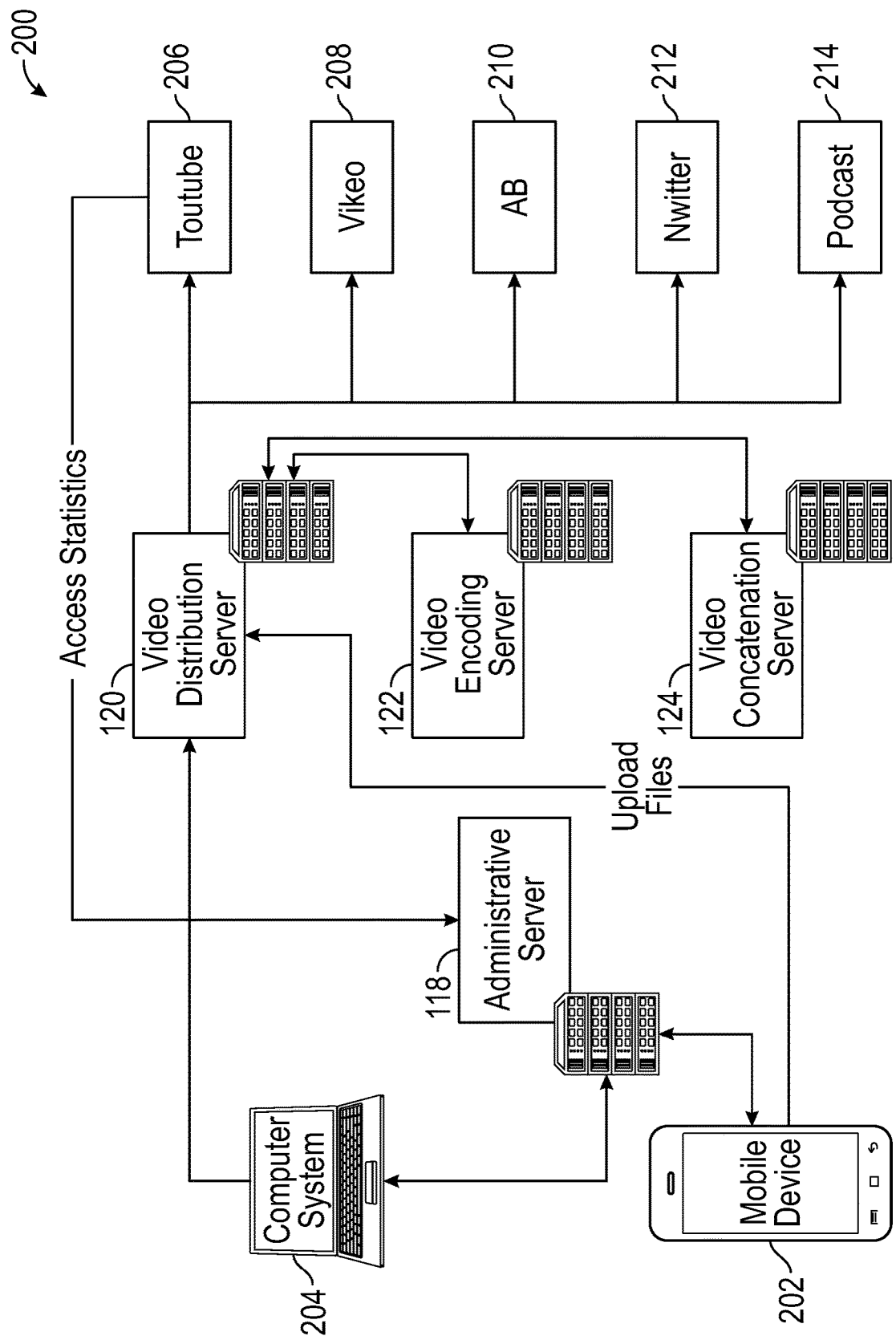
FIG. 2 is a schematic diagram, illustrating further connections, interactions and communications between the various systems and components illustrated in FIG. 1.

FIG. 2 is a schematic diagram, illustrating further connections, interactions and communications between the various systems and components illustrated in FIG. 1.

A client device 102, in the example form of a mobile device 202, is shown to be communicatively coupled to the video distribution server 120, so as to enable of the upload of content files (e.g., UGC in the form pf video files captured by the mobile device 202 using the video capture application 104) to the video distribution server 120. The mobile device 202 is also coupled to the administrative server 118, so as to enable a user of the mobile device 202 to perform various administrative functions with respect to a user account maintained by the administrative server 118. Such illustrative functions may be performed either using a dedicated administrative interface of the video capture application 104, or a web-based administrative interface provided by the administrative server 118 and accessed by the web browser 106.

A further client device 102, in the example form of a computer system 204, is also shown to be communicatively coupled to both the video distribution server 120 and to the administrative server 118. As with the mobile device 202, the computer system 204 uploads content files (e.g., bumper videos, such as intro and outro videos or video captured using a camera device of the computer system 204) to the video distribution server 120 processing and further distribution. The computer system 204, via a browser application, is also able to access various administrative functions via the web-based administrative interface provided by the administrative server 118.

The video distribution server 120 operates to receive and distribute content (e.g., bumper videos and captured video) to the video encoding server 122, the video concatenation server 124, and various third-party party servers 130 of content distribution networks, such as YouTube 206, Vimeo 208, Facebook 210, Twitter 212 and podcast distribution service 214.

The video encoding server 122 operates to encode the video content received from the video distribution server 120, while the video concatenation server 124 operatively concatenates video content received from the video distribution server 120 and/or the video encoding server 122. Specifically, the video concatenation server 124 may concatenate specific bumper videos with specific captured video to generate concatenated videos.

Figure 3:
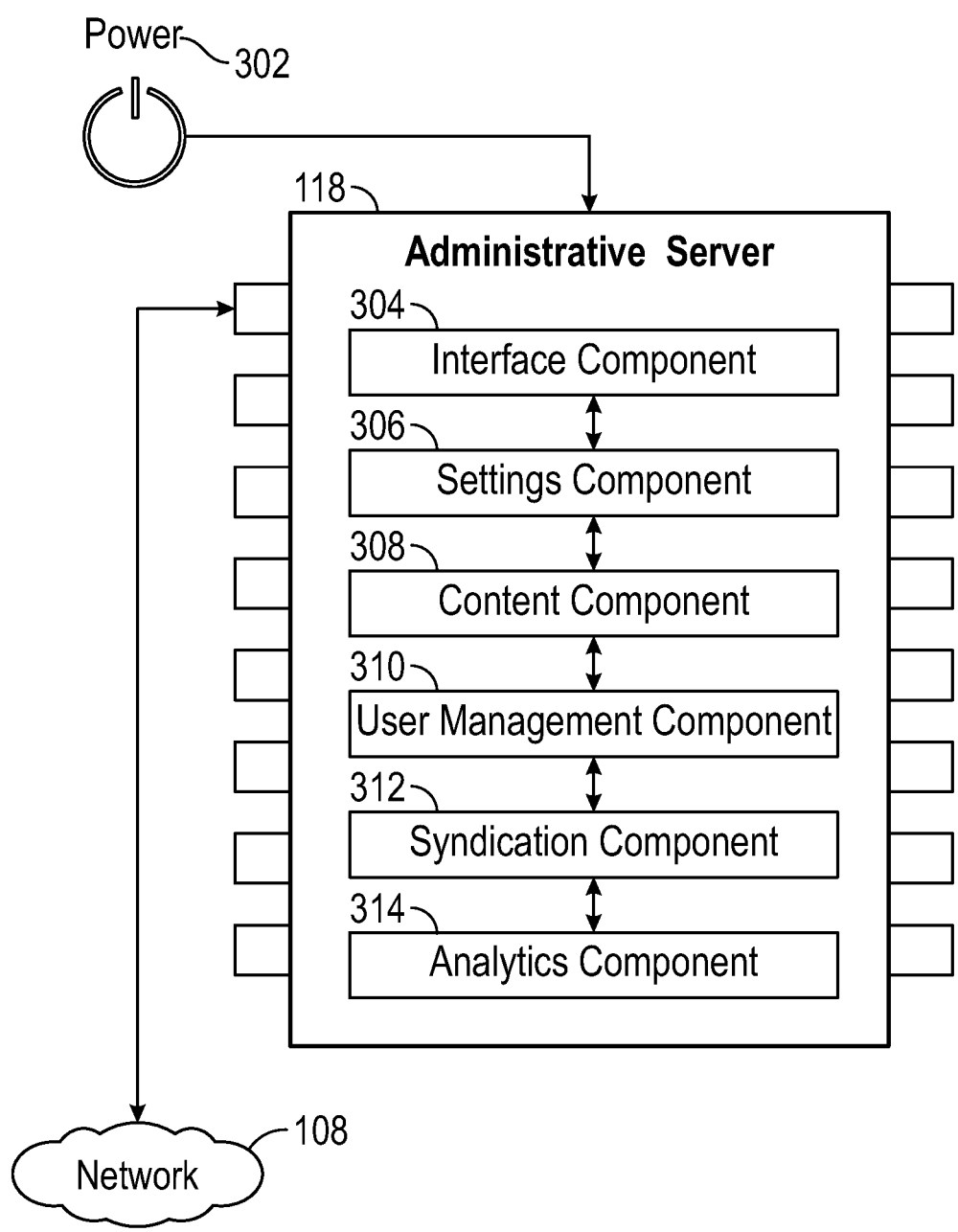
FIG. 3 is a block diagram showing architectural details of a video distribution server, according to some example embodiments.

FIG. 3 is a block diagram showing further architectural details of an administrative server 118, according to some example embodiments.

The administrative server 118 is shown to include an interface component 304 by which the administrative server 118 communicates (e.g., over the network 108) with other servers of the application servers 116 and other systems within the SaaS network architecture 100.

Figure 21:
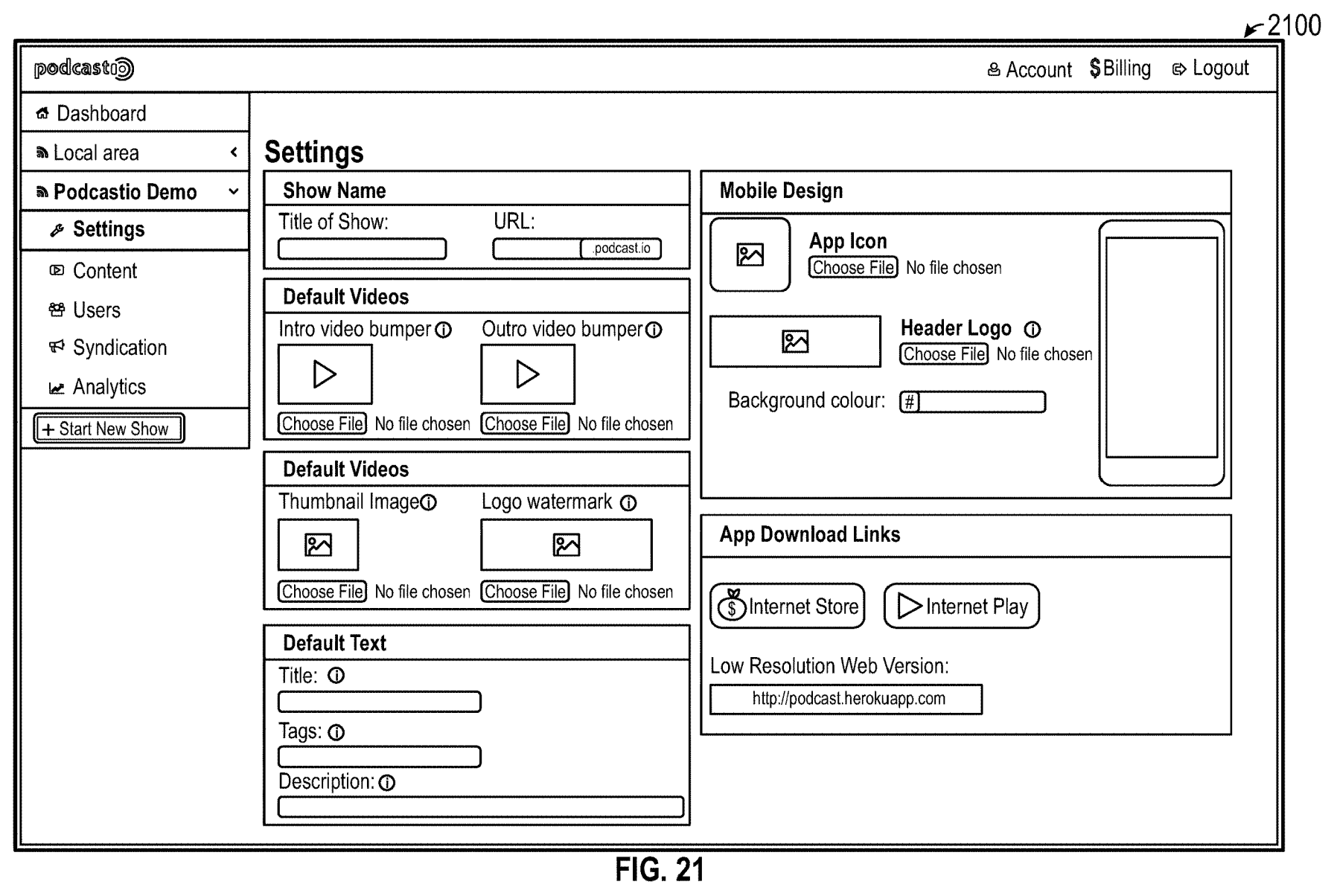

The interface component 304 is collectively coupled to a settings component 306 that operates to generate a settings user interface 1900, shown in FIG. 21, to receive various settings information from a user for a video "show" or channel for a particular user or entity (e.g., corporation).

Figure 5:
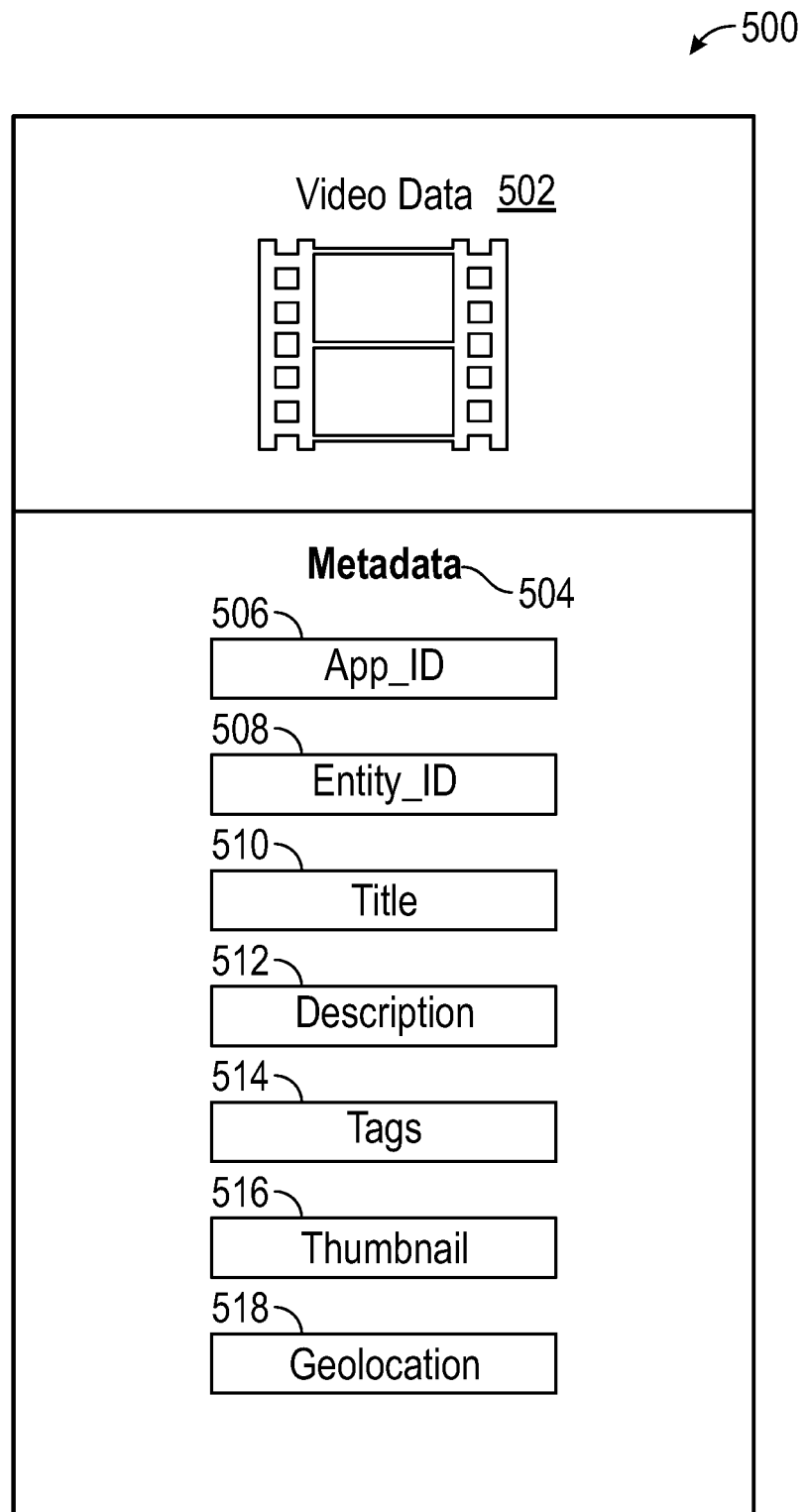
FIG. 5 is diagrammatic representation of an upload file, according to some example embodiments, that is uploaded from a mobile device to application servers for processing and concatenation.
Figure 22:
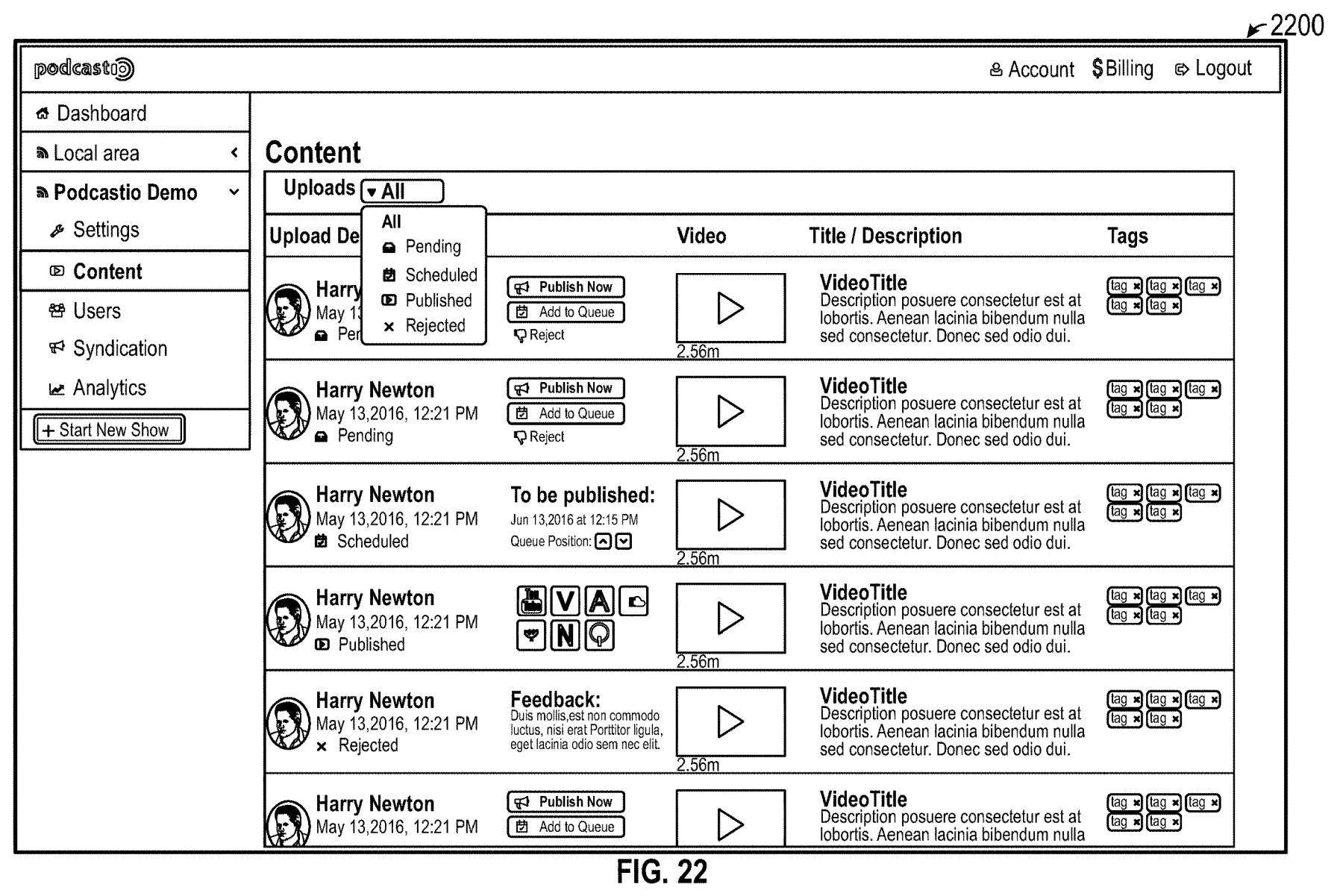

A content component 308 operates to generate a content user interface 2200, as shown in FIG. 22, to receive content uploads (e.g., upload files, such as the upload file 500 is shown in FIG. 5), and to manage the moderation, queuing and publication of content (e.g., concatenated videos).

A user management component 310 operates to generate a user management interface 2300, as shown in FIG. 23, to facilitate the management of the users for a particular video show or campaign, including the invitation of new users (e.g., as shown by user invitation interface 2400 shown in FIG. 24), and the assignment of administrative roles. The user management component 310 also presents information regarding user activity (e.g., approval rates and upload amount (e.g., expressed in content playback minutes) and user impact (e.g., expressed in number of impressions generated by content attributed to each of a number of users)).

Figure 25:
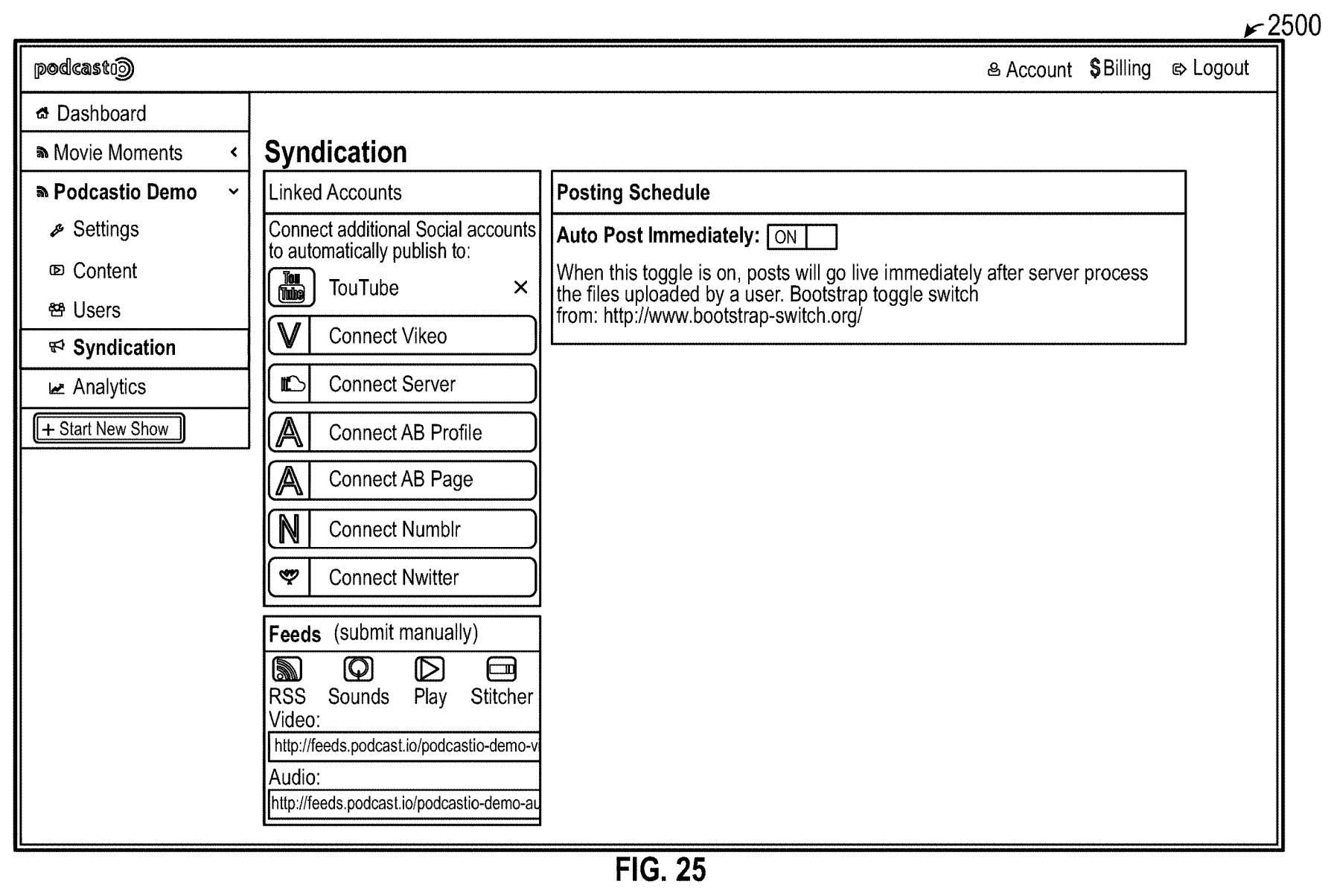

A syndication component 312 operates to generate a syndication user interface 2500, as shown in FIG. 25, which conveniently allows an administrative user to manage the syndication of content for a particular video show. To this end, the syndication user interface 2500 may display a number of linked accounts (e.g., to various video syndication or hosting services) and linked feeds (e.g., to video distribution services). The syndication component 312 may also prompt a user for posting schedule information, for example allowing an administrative user to designate certain content to be posted and go live immediately after a server processes files uploaded by a particular user. The syndication component 312 may also enable a user to automatically allocate video content to various queues (or buffers) for publication on specific dates and times (see FIG. 26).

Figure 27:
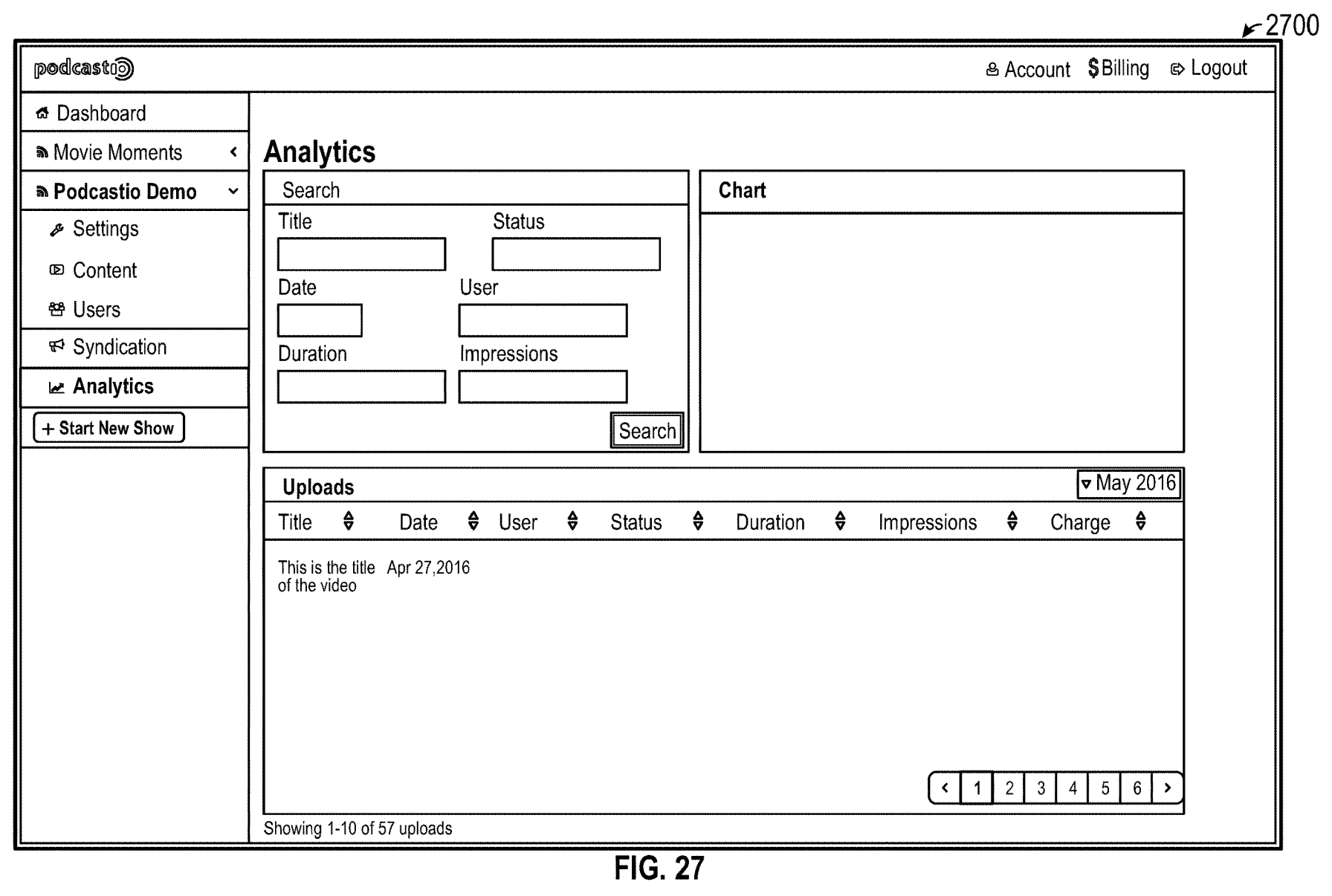

An analytics component 314 operates to generate an analytics interface 2500, as shown in FIG. 27, which presents analytics (e.g., status, duration, impressions, charge) regarding multiple content uploads, and enables the user to perform searches on content based on any one of a number of attributes (e.g., title, status, date, user, duration and/or impressions).

Figure 4:
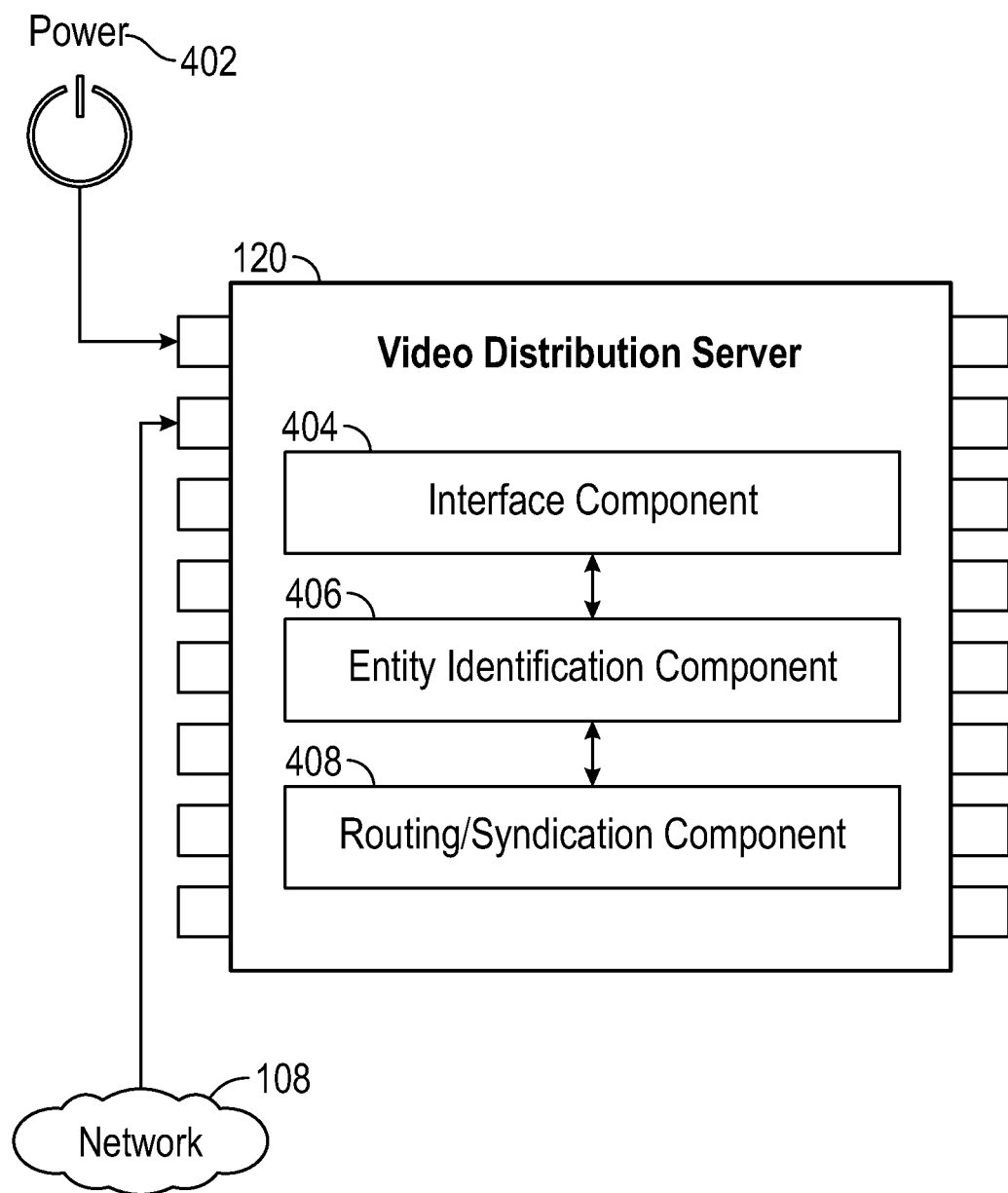
FIG. 4 is a block diagram showing for the architectural details of a video distribution server 120, according to some example embodiments.

FIG. 4 is a block diagram showing for the architectural details of a video distribution server 120, according to some example embodiments.

The video distribution server 120 is shown to include an interface component 404 by which the video distribution server 120 communicates (e.g., over the network 108) with other e application servers 116 and other systems within the SaaS network architecture 100.

The interface component 404 is communicatively coupled to an entity identification component 406 that operates to identify an entity (e.g., user or corporate entity) associated with particular content (e.g., a bumper video or uploaded video content). To this end, the entity identification component 406 examines the headers of packets of network traffic received at the video distribution server 120 from the client device 102 in order to identify either the video capture application 104 (e.g., as being branded or associated with particular entity) or a user of the client device 102. This identification information may then be included in metadata associated with the content.

A routing/syndication component 408 is likewise communicatively coupled to both the interface component 404 and the entity identification component 406, and operates to route received content to a destination. In one example, the routing/syndication component 408 may route a bumper video or a captured video to a user-specified video concatenation server 124, for example, for concatenation services and processing.

The routing/syndication component 408 may also distribute concatenated content, received from a video concatenation server 124 to a third party server 130 (e.g., Vimeo, YouTube et cetera).

FIG. 5 is diagrammatic representation of an upload file 500, according to some example embodiments that is uploaded from a mobile device to application servers 116 for processing and concatenation.

The upload file 500 includes a payload in the form of video data 502, as well as associated metadata 504. The video data 502 may be a video captured by the video capture application 104 operating on the mobile device 202. In other embodiments, the payload may be image data or audio data, or a collection of audio, video and image data.

The metadata 504 includes:

An application identifier 506, identifying an application (e.g. the video capture application) used to generate the video data 502. In one example embodiment, the video capture application may be a specifically branded application, or may be associated with a specific entity (e.g., a particular company or organization) so that content captured using the application is automatically associated with a particular video show or campaign managed by a video distribution server 120. For example, a consumer company such as Coca-Cola may distribute a particular version of a video capture application that is branded as a COKE application. In this case, the application identifier 506 may be used to identify the application used to capture the video data 502 as being at the COKE application.

An entity identifier 508, identifying a particular user of a mobile device that was used to generate the video data 502. The entity identifier 508 may anonymously identify a particular user, or may be associated with a user for which a record is managed by the user management component 310.

A title 510 is typically a textual title provided by a user for the video represented by the video data 502.

A description 512 is a textual description provided by the user for the video represented by the video data 502.

Tags 514 are textual (or other) tag attributed to the video data 502 by a user.

Thumbnail image 516 is a thumbnail image selected by the user to represent to the video data 502, and to be presented as an identifier.

Geolocation data 518 is geolocation data captured by a mobile device at time of the generation of the video data 502, and associated with the video data 502.

Figure 6A:
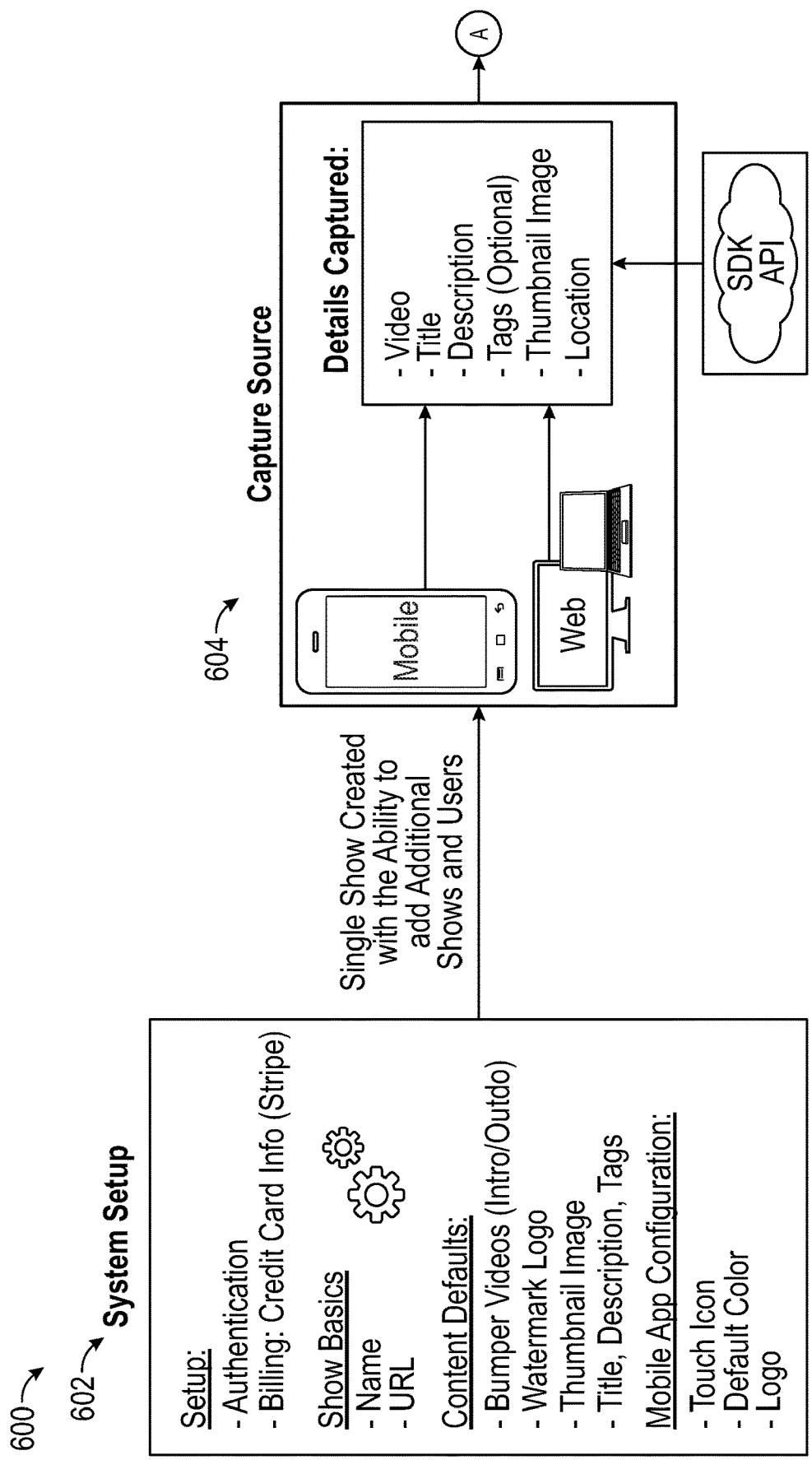
FIGS. 6A-6C are a flow diagrams illustrating a number of core operations that may be performed within the context of the SaaS network architecture, according to some example embodiments.
Figure 6B:
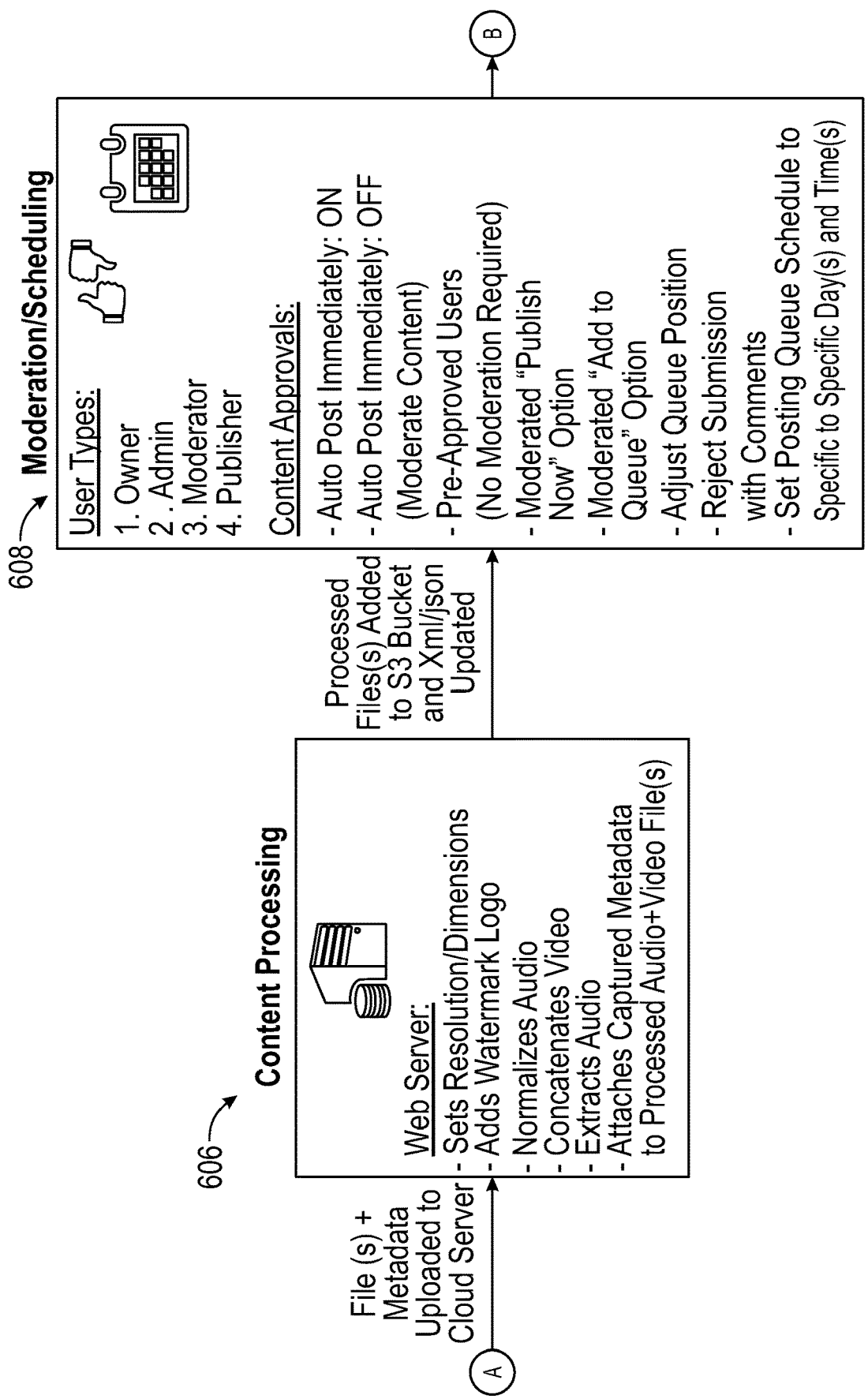
Figure 6C:
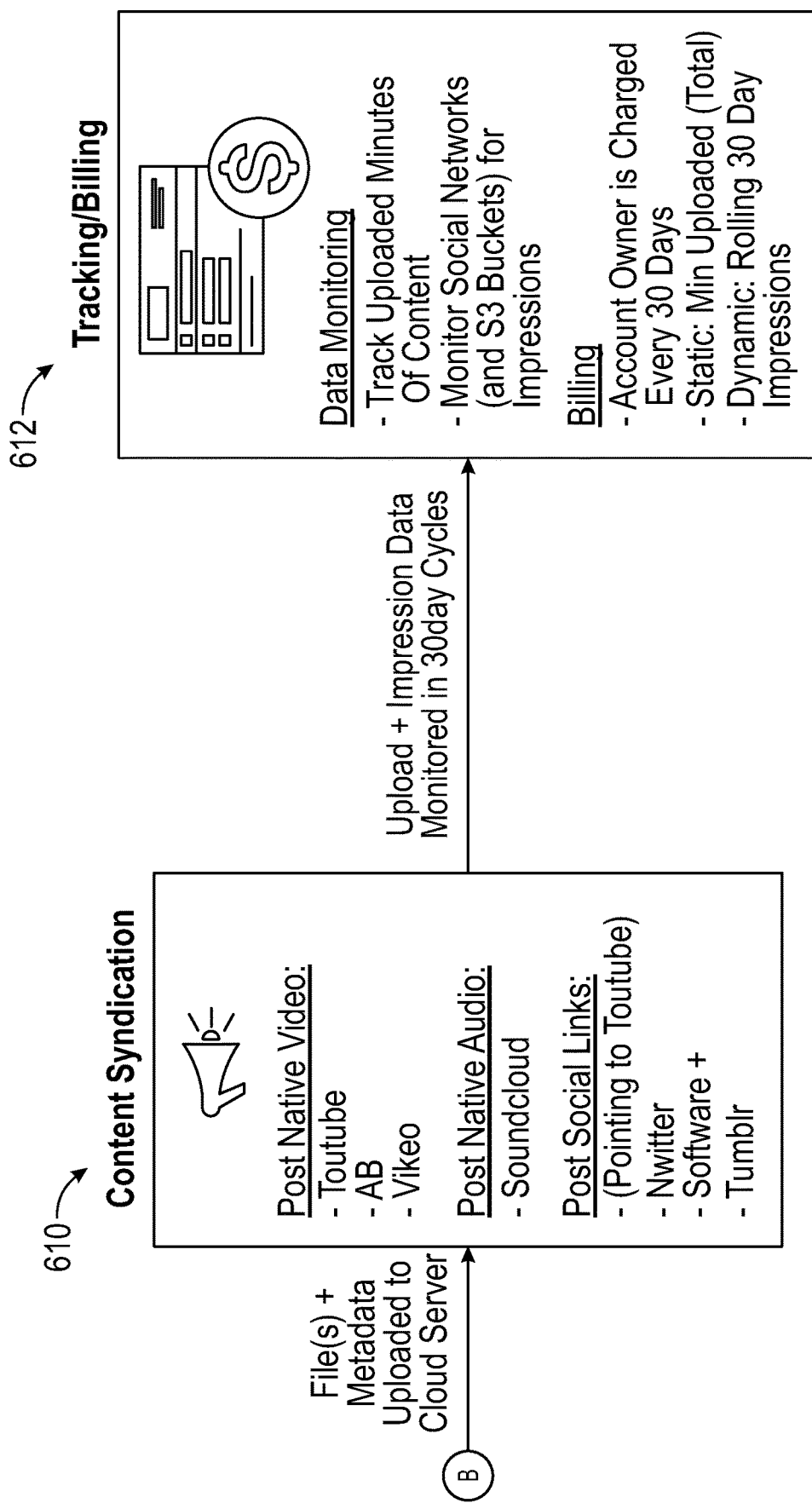

FIGS. 6A-6C are flow diagrams illustrating a number of core operations that may be performed within the context of the SaaS network architecture 100, according to some example embodiments.

The core operations include system setup operations 602, performed by the administrative server 118. The setup operations include the setup of certain authentication and billing information, the setup of certain video naming basics as well as default URLs for video access, the establishment of certain content defaults (e.g., bumper videos, watermarked logos, thumbnail images, title, description, tags etc.), and mobile application configuration (e.g., icons, default colors and logos).

Capture source operations 604 include all operations needed to create a single show or campaign, with the ability to add additional shows, campaigns and uses. Specifically, capture source operations 604 include the capture of video content, a video title, video description, optional tags, a thumbnail image to be associated with the video, and a video capture location.

Following performance of the capture source operations 604, the relevant data and metadata are uploaded to a cloud server (e.g., hosting the application servers), where content processing operations 606 are performed. In one example embodiment, these content processing operations 606 are performed by the video encoding server 122. Example content processing operations 606 include setting up video resolution and dimensions, adding watermark logos to the video content, normalizing audio data associated with the video content, concatenating the captured video with bumper videos, audio data extraction, and attaching metadata to the processed audio and/or video files. The processed video and/or audio files are then added to S3 buckets, and the appropriate XML/JSON data is updated.

Moderation/scheduling operations 608 are performed by a user, using a web interface or the video capture application. The moderation/scheduling operations 608 are role-based. To this end, the administrative server 118 supports various role types and definitions, including the following user types: owner, administrator, moderator, and publisher, each with appropriate access, editing and publication permissions.

The moderation/scheduling operations 608 also include a number of content approval operations, namely:
auto-post immediately: on/off
preapproved user posting (no moderation required)
moderated "publish now" option
moderated "add to queue" option
adjust queue position
reject submission with comments
set posting queues schedule to specific date/time.

Data generated by the moderation/scheduling operations 608 is also uploaded to the administrative server 118 (e.g., which may be implemented as a cloud server).

Content syndication operations 610 include posting native video to any one of a number of services or content distribution platforms (e.g., YouTube, Facebook or Vimeo); posting native audio to any one of a number of services (e.g., SoundCloud); and/or posting social links to either audio or video content to any one of a number of social publication services (e.g., Twitter, Google+ or Tumblr).

Upload and impression data may be communicated from the content syndication operations 610 to the administrative server 118 to enable this server to perform tracking/billing operations 612. Specifically, the tracking/billing operations 612 include data monitoring operations to track uploaded minutes of content (e.g., uploaded minutes of content captured and generated at the capture source operations 604). as well as the monitoring of social networks (and S3 buckets) in order to collect data indicative of a number/rate of impressions for audio and video content from any one of the number of syndication services. For example, data monitoring may be used to track the number of impressions for a particular video uploaded to YouTube. The tracking/billing operations 612 also include billing operations whereby an account user is charged at predetermined intervals (e.g. 30 days), based on a static value (e.g., a minimum uploaded amount of content, measured in minutes), and a dynamic value (e.g., a rolling 30 day impression count for total uploaded content).

Figure 7:
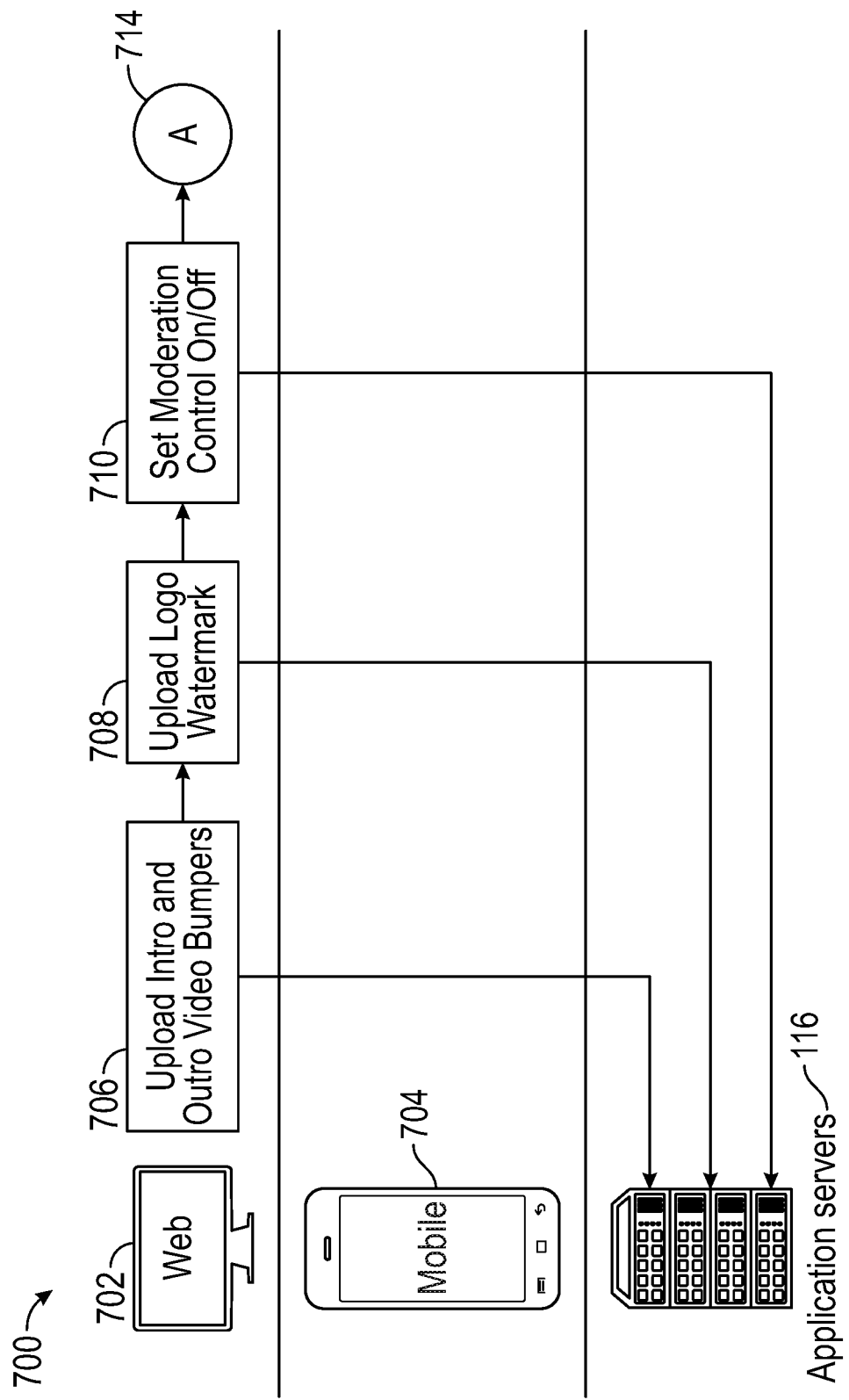
FIG. 7 is a flowchart illustrating a method, according to some example embodiments, to upload video bumpers from a web interface to servers.

FIG. 7 is a flowchart illustrating a method 700, according to some example embodiments, to upload video bumpers from a web interface to the application servers 116.

Active components for the example method 700 include a computer system 702, a mobile device 704 and the application servers 116. In other example scenarios, different active components could perform the discussed operations of method 700.

The method 700 commences with operation 706, performed at the computer system 702, during which bumper videos in the form of an introduction video (intro video) and ending video (outro video) are uploaded from the computer system 702 to the application servers 116, and specifically the video distribution server 120. The bumper videos are then routed, from the video distribution server 120, to an appropriate video concatenation server 124. To this end, the computer system 702 present an web interface (e.g., the settings user interface 2100 of FIG. 21) to a user that allows the user to select the bumper videos to be uploaded, as well as to select a destination video concatenation server 124 to which the bumper videos are to be supplied.

At the video concatenation server 124, the bumper videos may then be stored in associated database (e.g., the database 128). The bumper videos have associated metadata including an entity identifier 508 for a particular entity (e.g., a user or corporate entity that uploaded the bumper videos from the computer system 702). The entity identifier 508 is used, as described in further detail with respect to FIG. 5, to identify content with which the bumper videos are to be concatenated.

At operation 708, a logo watermark may also be uploaded via the settings user interface 2100 to the application servers 116, and specifically to the video distribution server 124 for distribution to an appropriate video encoding server 122. As with the bumper videos, the logo watermark is associated with specific metadata that includes an entity identifier 508 for a particular entity, which is used to identify to which content the logo watermark is to be applied.

At operation 710, a user, again using the settings user interface 2100, may set a moderation control to ON or OFF. Specifically, the setting of the moderation control determines whether content for a particular video show or campaign is subject to moderation or not. From operation 710, the method 700 proceeds to transition circle A 714.

Figure 8:
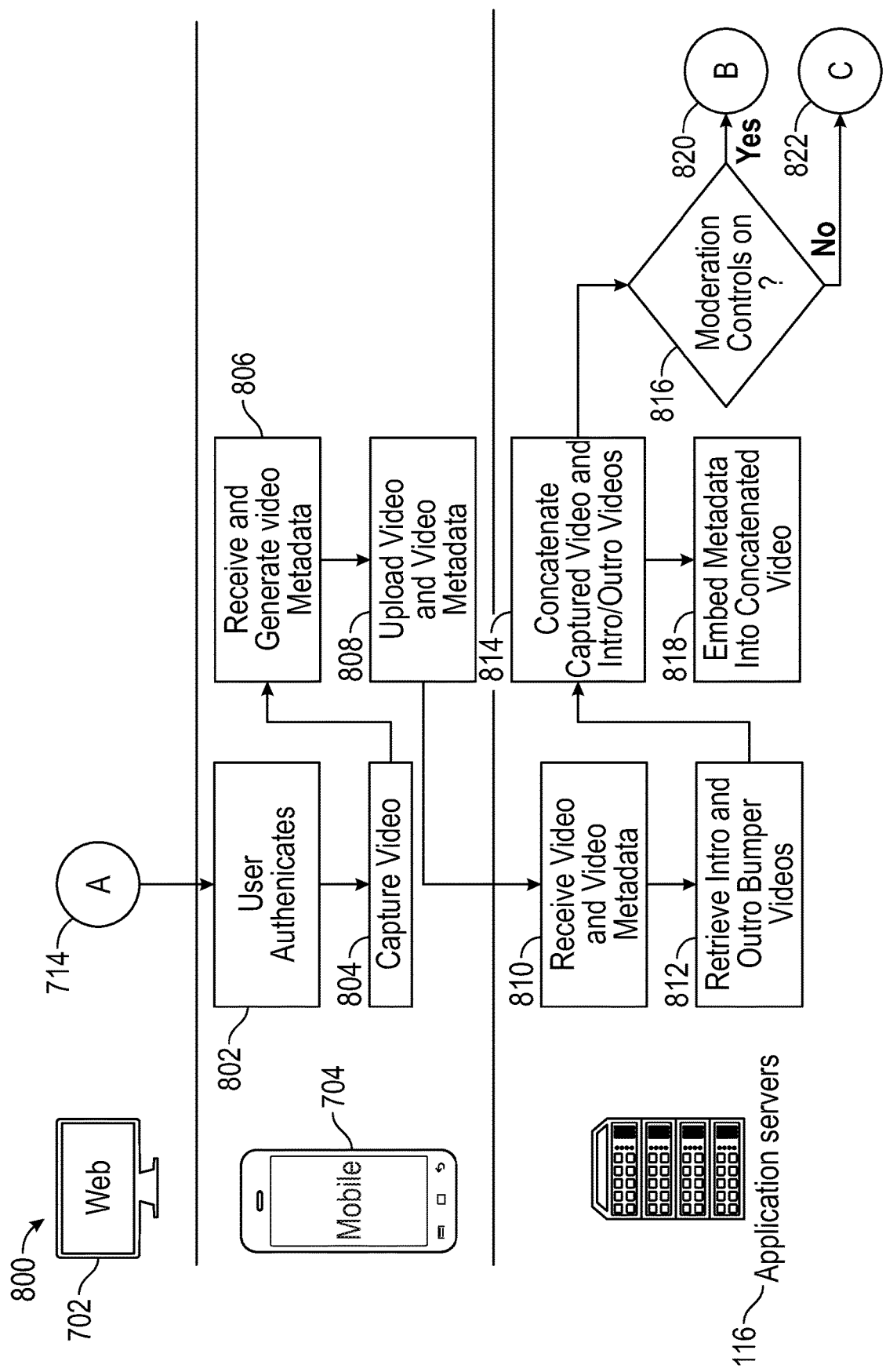
FIG. 8 is a flowchart illustrating a method, according to an example embodiments, to upload user generated content (UGC) (e.g., captured video from a mobile device) to servers, and to concatenate the captured video with bumper videos.

FIG. 8 is a flowchart illustrating a method 800, according to an example embodiments, to upload captured video from a mobile device to servers, and to concatenate the captured video with bumper videos.

The method 800 commences at block 802, what is the user authenticating access to an application in the example form of the video capture application 104 hosted on the mobile device 704. At block 804, using the video capture application 104, the user captures video using the camera system of the mobile device 704. An example interface item 1300 that is presented by the video capture application 104 to facilitate this a video capture operation is shown in FIG. 13.

At block 806, video metadata (e.g., metadata 504) is received from the user by the video capture application 104. An example interface 1400 that is presented by the video capture application 104 in order to facilitate the input of the video metadata is shown in FIG. 14. Specifically, using the interface 1400, a user may add an image (e.g. thumbnail) to represent the captured video, provide a title, tags and description regarding the video.

At block 808, the captured video and its associated video metadata is uploaded from the video capture application 104 on the mobile device 704, to the application servers 116, which receive the captured video and metadata at block 810. Specifically, the video and metadata are uploaded to and received by, as shown in FIG. 2, the video distribution server 120. The captured video and metadata are then distributed from the video distribution server 122, the video encoding server 122 and the video concatenation server 124.

At block 812, the video concatenation server 124 retrieves the intro and outro bumper videos (e.g., from a database associated with the administrative server 118 or from a database directly associated with the video concatenation server 124124). At block 814, the video concatenation server 124 proceeds to concatenate to the captured video with the retrieved bumper videos to generate a concatenated video. Also, at block 814, the video encoding server 122 applies digital watermarking to the captured video or the concatenated video. To this end, the video encoding server 122 may retrieve digital watermarking imagery and information from the administrative server 118, or may use metadata associated with the captured video to identify and retrieve locally stored digital watermarking imagery.

At block 818, the application servers 116 (e.g., the video encoding server 122 and/or the video concatenation server 124) embed the metadata into the concatenated video.

At decision block 816, the application servers 166 determine whether moderation controls are applicable (e.g., "on") with respect to the concatenated video. This determination is made by the administrative server 118 from administrative data applicable to the concatenated video (e.g., administrative data associated with a particular entity (e.g., corporation or user) associated with the video capture application 104). Take the example of a corporation, such as the Coca-Cola Corporation, which may release a branded version of the video capture application 104. In this case, the administrative server 118 may determine that the concatenated video was generated by a "Coca-Cola" version of the video capture application 104, and accordingly access administrative information of the Coca-Cola Corporation maintained by the administrative server 118 in order to determine whether communication controls are applicable to a specific instance of the concatenated video. Following a positive determination at decision block 816, the method 800 progresses to block B 820. On the other hand, if moderation controls are not applicable to the concatenated video, the method 800 progresses to block C 822.

Figure 9:
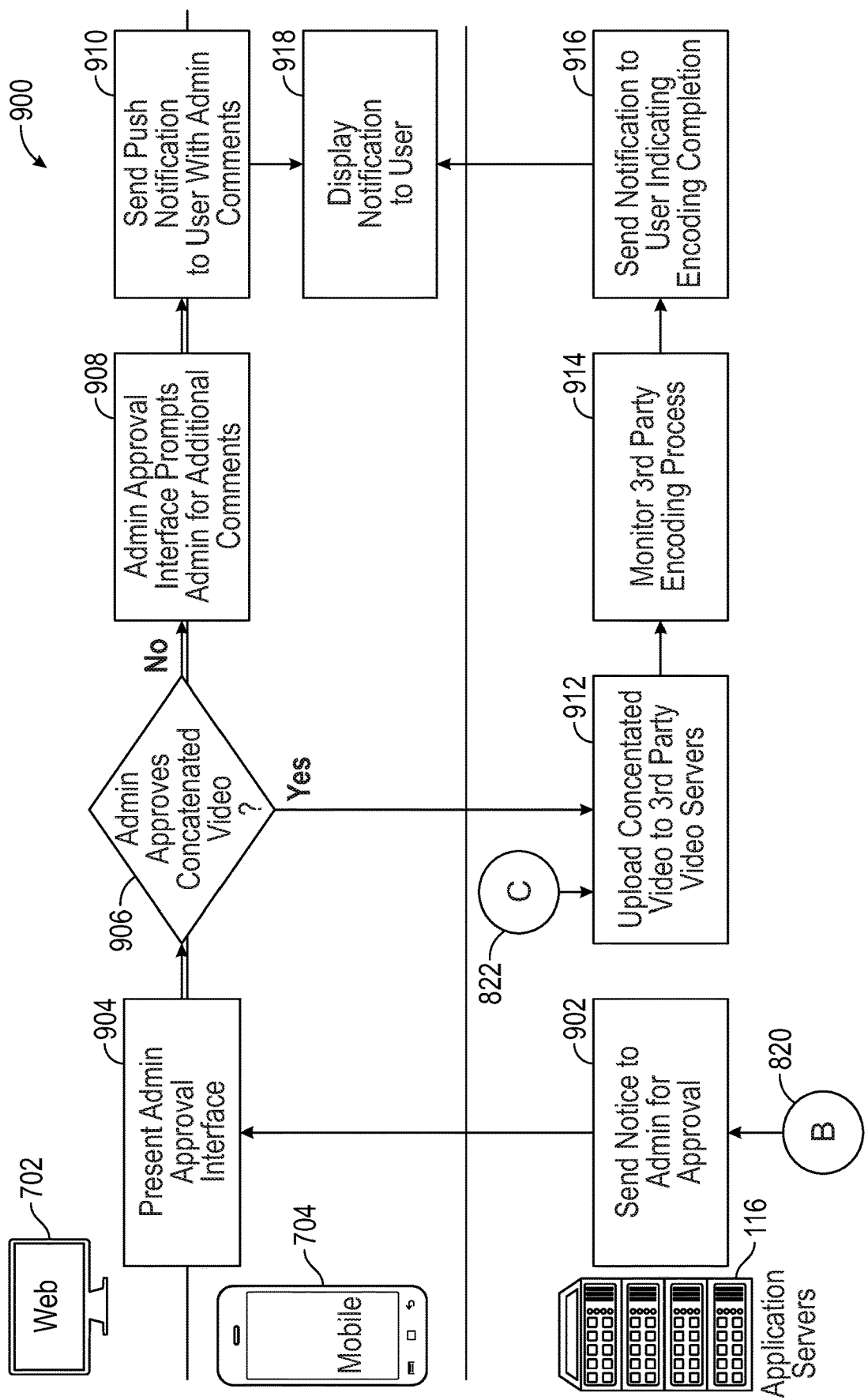
FIG. 9 is a flowchart illustrating a method, according to an example embodiments, to enable curation of distribution of concatenated videos to third-party servers
Figure 10:
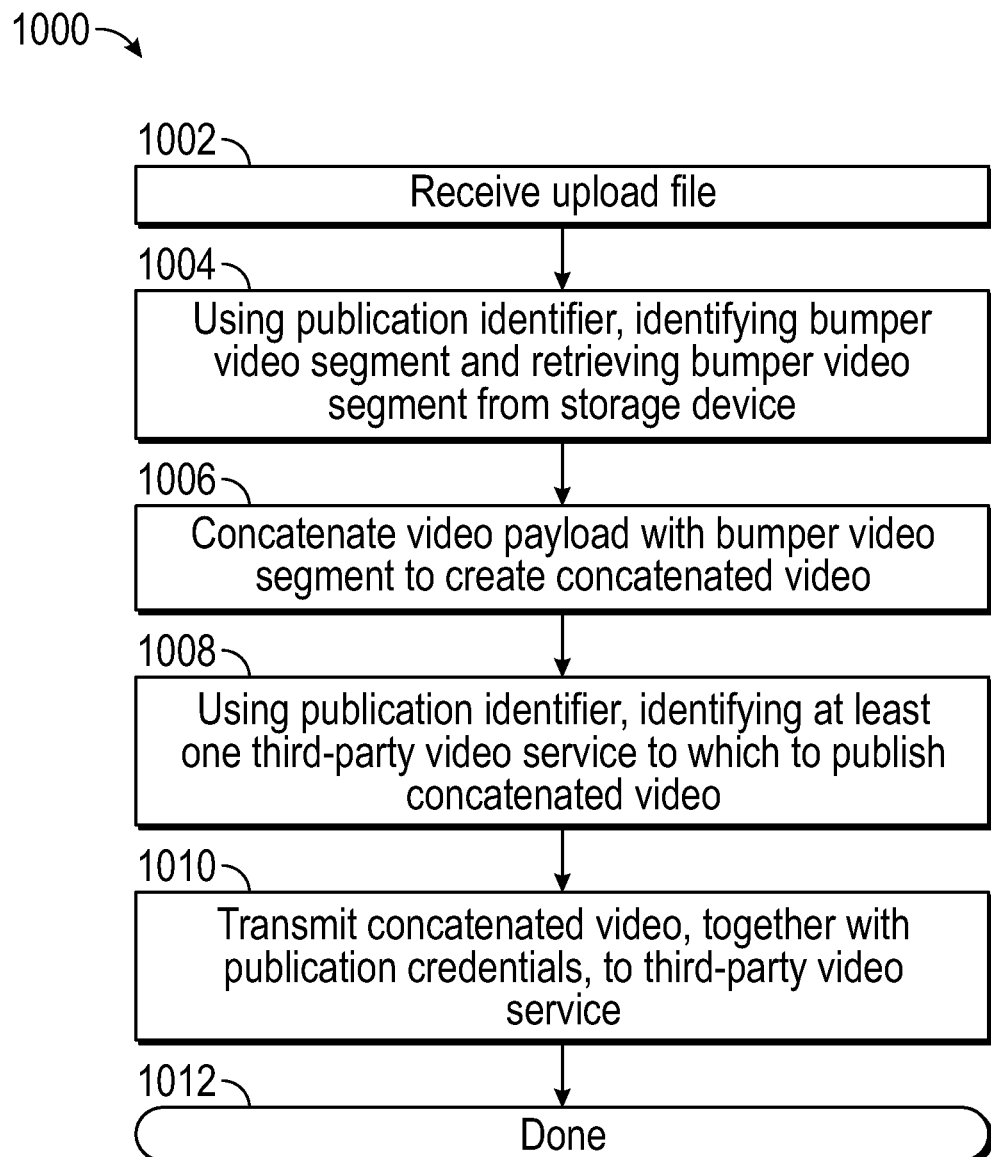
FIG. 10 illustrates a routine in accordance with one embodiment.
Figure 11:
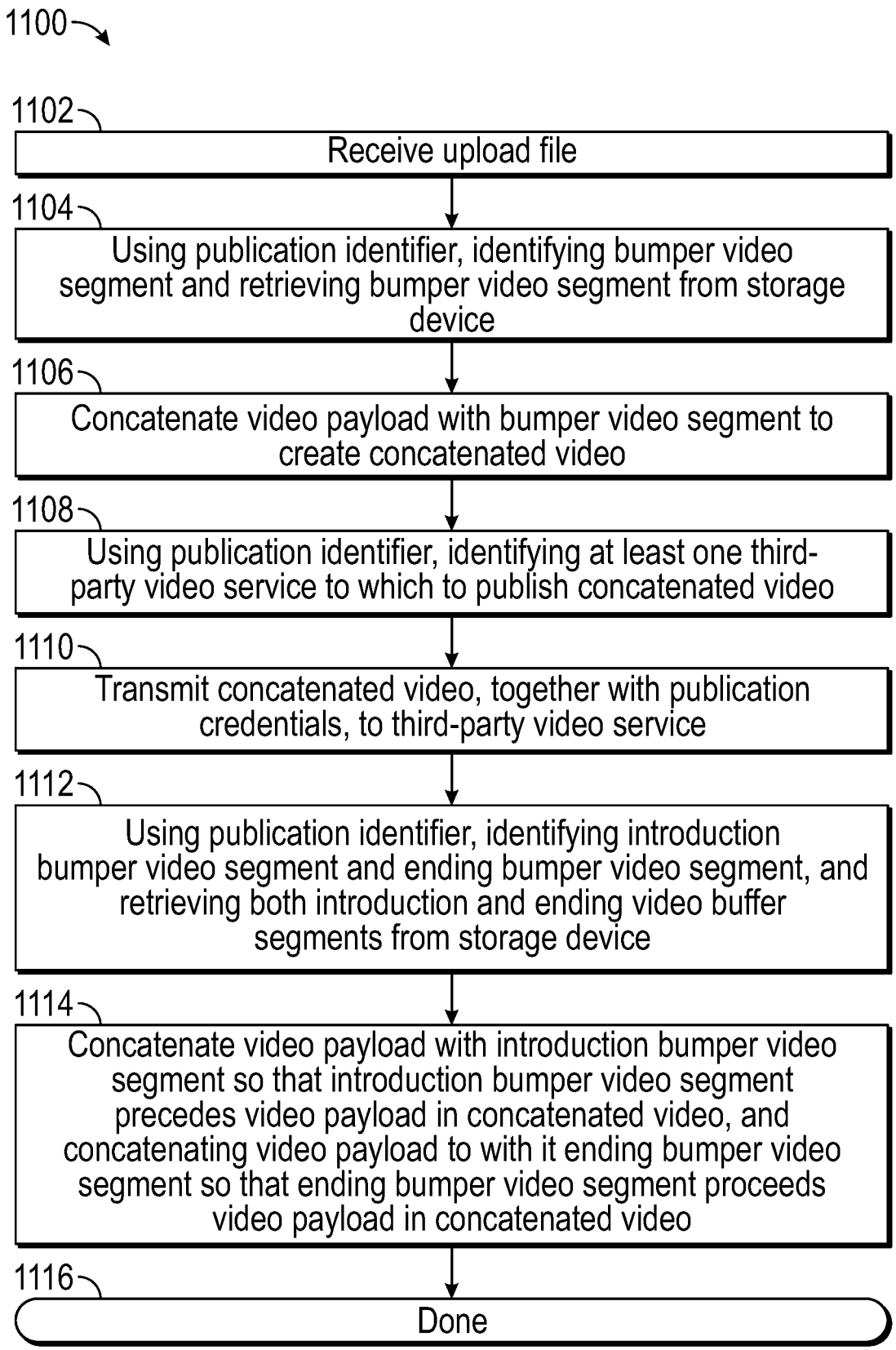
FIG. 11 illustrates a routine in accordance with one embodiment.

FIG. 9 is a flowchart illustrating a method 900, according to an example embodiments, to enable curation of distribution of concatenated videos to third-party servers.

The method 900 proceeds from B 820 to block 902, with the application servers 116, and specifically the administrative server 118, sending a notice to an administrative user requesting approval for the distribution and publication of a specific concatenated video to third-party services (e.g., Facebook, YouTube, Twitter etc.). In one embodiment, this notice is sent to the video capture application 104 executing on the mobile device 704 of an administrative user and is presented at block 904 on an administrative approval interface. In another embodiment, this notice is presented via a web interface and presented on an administrative approval interface of a web application or website accessed via the computer system 702.

Following presentation of a request for distribution and/or publication of the concatenated video within the context of the administrative approval interface at block 904, a determination is made at decision block 906 whether the administrative user has approved the distribution and/or publication of the concatenated video. Following a positive determination, the method 900 progresses to block 912, where the concatenated video is distributed and uploaded from the video distribution server 120 to third-party video services. Note that where administrative approval is not needed for publication and/or distribution of the concatenated video, the method 900 progresses directly from C 822 to block 912.

At block 914, the video encoding server 122 monitors third-party encoding processes by any one or more of the third-party services. Upon detecting that encoding is completed at block 916, the video encoding server 122 sends a notification to the uploading user (and also optionally the administrative user) indicating that encoding has been completed. This coding completion notification is presented to the uploading user (and/or the administrative user) at block 918 (e.g., via an interface on the mobile device 704 or the computer system 702), at which point the method 900 terminates.

Returning to decision block 906, in the event that the administrative user does not approve the concatenated a video for distribution and/or publication, an administrative approval interface prompts the administrative user for additional comments and explanation, at block 908, as to reasons for the lack of approval. Having then received such additional comments or explanation from the administrative user, at block 910, the computer system 702 or mobile device 704 sends a decline push notification to the uploading user that includes the administrative user's comments or explanation. At block 918, this decline push notification is presented to the uploading user.

In block 1002, routine 1000 receives an upload file. In block 1004, routine 1000, using the publication identifier, identifies a bumper video segment and retrieves the bumper video segment from a storage device. In block 1006, routine 1000 concatenates the video payload with the bumper video segment to create a concatenated video. In block 1008, routine 1000, using the publication identifier, identifies at least one third-party video service to which to publish the concatenated video. In block 1010, routine 1000 transmits the concatenated video, together with publication credentials, to the third-party video service. In done block 1012, routine 1000 ends.

In block 1102, routine 1100 receives an upload file. In block 1104, routine 1100, using the publication identifier, identifies a bumper video segment and retrieves the bumper video segment from a storage device. In block 1106, routine 1100 concatenates the video payload with the bumper video segment to create a concatenated video. In block 1108, routine 1100, using the publication identifier, identifies at least one third-party video service to which to publish the concatenated video. In block 1110, routine 1100 transmits the concatenated video, together with publication credentials, to the third-party video service. In block 1112, routine 1100 using the publication identifier, identifies an introduction bumper video segment and an ending bumper video segment, and retrieves both the introduction and ending video buffer segments from the storage device. In block 1114, routine 1100 concatenates the video payload with the introduction bumper video segment so that the introduction bumper video segment precedes the video payload in the concatenated video, and concatenates the video payload with the ending bumper video segment so that the ending bumper video segment proceeds the video payload in the concatenated video. In done block 1116, routine 1100 ends.

Figure 12:
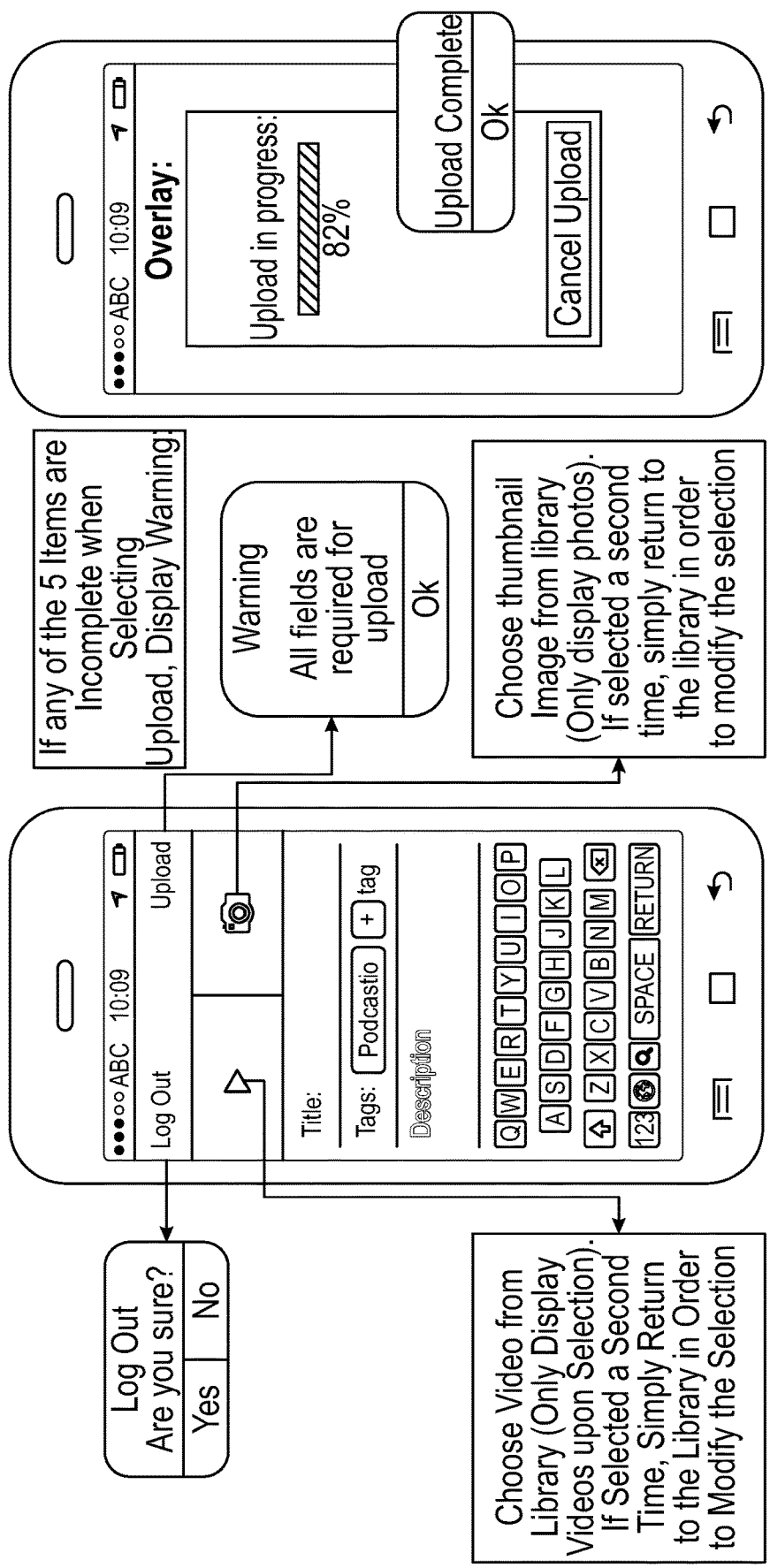
FIG. 12 is a user interface diagram showing a user interface flow, according to some example embodiments, displayed on a mobile device during a video capture and upload process.

FIG. 12 is a user interface diagram showing a user interface flow 1200, according to some example embodiments, displayed on a mobile device during a video capture and upload process.

As shown, the user is presented with the option of selecting a captured video to upload, and also inputting metadata 504 to be associated with the video (e.g., title 510, tags 514, description 512 and a thumbnail image 516).

FIG. 13 is a front view of a mobile device presenting a video capture interface of a hosted video capture application 104, according to some example embodiments.

FIG. 14 is a front view of a mobile device presenting a metadata input interface of a video capture application 104, according to some example embodiments.

Figure 15:
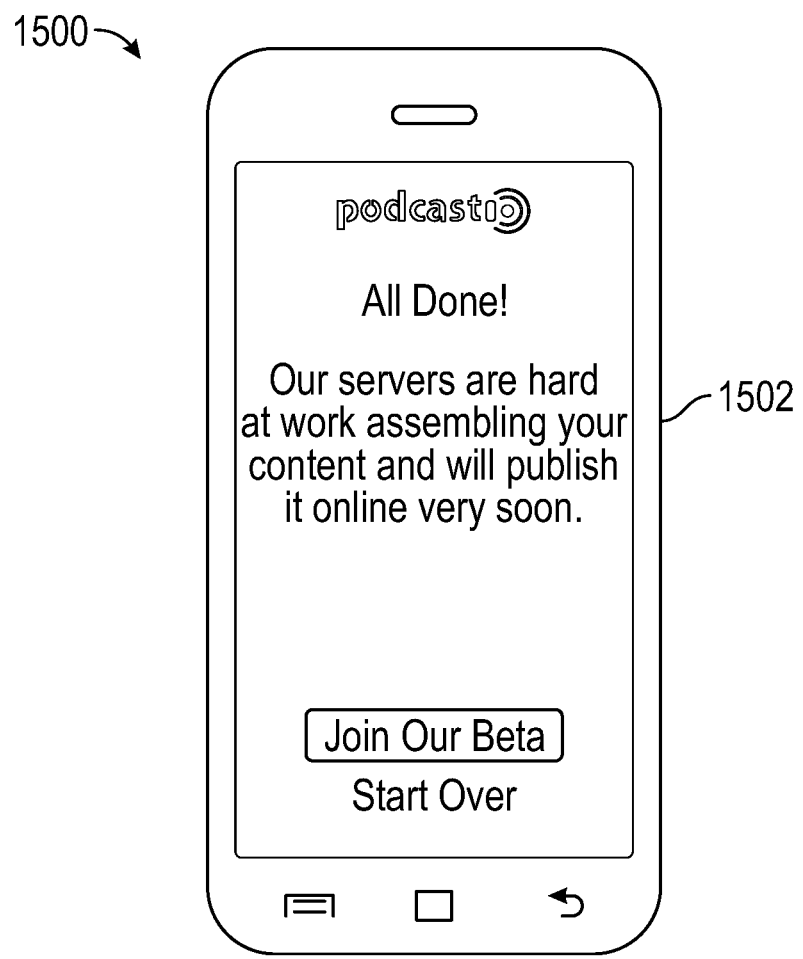
FIG. 15 is a front view of a mobile device presenting a video upload confirmation interface of a hosted video capture application, according to some example embodiments.

FIG. 15 is a front view of a mobile device presenting a video upload confirmation interface of a hosted video capture application, according to some example embodiments.

Figure 16:
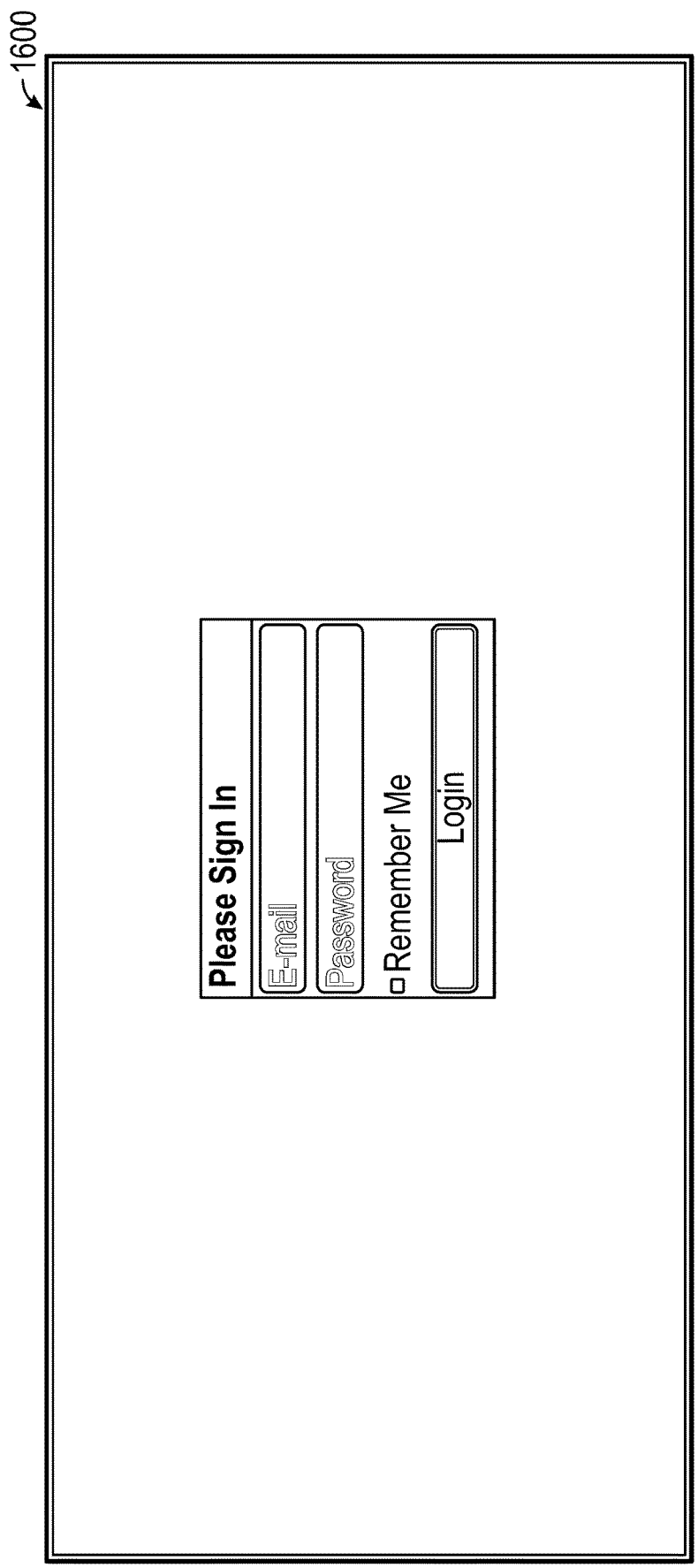
FIG. 16 is a user interface diagram showing a sign-in user interface, according to some example embodiments.

FIG. 16 is a user interface diagram showing a sign-in user interface 1600, according to some example embodiments.

Figure 17:
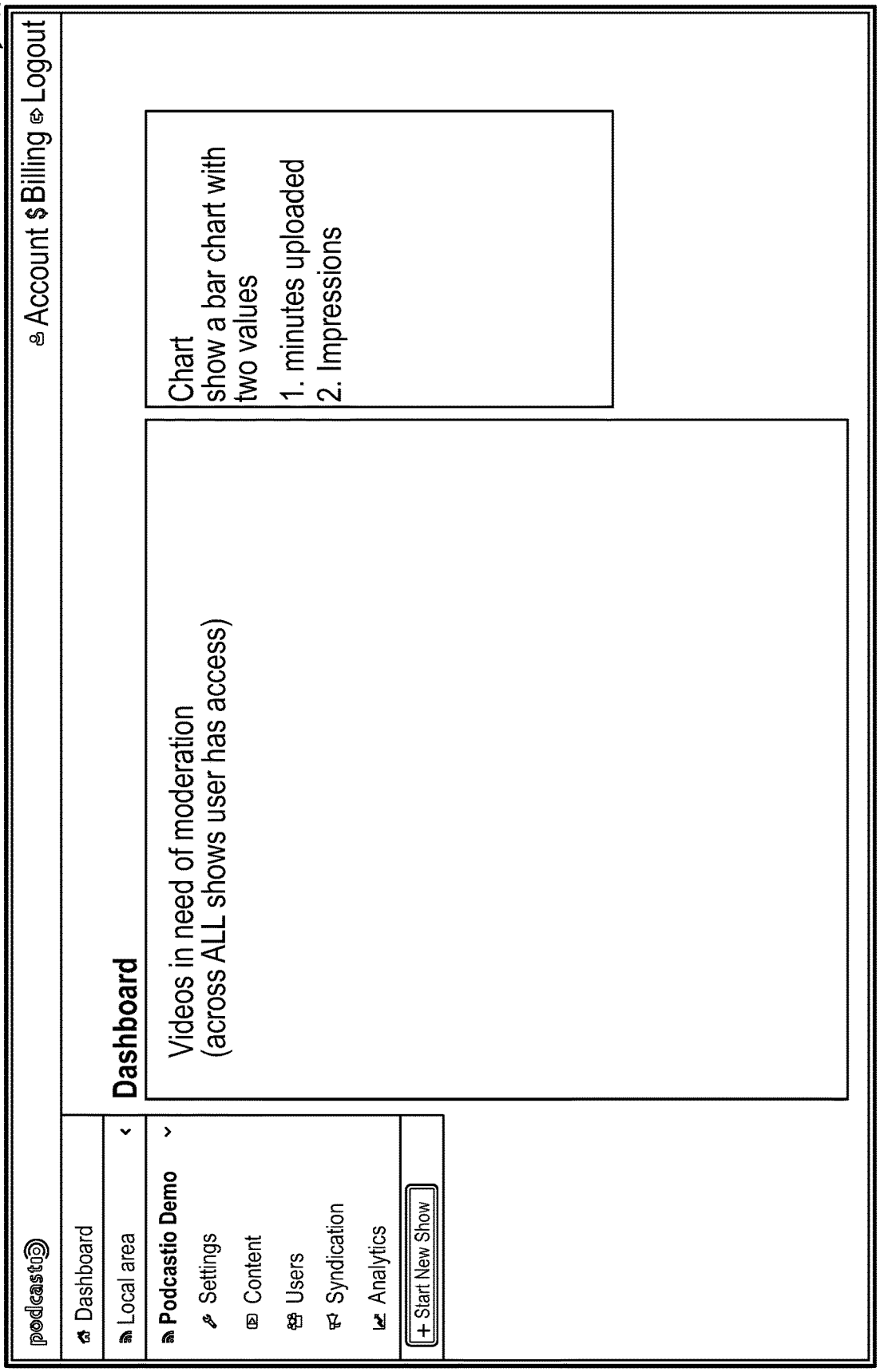
FIG. 17 is a user interface diagram illustrating a dashboard user interface, according to some example embodiments.

FIG. 17 is a user interface diagram illustrating a dashboard user interface 1700, according to some example embodiments.

Figure 18:
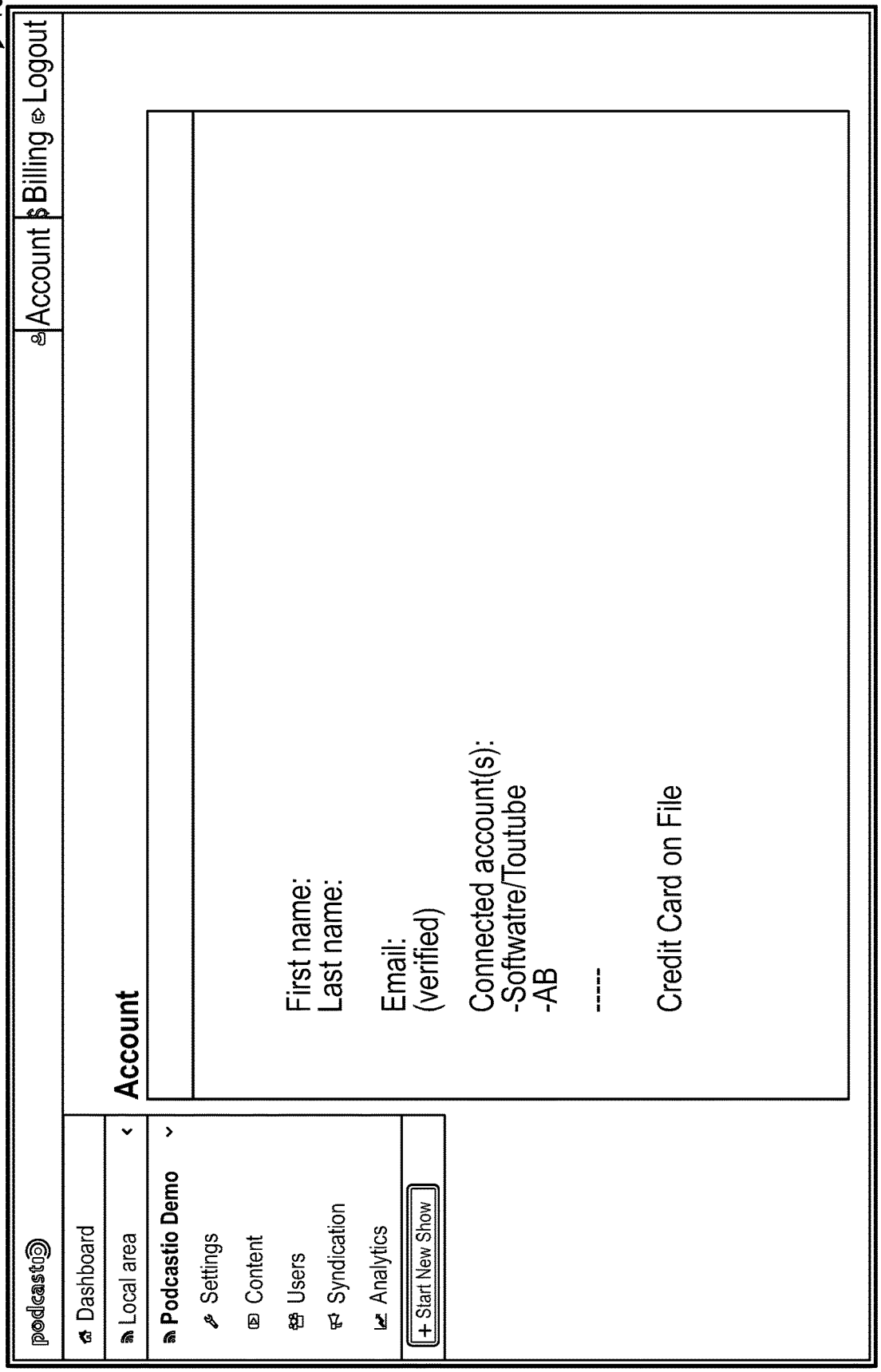
FIG. 18 is a user interface diagram illustrating an account user interface, according to some example embodiments.

FIG. 18 is a user interface diagram illustrating an account user interface 1800, according to some example embodiments.

Figure 19:
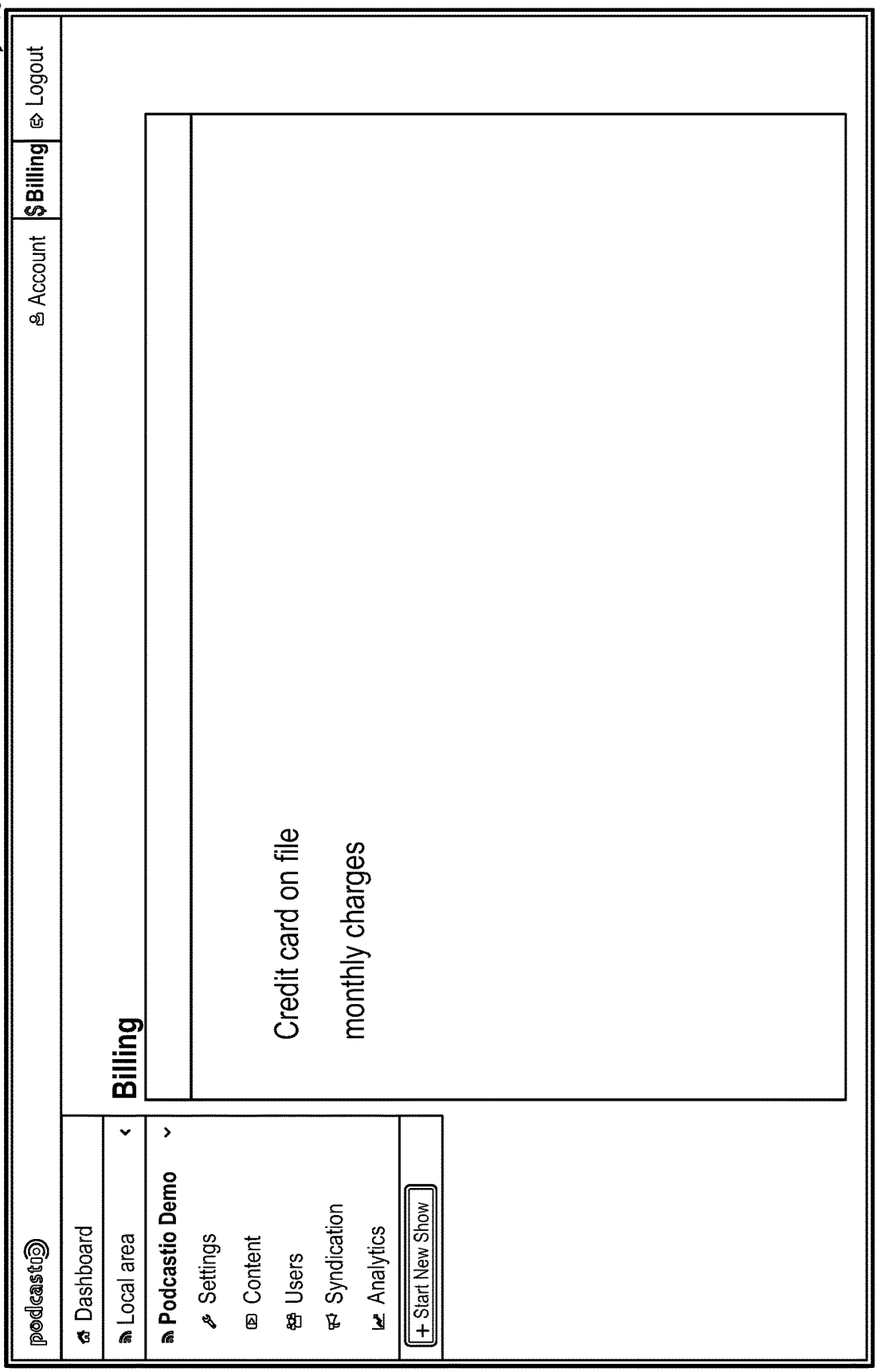
FIG. 19 is a user interface diagram illustrating a billing user interface, according to some example embodiments.

FIG. 19 is a user interface diagram illustrating a billing user interface 1900, according to some example embodiments.

Figure 20:
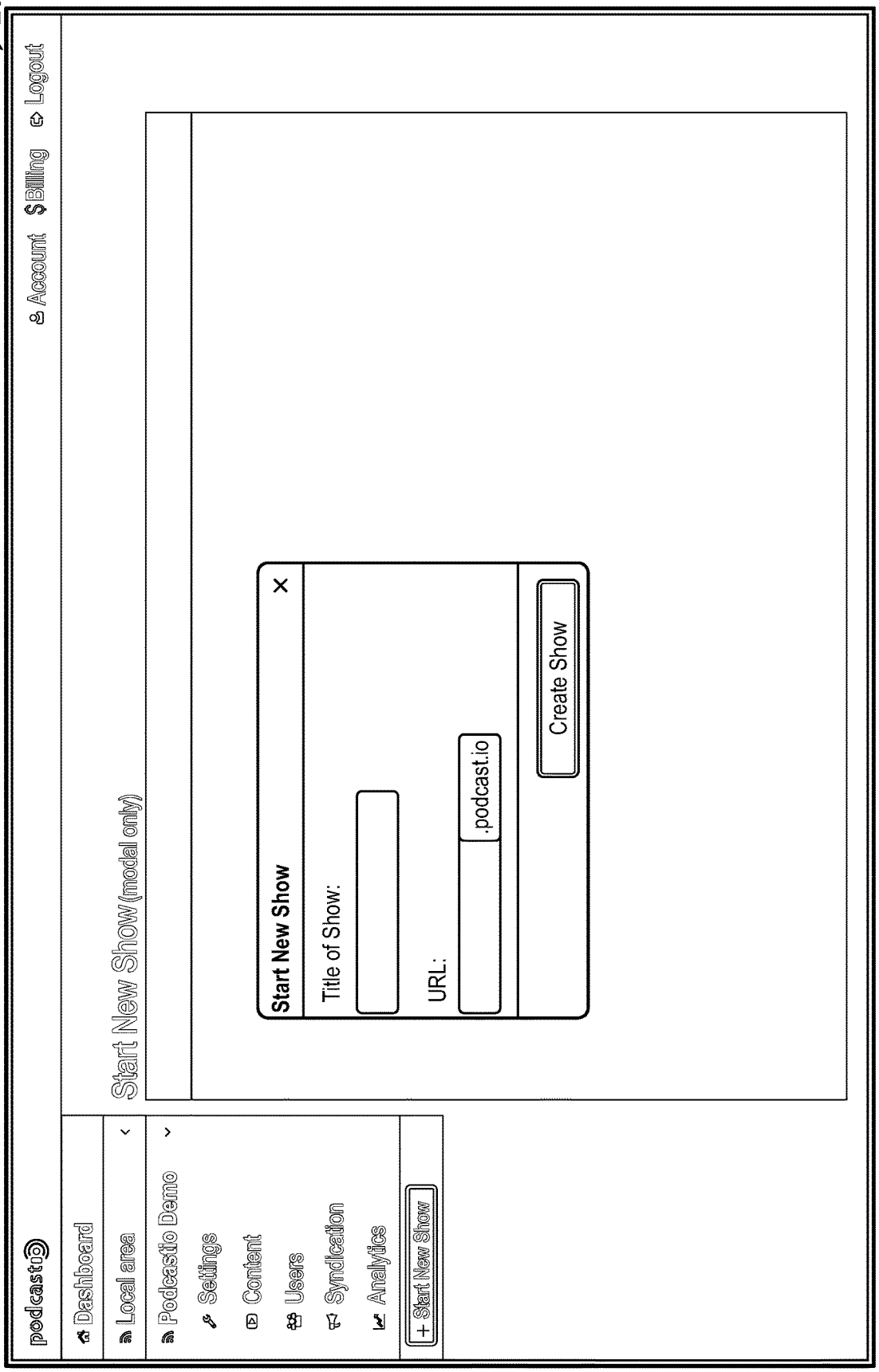
FIG. 20 is a user interface diagram illustrating a new show user interface, according to some example embodiments.

FIG. 20 is a user interface diagram illustrating a new show user interface 2000, according to some example embodiments.

FIG. 21 is a user interface diagram illustrating a settings user interface 2100, according to some example embodiments.

FIG. 22 is a user interface diagram showing a content user interface 2200, according to some example embodiments.

FIG. 23 is a user interface diagram showing a user management interface 2300, according to some example embodiments.

Figure 24:
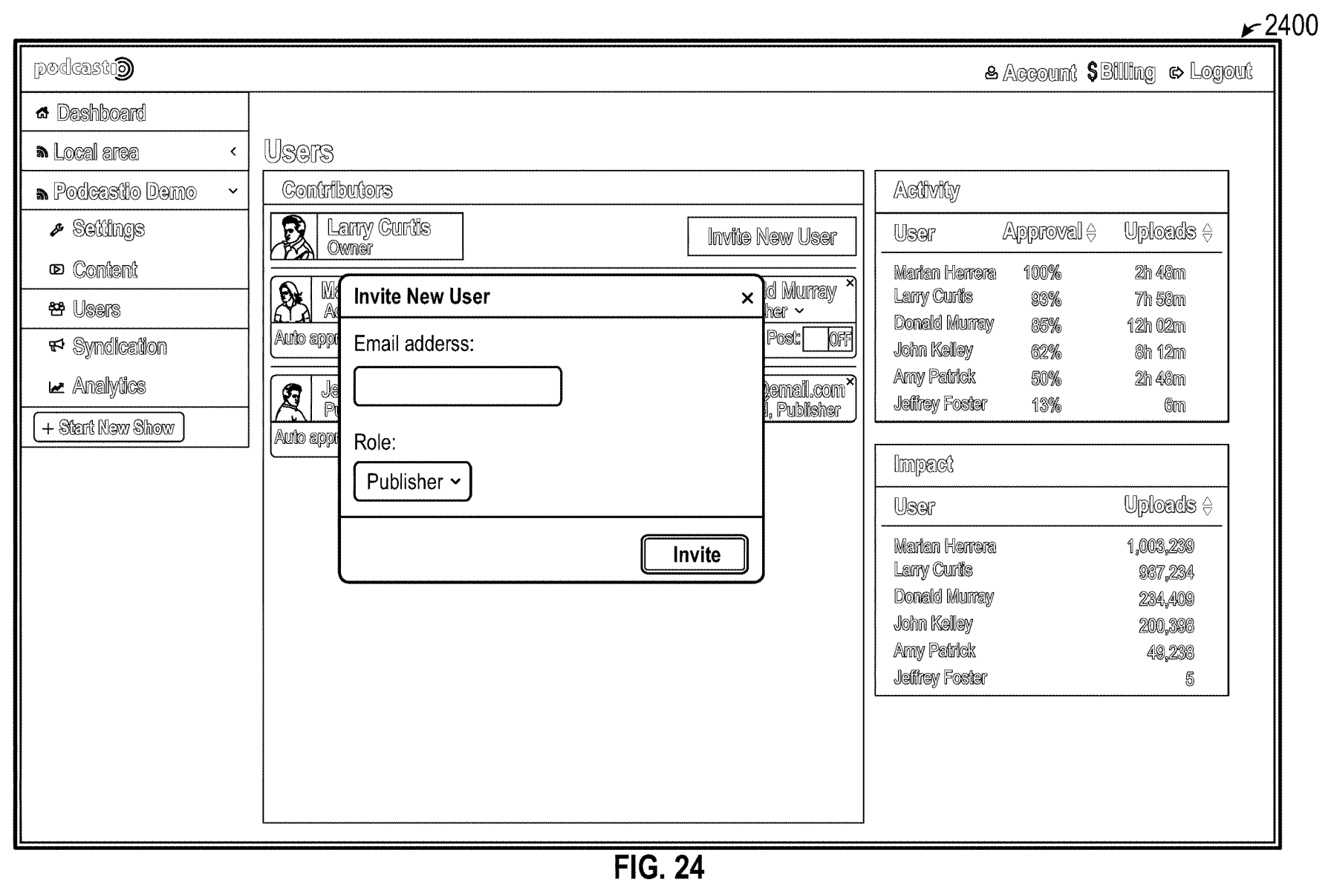

FIG. 24 is a user interface diagram showing a user invitation interface 2400, according to some example embodiments.

FIG. 25 is a user interface diagram showing a syndication user interface 2500, according to some example embodiments.

FIG. 26 is a user interface diagram showing a further view of the syndication user interface 2500, according to some example embodiments.

FIG. 27 is a user interface diagram showing an analytics user interface 2700, according to some example embodiments.

Figure 28A:
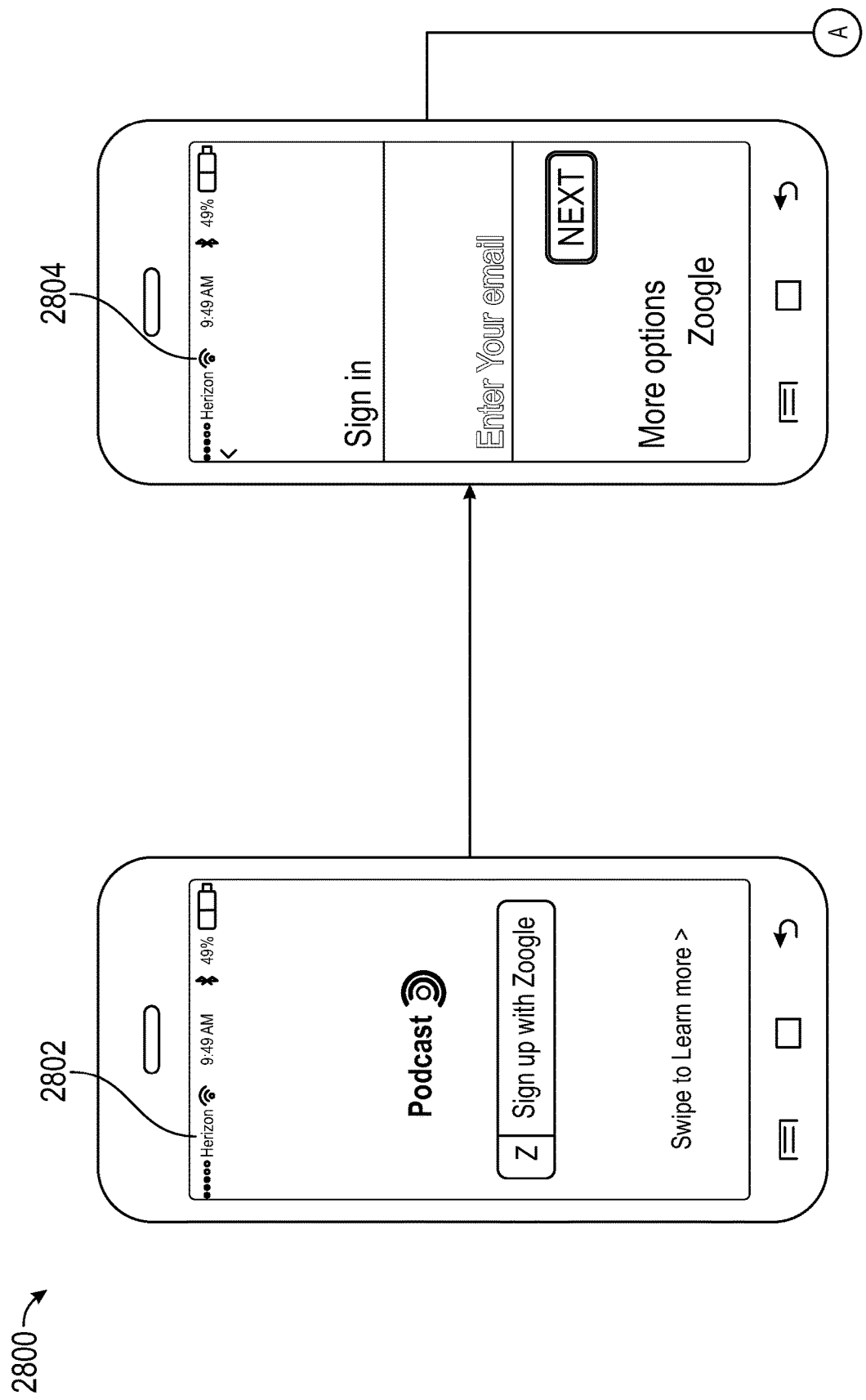
FIGS. 28A and 28B are user interface sequence diagrams illustrating a sign-in user interface sequence 2800 which includes a sign-up user interface 2802, a sign-in email user interface 2804, a sign-in password user interface 2806, and a settings user interface 2808
Figure 28B:
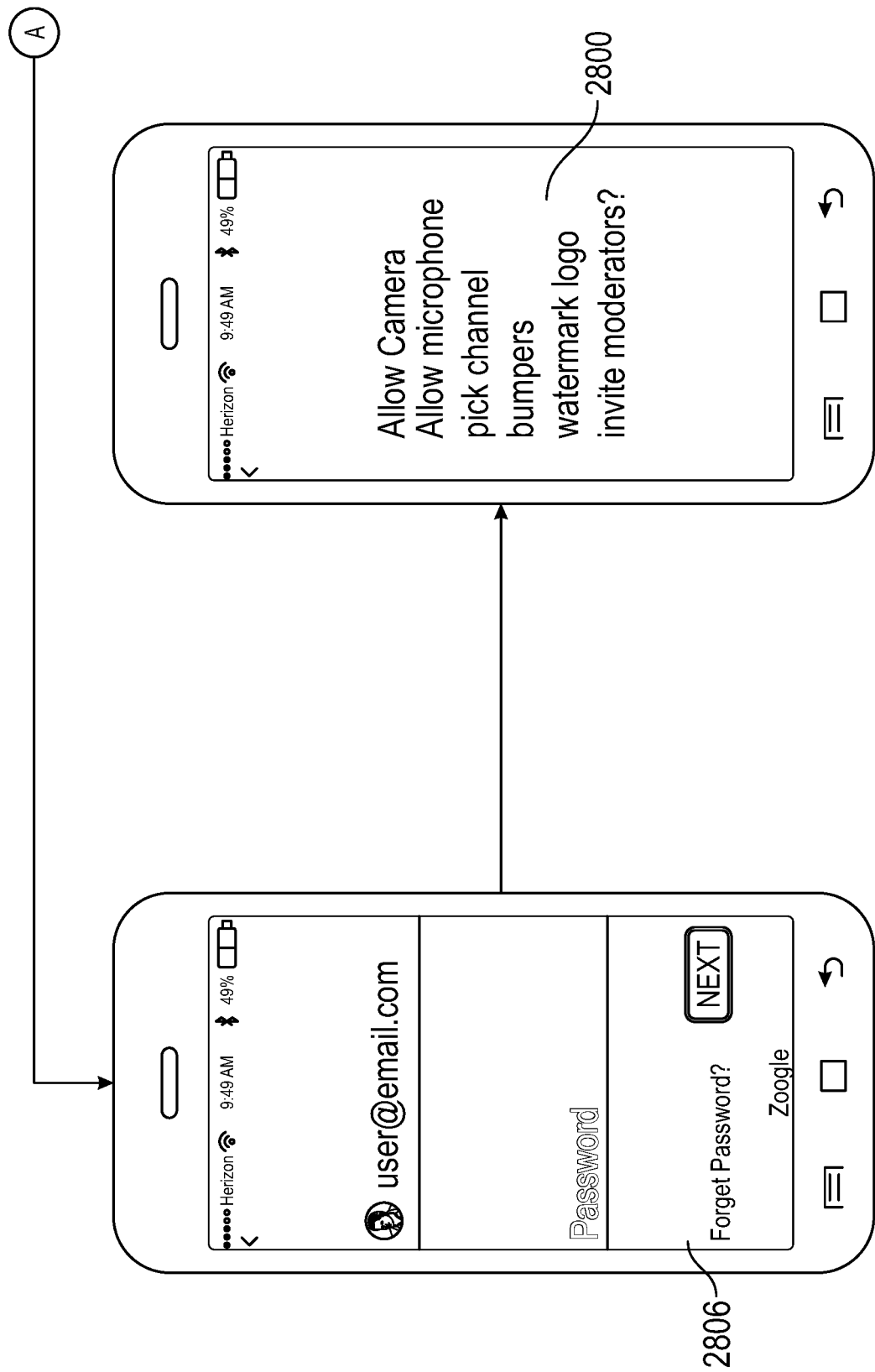

FIGS. 28A and 28B are user interface sequence diagrams illustrating a sign-in user interface sequence 2800 which includes a sign-up user interface 2802, a sign-in email user interface 2804, a sign-in password user interface 2806, and a settings user interface 2808.

Figure 29:
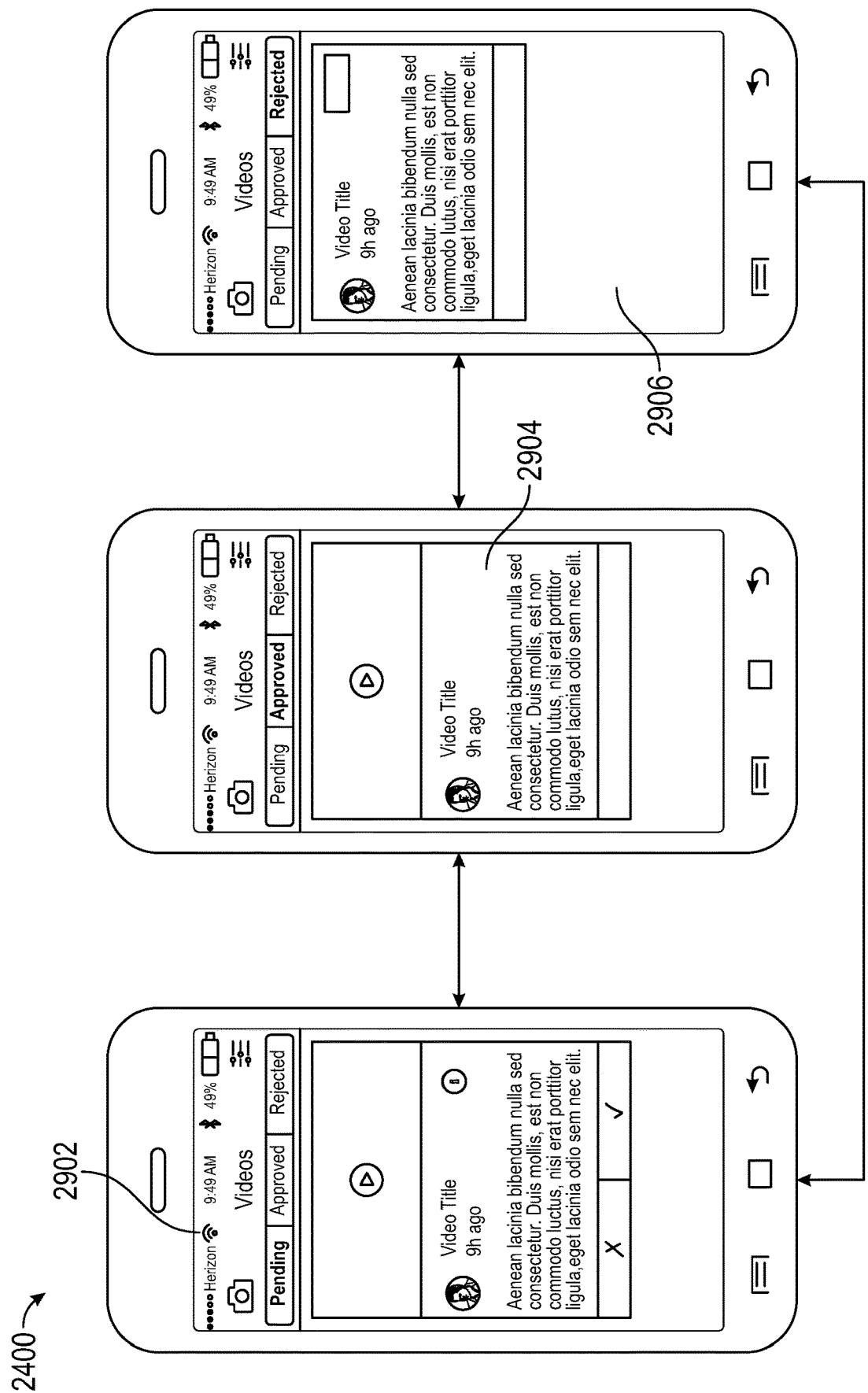
FIG. 29 illustrates an aspect of the subject matter in accordance with one embodiment.

FIG. 29 is a user interface sequence diagram illustrating moderation interface sequence 2900 which includes a video pending user interface 2902, a video approved user interface 2904, and a video rejected user interface 2906.

Figure 30:
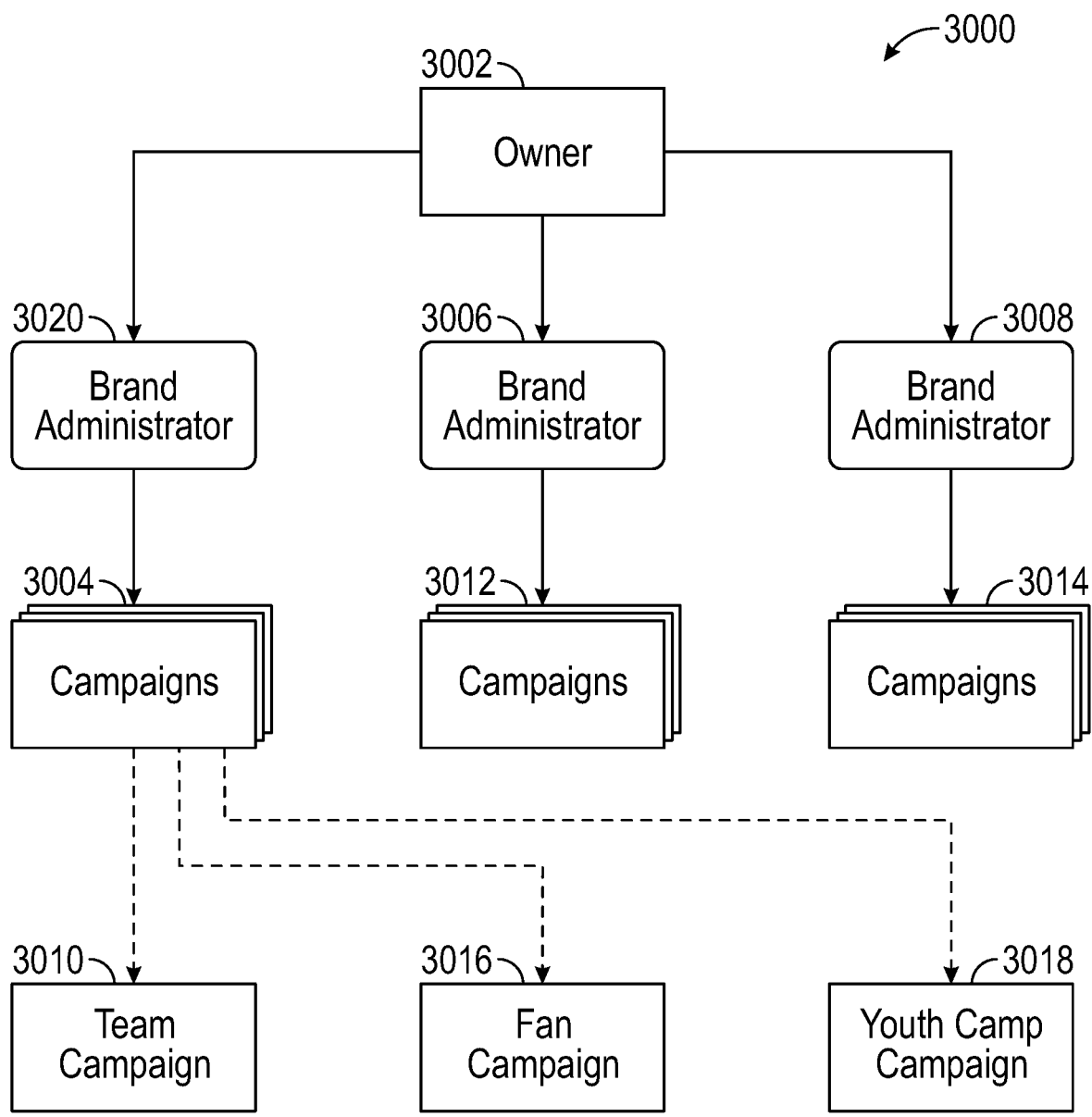
FIG. 30 is a data structure diagram, illustrating a campaign data structure, according to certain example embodiments.

FIG. 30 is a data structure diagram, illustrating a campaign data structure 3000, according to certain example embodiments. The campaign a data structure 3000, when considered hierarchically, includes at least one owner data record 3002, representing an owner of the campaign. For example, Major League Baseball (MLB) may act as a campaign owner of an MLB campaign to distribute User Generator Counted (UGC) that generated by various entities associated with the MLB (e.g., fans, teams, youth camps, etc.).

A number of brand administrators, each represented by a respective brand administrator record 3020, 3006 and 3008) are associated with a particular owner. Continuing the MLB example, each participating team within the MLB campaign may have a brand administrator for that particular team (e.g., a brand administrator may be associated with the San Francisco Giants baseball team, the St. Louis Cardinals baseball beam, and the Oakland A's baseball team).

Each the brand administrator may operate a number of the content campaigns (e.g., represented by campaign data 3004, 3012 and 3014). As shown in FIG. 30, the campaign data 3004 may include data for a team campaign 3010, a fan campaign 3016, and a youth camp campaign 3018).

Figure 31:
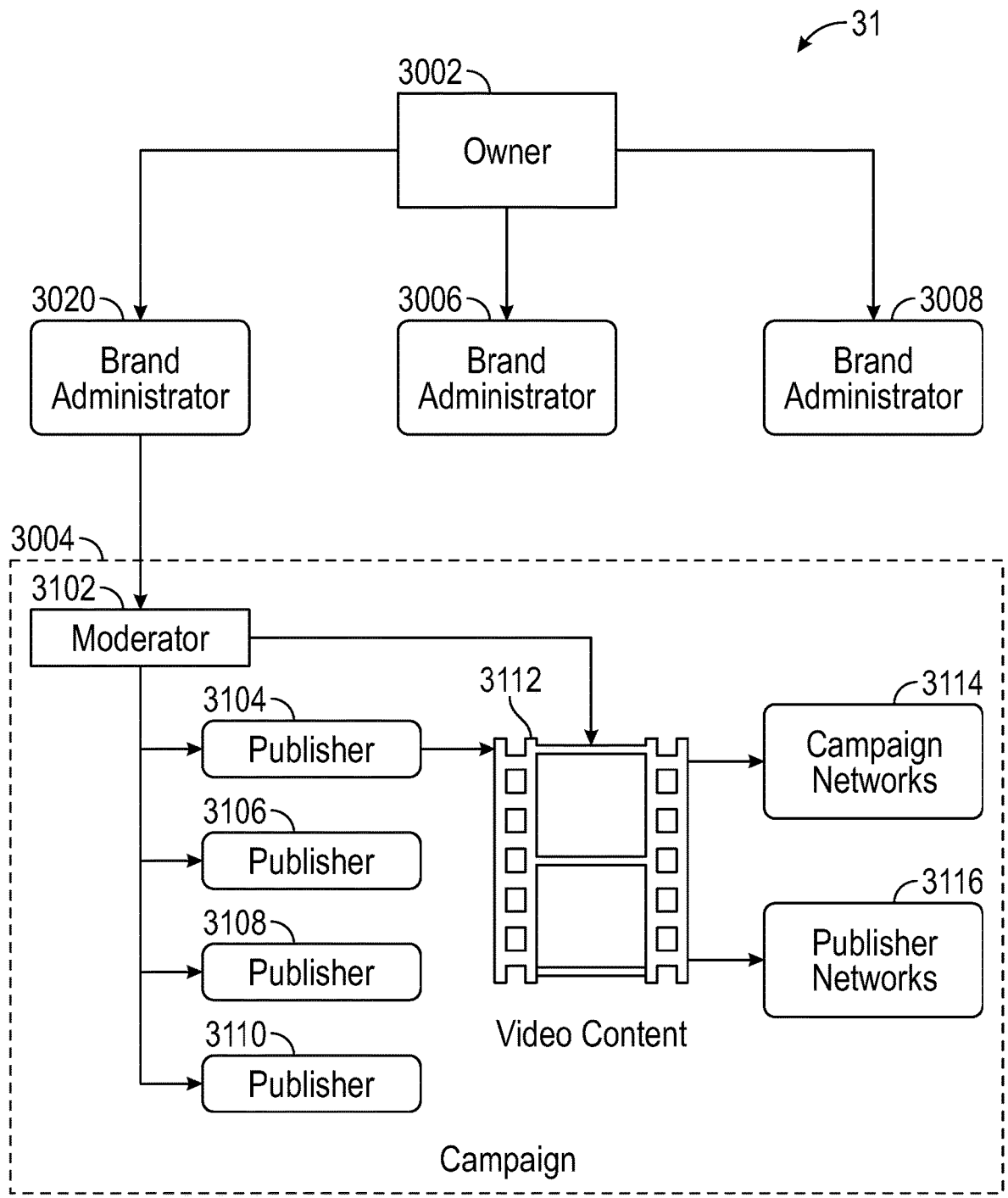
FIG. 31 is a data diagram illustrating further details a campaign data structure, according to certain example embodiments

FIG. 31 is a data diagram illustrating further details a campaign data structure 3100, according to certain example embodiments. In particular, FIG. 31 provides further details regarding the contents of campaign data 3004. A particular campaign includes a moderator 3102, as well as a number of publishers at 3104-3110. Accordingly, taking a global view of the campaign that data structure 3100, four types of uses are represented, namely an owner, a brand administrator, a moderator and a publisher. The owner that may be responsible for the payment of all fees and expenses associated with a particular account.

A moderator 3102 is responsible for acting as a "gateway" or approver of content (e.g., video content 3112 had to be published to one or more campaign networks 3114 and publishing networks, such as Facebook, Twitter, and YouTube etc.). Further, a single campaign 3004 may have multiple moderators.

Continuing the example discussed with reference to FIG. 30, and assuming the MLB as an owner, each of the San Francisco, St. Louis Cardinals and Oakland A's baseball teams may have been associated moderator that can set up brand defaults. For example, the San Francisco Giants moderator may wish to control a watermarking of content distributed within the context of a campaign, or any one of a number of brand defaults. Further, a campaign moderator may have access certain data and analytics regarding a particular campaign.

The publishers 3104-3110 may also fall into several categories (e.g., team players, fans, or youth camp attendees), and publish to an appropriate campaign. For example, with reference to FIG. 31, each of the publishers 3104-3110 may be a fan and be participating within a fan campaign 3016.

Figure 32:
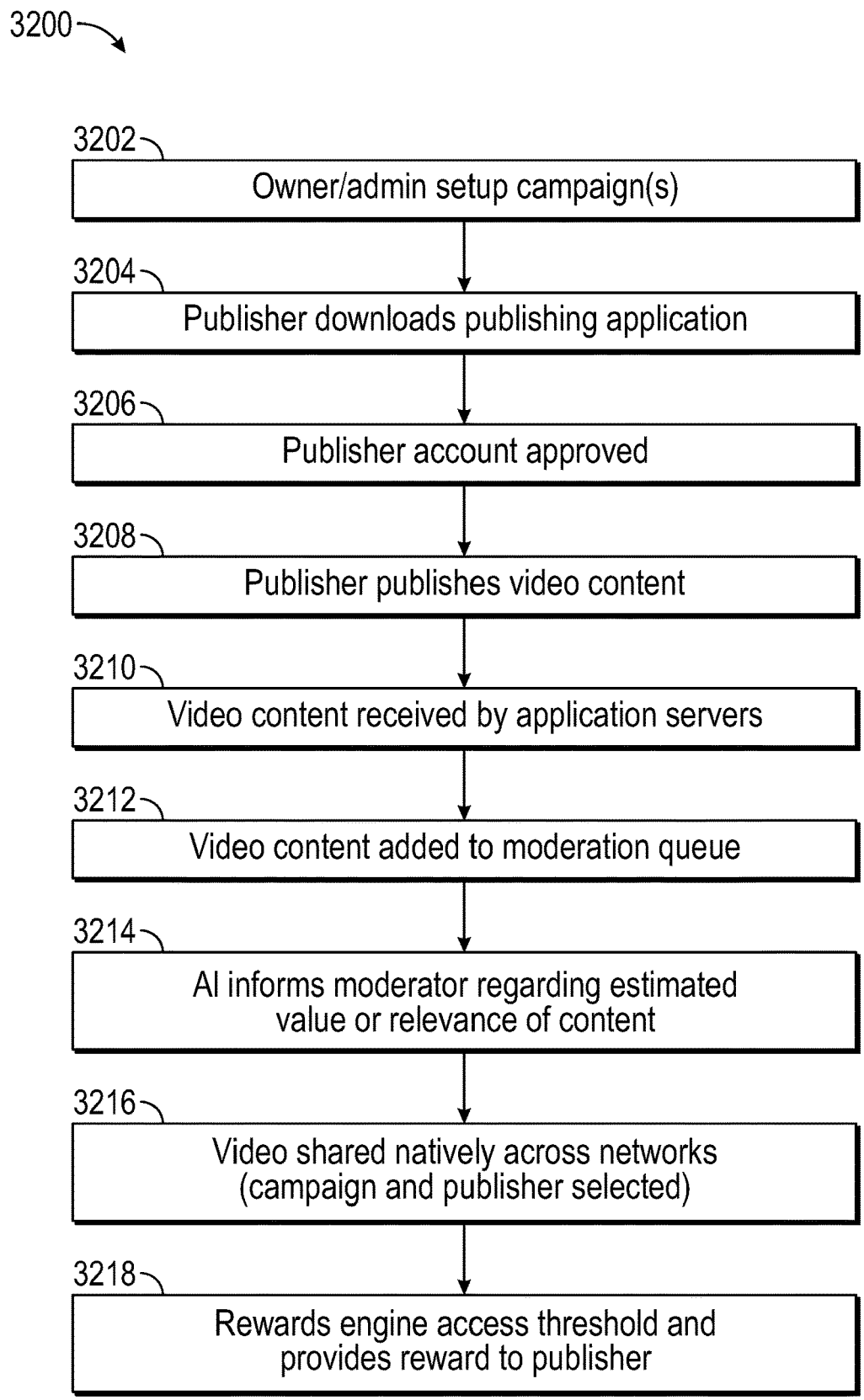
FIG. 32 is a flowchart illustrating a method of publishing a campaign of user generated content (UGC), according to the roles and data structures.

FIG. 32 is a flowchart illustrating a method 3200 of publishing a campaign of user generated content (UGC), according to the roles and data structures described above with reference to FIGS. 30 and 31.

The method 3200 commences at operation 3202, with the owner and/or administrator setting up a particular campaign, and also specifying whether the owner will be responsible for costs and fees of the campaign, or alternatively whether payment for various campaigns will be the responsibility of one or more brand administrators.

At operation 3204, a publisher (e.g., a baseball fan) downloads a publishing application (e.g., the video capture application 104) to his or her mobile device. The downloaded publishing application may be a native to an application vendor (e.g., Congo.io), or may be a branded application developed using a software development kit (SDK provided by Congo.io) by a particular owner and/or brand administrator (e.g., a branded application had developed using an SDK by the San Francisco Giants).

At operation 3206, having downloaded the relevant publishing application, an account for the publisher is approved (e.g., using the user management component 310 of the administrative server 1180).

At operation 3204, the publisher then publishes video content 3112 to the video distribution server 120. This content may be captured in real-time using the user's mobile device, or may alternatively be previously captured and stored video content.

At operation 3210, the video content is received by the application servers 116, and more specifically, the video distribution server 120. The video content is then subject to the encoding and concatenation operations as described above. Thereafter, at operation 3212, the video content is added to a moderation queue, for moderation according to a publication schedule, moderation by a user (e.g., the moderator 3102), or moderation according to individual content characteristics.

At operation 3214, the moderation operations may be supplemented by an artificial intelligence (AI) component of the administrative server 118. The AI component provides publication approval recommendations to a human moderator based on various factors, such as the demographic details of the publishing user, the quality or length of the video, stability of the video and other discernible characteristics or metadata of the video.

At operation 3216, the video content is then shared natively across multiple networks, such as the campaign networks 3114 and the publisher networks 3116.

At operation 3218, a rewards engine, being part of the administrative server 118, access certain thresholds with respect to the published video content (e.g., number of views), and provide appropriate rewards to a specific publisher. For example, if a particular fan in the role of a publisher, publishes a video that receives a certain threshold number of views, the rewards engine may provide a monetary payment to the fan.

Figure 33:
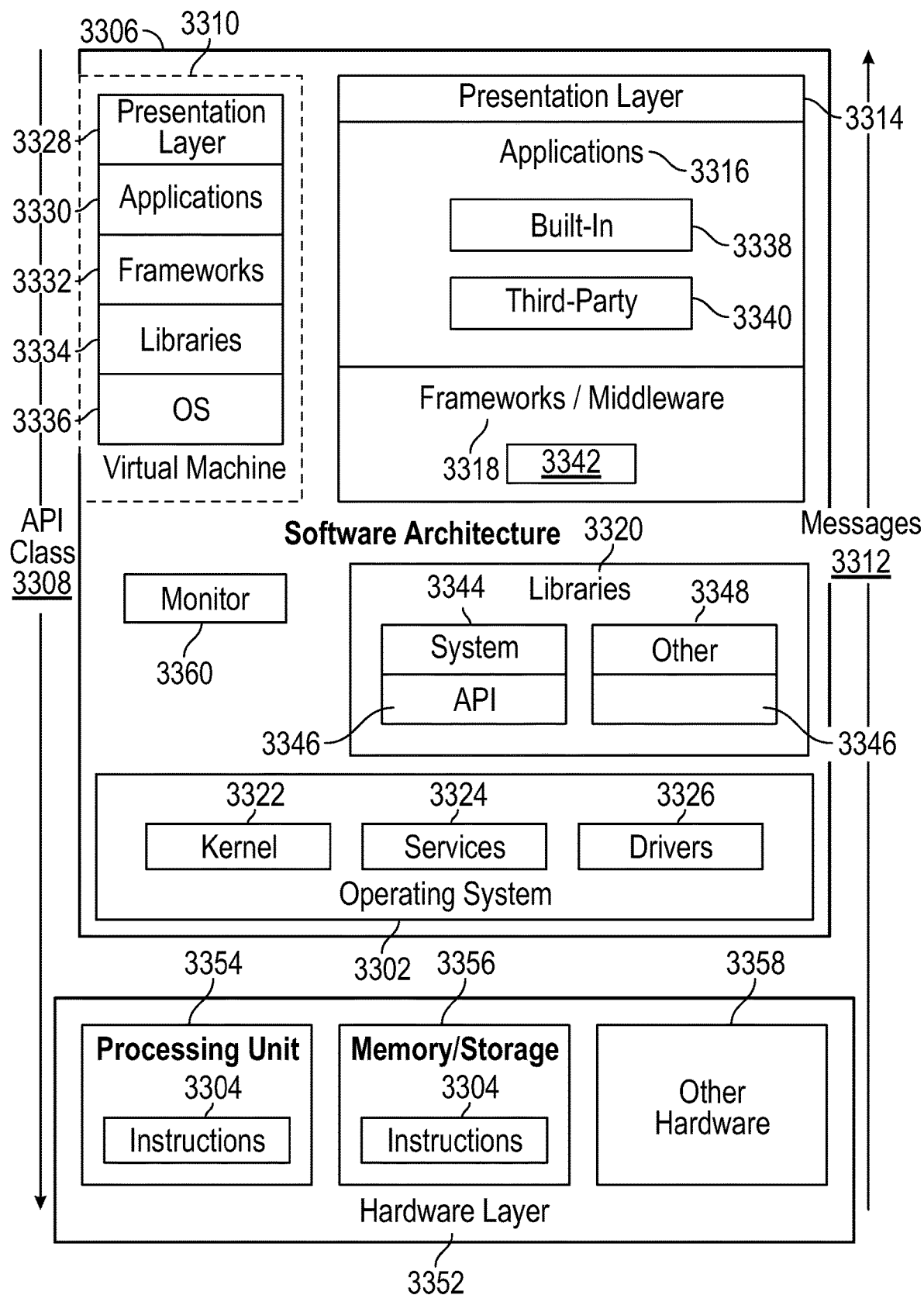
FIG. 33 is a block diagram illustrating a representative software architecture software architecture, which may be used in conjunction with various hardware architectures herein described.

FIG. 33 is a block diagram illustrating an example software architecture 3306, which may be used in conjunction with various hardware architectures herein described. FIG. 33 is a non-limiting example of a software architecture and it will be appreciated that many other architectures may be implemented to facilitate the functionality described herein. The software architecture 3306 may execute on hardware such as machine 3400 of FIG. 34 that includes, among other things, processors 3404, memory 3414, and I/O components 3418. A representative hardware layer 3352 is illustrated and can represent, for example, the machine 3400 of FIG. 34. The representative hardware layer 3352 includes a processing unit 3354 having associated executable instructions 3304. Executable instructions 3304 represent the executable instructions of the software architecture 3306, including implementation of the methods, components and so forth described herein. The hardware layer 3352 also includes memory and/or storage modules memory/storage 3356, which also have executable instructions 3304. The hardware layer 3352 may also comprise other hardware 3358.

In the example architecture of FIG. 33, the software architecture 3306 may be conceptualized as a stack of layers where each layer provides particular functionality. For example, the software architecture 3306 may include layers such as an operating system 3302, libraries 3320, applications 3316 and a presentation layer 3314. Operationally, the applications 3316 and/or other components within the layers may invoke application programming interface (API) API calls 3308 through the software stack and receive a response as in response to the API calls 3308. The layers illustrated are representative in nature and not all software architectures have all layers. For example, some mobile or special purpose operating systems may not provide a frameworks/middleware 3318, while others may provide such a layer. Other software architectures may include additional or different layers.

The operating system 3302 may manage hardware resources and provide common services. The operating system 3302 may include, for example, a kernel 3322, services 3324 and drivers 3326. The kernel 3322 may act as an abstraction layer between the hardware and the other software layers. For example, the kernel 3322 may be responsible for memory management, processor management (e.g., scheduling), component management, networking, security settings, and so on. The services 3324 may provide other common services for the other software layers. The drivers 3326 are responsible for controlling or interfacing with the underlying hardware. For instance, the drivers 3326 include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 3320 provide a common infrastructure that is used by the applications 3316 and/or other components and/or layers. The libraries 3320 provide functionality that allows other software components to perform tasks in an easier fashion than to interface directly with the underlying operating system 3302 functionality (e.g., kernel 3322, services 3324 and/or drivers 3326). The libraries 3320 may include system libraries 3344 (e.g., C standard library) that may provide functions such as memory allocation functions, string manipulation functions, mathematical functions, and the like. In addition, the libraries 3320 may include API libraries 3346 such as media libraries (e.g., libraries to support presentation and manipulation of various media format such as MPREG4, H.264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 3320 may also include a wide variety of other libraries 3348 to provide many other APIs to the applications 3316 and other software components/modules.

The frameworks frameworks/middleware 3318 (also sometimes referred to as middleware) provide a higher-level common infrastructure that may be used by the applications 3316 and/or other software components/modules. For example, the frameworks/middleware 3318 may provide various graphic user interface (GUI) functions, high-level resource management, high-level location services, and so forth. The frameworks/middleware 3318 may provide a broad spectrum of other APIs that may be utilized by the applications 3316 and/or other software components/modules, some of which may be specific to a particular operating system or platform.

The applications 3316 include built-in applications 3338 and/or third-party applications 3340. Examples of representative built-in applications 3338 may include, but are not limited to, a contacts application, a browser application, a book reader application, a location application, a media application, a messaging application, and/or a game application. Third-party applications 3340 may include any an application developed using the ANDROID™ or IOS™ software development kit (SDK) by an entity other than the vendor of the particular platform, and may be mobile software running on a mobile operating system such as IOS™ ANDROID™, WINDOWS® Phone, or other mobile operating systems. The third-party applications 3340 may invoke the API calls 3308 provided by the mobile operating system (such as operating system 3302) to facilitate functionality described herein.

The applications 3316 may use built in operating system functions (e.g., kernel 3322, services 3324 and/or drivers 3326), libraries 3320, and frameworks/middleware 3318 to create user interfaces to interact with users of the system. Alternatively, or additionally, in some systems interactions with a user may occur through a presentation layer, such as presentation layer 3314. In these systems, the application/component "logic" can be separated from the aspects of the application/component that interact with a user.

Some software architectures use virtual machines. In the example of FIG. 33, this is illustrated by a virtual machine 3310. The virtual machine 3310 creates a software environment where applications/components can execute as if they were executing on a hardware machine (such as the machine 3400 of FIG. 34, for example). The virtual machine 3310 is hosted by a host operating system (operating system (OS) 3336 in FIG. 33) and typically, although not always, has a virtual machine monitor 3360, which manages the operation of the virtual machine as well as the interface with the host operating system (i.e., operating system 3302). A software architecture executes within the virtual machine 3310 such as an operating system operating system (OS) 3336, libraries 3334, frameworks 3332, applications 3330 and/or presentation layer 3328. These layers of software architecture executing within the virtual machine 3310 can be the same as corresponding layers previously described or may be different.

Figure 34:
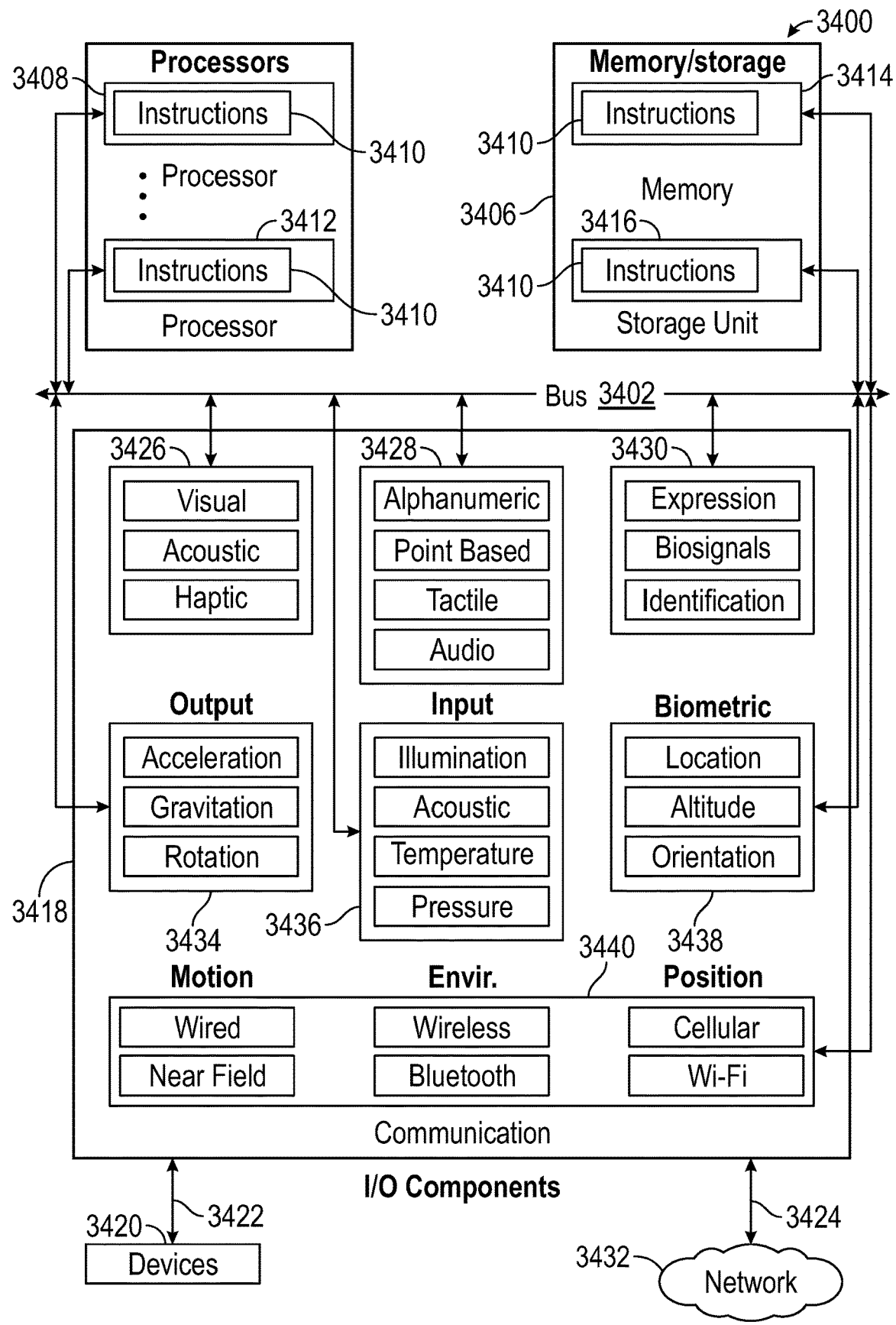
FIG. 34 is a block diagram illustrating components of a machine, according to some example embodiments, able to read instructions from a machine-readable medium (e.g., a machine-readable storage medium) and perform any one or more of the methodologies discussed herein.

FIG. 34 is a block diagram illustrating components of a machine 3400, according to some example embodiments, able to read instructions from a machine-readable medium (e.g., a machine-readable storage medium) and perform any one or more of the methodologies discussed herein. Specifically, FIG. 34 shows a diagrammatic representation of the machine 3400 in the example form of a computer system, within which instructions 3410 (e.g., software, a program, an application, an applet, an app, or other executable code) for causing the machine 3400 to perform any one or more of the methodologies discussed herein may be executed. As such, the instructions may be used to implement modules or components described herein. The instructions transform the general, non-programmed machine into a particular machine programmed to carry out the described and illustrated functions in the manner described. In alternative embodiments, the machine 3400 operates as a standalone device or may be coupled (e.g., networked) to other machines. In a networked deployment, the machine 3400 may operate in the capacity of a server machine or a client machine in a server-client network environment, or as a peer machine in a peer-to-peer (or distributed) network environment. The machine 3400 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 3410, sequentially or otherwise, that specify actions to be taken by machine 3400. Further, while only a single machine 3400 is illustrated, the term "machine" shall also be taken to include a collection of machines that individually or jointly execute the instructions 3410 to perform any one or more of the methodologies discussed herein.

The machine 3400 may include processors 3404, memory memory/storage 3406, and I/O components 3418, which may be configured to communicate with each other such as via a bus 3402. The memory/storage 3406 may include a memory 3414, such as a main memory, or other memory storage, and a storage unit 3416, both accessible to the processors 3404 such as via the bus 3402. The storage unit 3416 and memory 3414 store the instructions 3410 embodying any one or more of the methodologies or functions described herein. The instructions 3410 may also reside, completely or partially, within the memory 3414, within the storage unit 3416, within at least one of the processors 3404 (e.g., within the processor's cache memory), or any suitable combination thereof, during execution thereof by the machine 3400. Accordingly, the memory 3414, the storage unit 3416, and the memory of processors 3404 are examples of machine-readable media.

The I/O components 3418 may include a wide variety of components to receive input, provide output, produce output, transmit information, exchange information, capture measurements, and so on. The specific I/O components 3418 that are included in a particular machine will depend on the type of machine. For example, portable machines such as mobile phones will likely include a touch input device or other such input mechanisms, while a headless server machine will likely not include such a touch input device. It will be appreciated that the I/O components 3418 may include many other components that are not shown in FIG. 34. The I/O components 3418 are grouped according to functionality merely for simplifying the following discussion and the grouping is in no way limiting. In various example embodiments, the I/O components 3418 may include output components output components 3426 and input components 3428. The output components 3426 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 3428 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 3418 may include biometric components 3430, motion components 3434, environmental environment components 3436, or position components 3438 among a wide array of other components. For example, the biometric components 3430 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 3434 may include acceleration sensor components (e.g., accelerometer), gravitation sensor components, rotation sensor components (e.g., gyroscope), and so forth. The environment components 3436 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 3438 may include location sensor components (e.g., a Global Position system (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 3418 may include communication components 3440 operable to couple the machine 3400 to a network 3432 or devices 3420 via coupling 3422 and coupling 3424 respectively. For example, the communication components 3440 may include a network interface component or other suitable device to interface with the network 3432. In further examples, communication components 3440 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 3420 may be another machine or any of a wide variety of peripheral devices (e.g., a peripheral device coupled via a Universal Serial Bus (USB)).

Moreover, the communication components 3440 may detect identifiers or include components operable to detect identifiers. For example, the communication components processors communication components 3440 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 3440, such as, location via Internet Protocol (IP) geo-location, location via Wi-Fi® signal triangulation, location via detecting a NFC beacon signal that may indicate a particular location, and so forth.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

Details regarding an example Application Program Interface (API) that is supported by the API server 112 will now be described in further detail. Firstly, a list of functions includes authentication functions, campaign functions, password functions, subscription functions, social account functions, user account functions and content (e.g. video) functions. A full list of these is provided immediately below, followed by a full API specification.

List of API Functions
1. Authentication
   a. Create a JWT authentication token
2. Campaigns
   a. Create a campaign
   b. List campaigns for a user
   c. Update a campaign
3. Password Resets
   a. Send password reset email
4. Push notification subscriptions
   a. Subscribe device to notifications
   b. Unsubscribe from notifications
5. Social Account Links
   a. Check permissions
   b. Fetch account link providers
   c. Get connected accounts for campaign
   d. Get connected accounts for user
   e. Link a social account to a campaign
   f. Link a social account to a user
   g. Unlink an account
   h. Update an account
6. Users
   a. Check if user with email exists
   b. Create a user
   c. Get details for current user
   d. Update user details
7. Videos
   a. 1: Start a resumable upload
   b. 2: Upload a video chunk
   c. 3: Assemble chunks and complete upload
   d. Get all videos for campaign
   e. Get all videos for logged in user
   f. Get all videos for specified user
   g. Upload a Video API Specification Authentication Create a JWT authentication token Endpoint

```
POST /api/auth_token
```

Parameters

| Name | Description |
| --- | --- |
| auth[email] | User email |
| auth[password] | User password |

Request

Route

```
POST /api/auth_token
```

Headers

```
Accept: application/json
Content-Type: application/json
Host: example.org
Cookie:
```

Body

```
{
  "auth": {
    "email": "felicita@grantmitchell.org",
    "password": "please123"
  }
}
```

Status

201

Headers

X-Frame-Options: SAMEORIGIN

X-XSS-Protection: 1; mode=block

X-Content-Type-Options: nosniff

Content-Type: application/json; charset=utf-8

ETag: W/"0c372c8410d4f9de8eb1441e8e0d899d"

Cache-Control: max-age=0, private, must-revalidate

X-Request-Id: 449a8373-deeb-4371-82e0-88d2478ba90b

X-Runtime: 0.033614

Content-Length: 142

Body

{
  "jwt": "eyJ0eXAiOiJKV1QiLCJhbGciOiJIUzI1NiJ9.eyJleHAiOjE0ODc3NzA4MjgsImF1ZCI6ZmFsc2UsInN1YiI6MX0.9Ct5urrVa5MF0QDEsd5WqSV4ZqhBdDuu91HKiDQK6AQ"
}

Campaigns

Create a campaign

Endpoint

POST /api/campaigns

Parameters

| Name | Description |
| --- | --- |
| title | campaign title |

| | |
|---|---|
| url | campaign URL subdomain |
| intro_video | Intro bumper video |
| outro_video | Outro bumper video |
| default_thumbnail_image | Fallback thumbnail for videos |
| default_title | Fallback title for videos |
| default_description | Fallback description for videos |
| default_tags | Fallback keyword tags for videos |
| mobile_app_icon | Icon for mobile app |
| mobile_app_header_image | Header image for mobile app |
| mobile_app_background_color | Background color for mobile app |
| stripe_card_id | ID of stripe card for payment |

Request

Route

POST /api/campaigns

Headers

Authorization: Bearer eyJ0eXAiOiJKV1QiLCJhbGciOiJIUzI1NiJ9.eyJleHAiOjE0ODc3NzA4MjksImF1ZCI6ZmFsc2UsInN1Yil6MTR9.VcK4lldEgOKynukjxKwj8E9y0WgqpZQxhwlRf-oEllo Content-Type: application/json Host: example.org Cookie:

Body

```
{
  "title": "Title of campaign",
  "test-url",
  "stripe_card_id": 4
}
```

Response

Response Fields

| Name | Description |
|---|---|
| error | True/False |
| messages | Array of error messages |

Status

```
200
```

Headers

```
X-Frame-Options: SAMEORIGIN
X-XSS-Protection: 1; mode=block
X-Content-Type-Options: nosniff
Content-Type: application/json; charset=utf-8
ETag: W/"094929c4672f37346c7308f9aa04d48a"
Cache-Control: max-age=0, private, must-revalidate
X-Request-Id: 38e77fee-dc0f-44be-8a74-1929ad093c79
X-Runtime: 0.034576
Content-Length: 43
```

Body

```
{
  "error": false,
  "message": "Added campaign!"
}
```

List campaigns for a user

Endpoint

```
GET /api/campaigns
```

Request

Route

```
GET /api/campaigns
```

Headers

```
Authorization: Bearer eyJ0eXAiOiJKV1QiLCJhbGciOiJIUzI1NiJ9.eyJleHAiOjE0ODc3NzA4MjksI
mF1ZCI6ZmFsc2UsInN1Yii6MTV9.TQ4k6VNYrg33TJq2PZWUvPPnnfAymqprWZXgEUHQQp
w
Content-Type: application/json
Host: example.org
Cookie:
```

Response

Status

```
200
```

Headers

```
X-Frame-Options: SAMEORIGIN
X-XSS-Protection: 1; mode=block
X-Content-Type-Options: nosniff
Content-Type: application/json; charset=utf-8
ETag: W/"225a469dffa535b5f6dd3a0dd980fe57"
```

Cache-Control: max-age=0, private, must-revalidate

X-Request-Id: d0f28f56-88be-4326-9abb-2b1162641f3f

X-Runtime: 0.011400

Content-Length: 1243

Body

```
{
 "error": false,
 "campaigns": [
  {
   "id": 5,
   "title": "Aufderhar Group",
   "hills",
   "created_at": "2017-02-21T13:40:29.089Z",
   "updated_at": "2017-02-21T13:40:29.089Z",
   "intro_video": null,
   "outro_video": null,
   "default_thumbnail_image": null,
   "watermark_image": null,
   "default_title": null,
   "default_description": null,
   "default_tags": null,
   "mobile_app_icon": null,
   "mobile_app_header_image": null,
   "mobile_app_background_color": null,
   "deleted_at": null,
   "cover_art": {
    "Link Address:dev-congo.s3.amazonaws/../tmp/podcastio-dev/defaults/cover_art/default.png",
     "thumbnail": {
      "Link Address:dev-congo.s3.amazonaws/../tmp/podcastio-dev/defaults/cover_art/thumbnail_default.png"
     },
     "medium_thumb": {
```

```
    "Link Address:dev-congo.s3.amazonaws/../tmp/podcastio-dev/defaults/cover_art/medium_thumb_default.png"
      }
    },
    "author_name": null,
    "subtitle": null,
    "description": null,
    "category": null,
    "language": null,
    "display_email": null,
    "explicit_content": null,
    "website": null,
    "show_rss_email": null,
    "mark_video_feed_title": false,
    "mark_audio_feed_title": false,
    "post_immediately": true,
    "posting_schedule_id": null,
    "setup": true,
    "subscription_id": 5,
    "ten_minute_trial": false,
    "intro_video_processed": true,
    "outro_video_processed": true,
    "active": true,
    "say_hi_campaign": false,
    "available_upload_seconds": null
  }
 ]
}
```

Update a campaign

Endpoint

```
PATCH /api/campaigns/:id
```

Parameters

| Name | Description |
| --- | --- |
| id | Unique ID for campaign |
| title | campaign title |
| url | campaign URL subdomain |
| intro_video | Intro bumper video |
| outro_video | Outro bumper video |
| default_thumbnail_image | Fallback thumbnail for videos |
| default_title | Fallback title for videos |
| default_description | Fallback description for videos |
| default_tags | Fallback keyword tags for videos |
| mobile_app_icon | Icon for mobile app |
| mobile_app_header_image | Header image for mobile app |
| mobile_app_background_color | Background color for mobile app |
| stripe_card_id | ID of stripe card for payment |

Request

Route

```
PATCH /api/campaigns/6
```

Headers

```
Authorization: Bearer eyJ0eXAiOiJKV1QiLCJhbGciOiJIUzI1NiJ9.eyJleHAiOjE0ODc3NzA4MjksI
mF1ZCI6ZmFsc2UsInN1Yii6MTd9.9z8nhYdrONCRCDJ5XYCxkaNC9Rj-Al8kyeX2pob3v6Y
Content-Type: application/json
Host: example.org
Cookie:
```

Body

```
{
  "title": "New title"
}
```

Response

Status

```
200
```

Headers

```
X-Frame-Options: SAMEORIGIN
X-XSS-Protection: 1; mode=block
X-Content-Type-Options: nosniff
Content-Type: application/json; charset=utf-8
ETag: W/"ee87b1062eeafd935a221e3af61d6f8f"
Cache-Control: max-age=0, private, must-revalidate
X-Request-Id: 75d03ea7-b544-4dd3-b247-8423ee204e36
X-Runtime: 0.017785
Content-Length: 1235
```

Body

```
{
  "error": false,
```

```
"campaign": {
  "id": 6,
  "ten_minute_trial": false,
  "subscription_id": 6,
  "title": "New title",
  "wehner",
  "intro_video": null,
  "outro_video": null,
  "default_thumbnail_image": null,
  "watermark_image": null,
  "mobile_app_icon": null,
  "mobile_app_header_image": null,
  "cover_art": {
    "Link Address:dev-congo.s3.amazonaws/../tmp/podcastio-dev/defaults/cover_art/default.png",
    "thumbnail": {
      "Link Address:dev-congo.s3.amazonaws/../tmp/podcastio-dev/defaults/cover_art/thumbnail_default.png"
    },
    "medium_thumb": {
      "Link Address:dev-congo.s3.amazonaws/../tmp/podcastio-dev/defaults/cover_art/medium_thumb_default.png"
    }
  },
  "created_at": "2017-02-21T13:40:29.130Z",
  "updated_at": "2017-02-21T13:40:29.151Z",
  "default_title": null,
  "default_description": null,
  "default_tags": null,
  "mobile_app_background_color": null,
  "deleted_at": null,
  "author_name": null,
  "subtitle": null,
  "description": null,
```

```
    "category": null,
    "language": null,
    "display_email": null,
    "explicit_content": null,
    "website": null,
    "show_rss_email": null,
    "mark_video_feed_title": false,
    "mark_audio_feed_title": false,
    "post_immediately": true,
    "posting_schedule_id": null,
    "setup": true,
    "intro_video_processed": true,
    "outro_video_processed": true,
    "active": true,
    "say_hi_campaign": false,
    "available_upload_seconds": null
  }
}
```

Password Resets

Send password reset email

Endpoint

```
POST /api/users/password
```

Parameters

| Name | Description |
| --- | --- |
| email | Email address for user |

Request

Route

POST /api/users/password

Headers

Accept: application/json
Content-Type: application/json
Host: example.org
Cookie:

Body

```
{
  "email": "shaina_ohara@kemmerrolfson.net"
}
```

Response

Status

200

Headers

X-Frame-Options: SAMEORIGIN
X-XSS-Protection: 1; mode=block
X-Content-Type-Options: nosniff
Content-Type: application/json
Cache-Control: no-cache
X-Request-Id: 3211d3d6-0647-41b0-b083-b4ee832139e0
X-Runtime: 0.356213
Content-Length: 0

Push notification subscriptions

Subscribe device to notifications

Endpoint

```
POST /api/push_notifications_subscription
```

Parameters

| Name | Description |
|---|---|
| device_token | IOS device token |
| app_name | Name of app; One of world-race or congo |

Request

Route

```
POST /api/push_notifications_subscription
```

Headers

```
Authorization: Bearer eyJ0eXAiOiJKV1QiLCJhbGciOiJIUzI1NiJ9.eyJleHAiOjE0ODc3NzA4MjksI
mF1ZCI6ZmFsc2UsInN1Yi I6MjR9.28IRqkGqIpSJGoqnJZ9USaV-1dZP8GoxJKy4czDiEQA
Content-Type: application/json
Host: example.org
Cookie:
```

Body

```
{
  "device_token": "tok",
  "app_name": "congo"
}
```

Response

Status

```
200
```

Headers

```
X-Frame-Options: SAMEORIGIN
X-XSS-Protection: 1; mode=block
X-Content-Type-Options: nosniff
Content-Type: text/html
Cache-Control: no-cache
X-Request-Id: 98ba1e65-4298-40a3-a0bd-ef6ba6eb506f
X-Runtime: 0.009883
Content-Length: 0
```

Unsubscribe from notifications

Endpoint

```
DELETE /api/push_notifications_subscription
```

Request

Route

```
DELETE /api/push_notifications_subscription
```

Headers

```
Authorization: Bearer eyJ0eXAiOiJKV1QiLCJhbGciOiJIUzI1NiJ9.eyJleHAiOjE0ODc3NzA4MjksI
mF1ZCI6ZmFsc2UsInN1Yil6MjV9.5mBQubNS-EPJNGaLfLjGDyc_IHFXX2NI4xybItHqiU8
Content-Type: application/json
Host: example.org
Cookie:
```

Response

Status

```
200
```

Headers

```
X-Frame-Options: SAMEORIGIN
X-XSS-Protection: 1; mode=block
```

X-Content-Type-Options: nosniff

Content-Type: text/html

Cache-Control: no-cache

X-Request-Id: a20b1b1d-3a39-4bec-9a8f-1639e3a2ce3b

X-Runtime: 0.038769

Content-Length: 0

Social Account Links

Check permissions

Endpoint

GET /api/account_links/permissions

Parameters

| Name | Description |
| --- | --- |
| campaign_id | Unique identifier for the campaign |

Request

Route

GET /api/account_links/permissions?campaign_id=1

Headers

Accept: application/json

Content-Type: application/json

Authorization: Bearer eyJ0eXAiOiJKV1QiLCJhbGciOiJIUzI1NiJ9.eyJleHAiOjE0ODc3NzA4MjgsImF1ZCI6ZmFsc2UsInN1Yii6NX0.FAPzWxqLKqxPXCRvUWJTMnZFMvXHSaWImFQ_6-c2ELk Host: example.org Cookie:

Query Parameters campaign_id=1

Response

Status

```
200
```

Headers

```
X-Frame-Options: SAMEORIGIN
X-XSS-Protection: 1; mode=block
X-Content-Type-Options: nosniff
Content-Type: application/json; charset=utf-8
ETag: W/"ec64426c3fd0d4607ab2b0328398d046"
Cache-Control: max-age=0, private, must-revalidate
X-Request-Id: d6001c15-8225-4554-9035-2f0ac025f4f0
X-Runtime: 0.010202
Content-Length: 45
```

Body

```
{
  "index": true,
  "create": false,
  "destroy": false
}
```

Fetch account link providers

Endpoint

```
GET /api/account_links/providers
```

Request

Route

```
GET /api/account_links/providers
```

Headers

```
Accept: application/json
Content-Type: application/json
Authorization: Bearer eyJ0eXAiOiJKV1QiLCJhbGciOiJIUzI1NiJ9.eyJleHAiOjE0ODc3NzA4MjgsI
mF1ZCI6ZmFsc2UsInN1Yil6MTF9.AZ-rtn0QIxIhrhteJ7Kq0ajGTLF7pALiuhx7wfvnrfs
Host: example.org
Cookie:
```

Response

Status

```
200
```

Headers

```
X-Frame-Options: SAMEORIGIN
X-XSS-Protection: 1; mode=block
X-Content-Type-Options: nosniff
Content-Type: application/json; charset=utf-8
ETag: W/"26f9a6e4e65234d11ebec9baee1bfc80"
Cache-Control: max-age=0, private, must-revalidate
X-Request-Id: 5232c17f-c933-4bad-9377-94fc73cb0c1b
X-Runtime: 0.003121
Content-Length: 721
```

Body

```
[
  {
    "client_id": "ID",
    "scope": "userinfo.email, youtube",
    "class": "YoutubeAccount",
    "prompt": "consent",
    "auth_url": "Link Address:accounts.google/o/oauth2/auth",
    "provider": "google_oauth2"
```

```
  },
  {
   "client_id": "KEY",
   "class": "TwitterAccount",
   "use_authorize": true,
   "provider": "twitter"
  },
  {
   "client_id": "KEY",
   "class": "VimeoAccount",
   "scope": "upload edit delete",
   "auth_url": "Link Address:api.vimeo/oauth/authorize",
   "provider": "vimeo"
  },
  {
   "client_id": "KEY",
   "class": "SoundCloudAccount",
   "auth_url": "Link Address:api.soundcloud/connect",
   "provider": "soundcloud"
  },
  {
   "client_id": "KEY",
   "class": "FacebookAccount",
   "scope": "publish_actions,manage_pages,publish_pages,user_managed_groups",
   "auth_url": "Link Address:www.facebook/dialog/oauth",
   "provider": "facebook"
  }
]
```

Get connected accounts for campaign

Endpoint

GET /api/campaigns/:campaign_id/account_links

Request

Route

GET /api/campaigns/3/account_links

Headers

Accept: application/json

Content-Type: application/json

Authorization: Bearer eyJ0eXAiOiJKV1QiLCJhbGciOiJIUzI1NiJ9.eyJleHAiOjE0ODc3NzA4MjksImF1ZCI6ZmFsc2UsInN1Yi I6MTJ9.STg4MOXZ5zcP0J4nwOmbqTimhPRc7AG0DPPIIf1wUbQ Host: example.org Cookie:

Response

Status

200

Headers

X-Frame-Options: SAMEORIGIN

X-XSS-Protection: 1; mode=block

X-Content-Type-Options: nosniff

Content-Type: application/json; charset=utf-8

ETag: W/"bd87ab3ec4293ab731dd52ca18f5c35a"

Cache-Control: max-age=0, private, must-revalidate

X-Request-Id: f68f911e-0809-4ea1-8195-8fcb06a658cd

X-Runtime: 0.011645

Content-Length: 229

Body

[
 {

```
    "id": 7,
    "type": "YoutubeAccount",
    "created_at": "2017-02-21T13:40:29.005Z",
    "updated_at": "2017-02-21T13:40:29.005Z",
    "account_id": "6581119865",
    "name": null,
    "enabled": true,
    "profile_image_url": null,
    "owner_type": "Campaign",
    "owner_id": 3
  }
]
```

Get connected accounts for user

Endpoint

GET /api/account_links

Request

Route

GET /api/account_links

Headers

Accept: application/json

Content-Type: application/json

Authorization: Bearer eyJ0eXAiOiJKV1QiLCJhbGciOiJIUzI1NiJ9.eyJleHAiOjE0ODc3NzA4MjgsImF1ZCI6ZmFsc2UsInN1Yi I6M30.YPs9NEMbSLWrx2SpMVc_BIbQ2DwrtxwI7Q2NCiSdIUk Host: example.org Cookie:

Response

Status

200

Headers

X-Frame-Options: SAMEORIGIN
X-XSS-Protection: 1; mode=block
X-Content-Type-Options: nosniff
Content-Type: application/json; charset=utf-8
ETag: W/"4d7f3082046cbaa4abde650ce4f51ad5"
Cache-Control: max-age=0, private, must-revalidate
X-Request-Id: 35b5c246-4154-453f-842b-696c44ae9257
X-Runtime: 0.053684
Content-Length: 225

Body

```
[
 {
  "id": 2,
  "type": "YoutubeAccount",
  "created_at": "2017-02-21T13:40:28.619Z",
  "updated_at": "2017-02-21T13:40:28.619Z",
  "account_id": "7649747097",
  "name": null,
  "enabled": true,
  "profile_image_url": null,
  "owner_type": "User",
  "owner_id": 3
 }
]
```

Link a social account to a campaign

Endpoint

POST /api/account_links

Parameters

| Name | Description |
| --- | --- |
| provider | Provider name |
| code | Authentication code from provider. for code authentication |
| redirect_uri | The callback url that was used in the auth flow. Required for code authentication |
| oauth_access_token | A ready-to-use oauth token for accessing the account. |
| oauth_access_token_secret | For Twitter: The secret associated with the oauth token. |
| campaign_id | Unique ID of campaign to add this link to. Account will be linked to user instead if this is not specified. |
| account_id | Unique identifier from the provider for this account |

Request

Route

POST /api/account_links

Headers

Accept: application/json

Content-Type: application/json

Authorization: Bearer eyJ0eXAiOiJKV1QiLCJhbGciOiJIUzI1NiJ9.eyJleHAiOjE0ODc3NzA4MjgsI mF1ZCI6ZmFsc2UsInN1Yi16OX0.J8cEYH0aE2l9w4VWeUp4gCSD8YLRQXuYfRta18GzBo0

Host: example.org

Cookie:

Body

```
{
 "provider": "facebook",
 "code": "123",
 "redirect_uri": "test_url",
 "campaign_id": 2
}
```

Response

Response Fields

| Name | Description |
| --- | --- |
| error | This is set to true when there is an error |
| messages | On error, this field returns a list of validation errors |

Status

200

Headers

```
X-Frame-Options: SAMEORIGIN
X-XSS-Protection: 1; mode=block
X-Content-Type-Options: nosniff
Content-Type: application/json; charset=utf-8
ETag: W/"5c773e0efb1e772a002c2338e263a75b"
Cache-Control: max-age=0, private, must-revalidate
X-Request-Id: 4a517f6a-5570-468a-9c15-534becdf032b
X-Runtime: 0.073164
Content-Length: 251
```

Body

```
{
  "id": 5,
  "type": "FacebookAccount",
  "created_at": "2017-02-21T13:40:28.928Z",
  "updated_at": "2017-02-21T13:40:28.928Z",
  "account_id": "1438666419797322",
  "name": "Test User",
  "enabled": false,
  "profile_image_url": "profile-pic",
  "owner_type": "Campaign",
  "owner_id": 2
}
```

Link a social account to a user

Endpoint

POST /api/account_links

Parameters

| Name | Description |
| --- | --- |
| provider | Provider name |
| code | Authentication code from provider. Required for code authentication |
| redirect_uri | The callback url that was used in the auth flow. Required for code authentication |
| oauth_access_token | A ready-to-use oauth token for accessing the account. |
| oauth_access_token_secret | For Twitter: The secret associated with the oauth token. |

| campaign_id | Unique ID of campaign to add this link to. Account will be linked to user instead if this is not specified. |
|---|---|
| account_id | Unique identifier from the provider for this account |

Request

Route

```
POST /api/account_links
```

Headers

```
Accept: application/json
Content-Type: application/json
Authorization: Bearer eyJ0eXAiOiJKV1QiLCJhbGciOiJIUzI1NiJ9.eyJleHAiOjE0ODc3NzA4MjgsI
mF1ZCI6ZmFsc2UsInN1Yi I6OH0.ZA9YBg_UnzzO_imfiXNi_22E61lwWSMsZYIbjBtxoKc
Host: example.org
Cookie:
```

Body

```
{
 "provider": "twitter",
 "oauth_access_token": "token",
 "oauth_access_token_secret": "secret"
}
```

Response

Response Fields

| Name | Description |
|---|---|
| error | This is set to true when there is an error |

| | |
|---|---|
| messages | On error, this field returns a list of validation errors |

Status

```
200
```

Headers

```
X-Frame-Options: SAMEORIGIN
X-XSS-Protection: 1; mode=block
X-Content-Type-Options: nosniff
Content-Type: application/json; charset=utf-8
ETag: W/"3930ff27a30a37ed42b3ff9c626bbea3"
Cache-Control: max-age=0, private, must-revalidate
X-Request-Id: 93f46530-d7f0-4e80-b12c-aa9dc2771a48
X-Runtime: 0.012336
Content-Length: 233
```

Body

```
{
  "id": 4,
  "type": "TwitterAccount",
  "created_at": "2017-02-21T13:40:28.849Z",
  "updated_at": "2017-02-21T13:40:28.849Z",
  "account_id": "1",
  "name": "fetched_name",
  "enabled": true,
  "profile_image_url": "fetched_img",
  "owner_type": "User",
  "owner_id": 8
}
```

Unlink an account

Endpoint

DELETE /api/account_links/:account_id

Request

Route

DELETE /api/account_links/3

Headers

Accept: application/json

Content-Type: application/json

Authorization: Bearer eyJ0eXAiOiJKV1QiLCJhbGciOiJIUzI1NiJ9.eyJleHAiOjE0ODc3NzA4MjgsImF1ZCI6ZmFsc2UsInN1Yil6Nn0.cl847oCjjLckVVeXymizIdwMBN3jghbDR_vS5RNGT8g Host: example.org Cookie:

Response

Status

200

Headers

X-Frame-Options: SAMEORIGIN

X-XSS-Protection: 1; mode=block

X-Content-Type-Options: nosniff

Content-Type: application/json; charset=utf-8

ETag: W/"ebdb75071b914b79cf830c25f08251a9"

Cache-Control: max-age=0, private, must-revalidate

X-Request-Id: 873c2fcf-f0ca-4092-8ce7-3175ca74ce83

X-Runtime: 0.006953

Content-Length: 223

Body

```
{
  "id": 3,
```

```
"type": "YoutubeAccount",
"created_at": "2017-02-21T13:40:28.793Z",
"updated_at": "2017-02-21T13:40:28.793Z",
"account_id": "6054872090",
"name": null,
"enabled": true,
"profile_image_url": null,
"owner_type": "User",
"owner_id": 6
}
```

Update an account

Endpoint

```
PUT /api/account_links/:account_id
```

Parameters

| Name | Description |
| --- | --- |
| enabled | Enabled for publishing |

Request

Route

```
PUT /api/account_links/1
```

Headers

```
Accept: application/json
Content-Type: application/json
Authorization: Bearer eyJ0eXAiOiJKV1QiLCJhbGciOiJIUzI1NiJ9.eyJleHAiOjE0ODc3NzA4MjgsI
mFlZCI6ZmFsc2UsInN1Yil6Mn0._hbkbdj3E3_rmDP10lnfZV_WxEnFP8SKA8SInAleT9I
Host: example.org
Cookie:
```

Body

```
{
 "enabled": true
}
```

Response

Status

```
200
```

Headers

```
X-Frame-Options: SAMEORIGIN
X-XSS-Protection: 1; mode=block
X-Content-Type-Options: nosniff
Content-Type: application/json; charset=utf-8
ETag: W/"3fca2ab9a4135bf568934334d9814bd0"
Cache-Control: max-age=0, private, must-revalidate
X-Request-Id: 05f8783d-c3f7-428e-ade3-df0bf179f491
X-Runtime: 0.025669
Content-Length: 223
```

Body

```
{
 "id": 1,
 "enabled": true,
 "owner_id": 2,
 "owner_type": "User",
 "type": "YoutubeAccount",
 "created_at": "2017-02-21T13:40:28.580Z",
 "updated_at": "2017-02-21T13:40:28.605Z",
 "account_id": "7365802448",
 "name": null,
```

```
  "profile_image_url": null
}
```

Users

Check if user with email exists

Endpoint

```
GET /api/users/existing_user
```

Parameters

| Name | Description |
|------|-------------|
| email | Email of user you wish to check |

Request

Route

```
GET /api/users/existing_user?email=user%40example
```

Headers

```
Accept: application/json
Content-Type: application/json
Host: example.org
Cookie:
```

Query Parameters

```
email=user@example
```

Response

Status

```
200
```

Headers

```
X-Frame-Options: SAMEORIGIN
X-XSS-Protection: 1; mode=block
X-Content-Type-Options: nosniff
Content-Type: application/json; charset=utf-8
ETag: W/"b89187802fd51ad35f85f38b54fb4d0a"
Cache-Control: max-age=0, private, must-revalidate
X-Request-Id: 021c7f5f-02fb-46e1-84e8-70b49157db9b
X-Runtime: 0.004440
Content-Length: 35
```

Body

```
{
 "error": false,
 "user_exists": false
}
```

Create a user

Endpoint

```
POST /api/users
```

Parameters

| Name | Description |
| --- | --- |
| email | Email address for user |
| name | DEPRECATED: Name of user |
| first_name | First name of user |
| last_name | Last name of user |

| | |
|---|---|
| password | Password for user |
| campaign_id | Campaign unique ID. User will be associated with this campaign if specified. |
| profile_picture | Image file for user profile picture |

Request

Route

```
POST /api/users
```

Headers

```
Accept: application/json
Content-Type: application/json
Host: example.org
Cookie:
```

Body

```
{
  "email": "user@example",
  "first_name": "John",
  "last_name": "Doe",
  "password": "supersecret",
  "campaign_id": 7
}
```

Response

Status

```
200
```

Headers

```
X-Frame-Options: SAMEORIGIN
X-XSS-Protection: 1; mode=block
X-Content-Type-Options: nosniff
Content-Type: application/json; charset=utf-8
ETag: W/"d44c1f2a6531d774fda6e6eba865f1ba"
Cache-Control: max-age=0, private, must-revalidate
X-Request-Id: 20665923-cff0-4ec0-a7a5-529cce189f5c
X-Runtime: 0.056260
Content-Length: 15
```

Body

```
{
  "error": false
}
```

Get details for current user

Endpoint

```
GET /api/users/:user_id
```

Parameters

| Name    | Description                   |
| ------- | ----------------------------- |
| user_id | User ID or "me" for current user |

Request

Route

```
GET /api/users/me
```

Headers

```
Accept: application/json
Content-Type: application/json
```

Authorization: Bearer eyJ0eXAiOiJKV1QiLCJhbGciOiJIUzI1NiJ9.eyJleHAiOjE0ODc3NzA4MjksI
mF1ZCI6ZmFsc2UsInN1YiI6MjJ9.K3q_v8V-YLBfbwk56xKigPlXdRoexPKzhqpesXsIe4k Host: example.org Cookie:

Response

Status

200

Headers

X-Frame-Options: SAMEORIGIN

X-XSS-Protection: 1; mode=block

X-Content-Type-Options: nosniff

Content-Type: application/json; charset=utf-8

ETag: W/"e19ef6cd33b4d83d137c1f2e69f738d4"

Cache-Control: max-age=0, private, must-revalidate

X-Request-Id: cb1c749b-f79c-4ad5-9c4c-f8ea1f8427b4

X-Runtime: 0.004317

Content-Length: 319

Body

```
{
 "id": 22,
 "email": "agustin@connlind.org",
 "profile_picture": {
  "Link Address:www.gravatar/avatar/808653696cecd23f0b3e75ae0f77a982?s=180&d=mm",
  "thumbnail": {
   "Link Address:www.gravatar/avatar/808653696cecd23f0b3e75ae0f77a982?s=50&d=mm"
  }
 },
 "first_name": "Claude",
 "last_name": "Hilpert",
```

```
  "name": "Claude Hilpert"
}
```

Update user details

Endpoint

```
PUT /api/users/:user_id
```

Parameters

| Name | Description |
|---|---|
| user_id | User ID or "me" for current user |
| name | DEPRECATED: Updated name |
| first_name | Updated first name |
| last_name | Updated last name |
| password | New password |
| profile_picture | Image file for user profile picture |

Request

Route

```
PUT /api/users/me
```

Headers

```
Accept: application/json

Content-Type: application/json

Authorization: Bearer eyJ0eXAiOiJKV1QiLCJhbGciOiJIUzI1NiJ9.eyJleHAiOjE0ODc3NzA4MjksImF1ZCI6ZmFsc2UsInN1Yii6MjN9.S9Cgn_KDEn-daVI6mZ6-aGny2-LjHcEB8UsRF9QlgQI Host: example.org
```

Cookie:

Body

```
{
  "first_name": "John",
  "last_name": "Doe"
}
```

Response

Status

200

Headers

X-Frame-Options: SAMEORIGIN

X-XSS-Protection: 1; mode=block

X-Content-Type-Options: nosniff

Content-Type: application/json; charset=utf-8

ETag: W/"499f51b3f06ae0a75f8c8d9e741872e0"

Cache-Control: max-age=0, private, must-revalidate

X-Request-Id: 445c9844-c89b-4054-ba4b-4eacdf9b01e8

X-Runtime: 0.005835

Content-Length: 317

Body

```
{
  "id": 23,
  "first_name": "John",
  "last_name": "Doe",
  "email": "christa.cummerata@daviswiza.co",
  "profile_picture": {
    "Link Address:www.gravatar/avatar/5678519c5c11f87efc96c6fd56c9bd46?s=180&d=mm",
    "thumbnail": {
```

```
    "Link Address:www.gravatar/avatar/5678519c5c11f87efc96c6fd56c9bd46?s=50&d=mm"
   }
  },
  "name": "John Doe"
}
```

Videos

1: Start a resumable upload

Endpoint

```
POST /api/videos/upload/new
```

Parameters

| Name | Description |
|---|---|
| filename | Name of file being uploaded |

Request

Route

```
POST /api/videos/upload/new
```

Headers

```
Authorization: Bearer eyJ0eXAiOiJKV1QiLCJhbGciOiJIUzI1NiJ9.eyJleHAiOjE0ODc3NzA4MzAs
ImF1ZCI6ZmFsc2UsInN1Yii6MzJ9.Rf0dw-IZpjbtBKGGhFIwXIpeAVnV8mvWxAivfN3FknY
Content-Type: application/json
Host: example.org
Cookie:
```

Body

```
{
  "filename": "video.mp4"
}
```

Response

Response Fields

| Name | Description |
|---|---|
| upload_id | Unique id for this upload |

Status

200

Headers

X-Frame-Options: SAMEORIGIN
X-XSS-Protection: 1; mode=block
X-Content-Type-Options: nosniff
Content-Type: application/json; charset=utf-8
ETag: W/"f11c5982e92cb1d583e80ea5cc12c61a"
Cache-Control: max-age=0, private, must-revalidate
X-Request-Id: 7a7310cb-8297-4475-b5c6-1d2bb23b486d
X-Runtime: 0.005660
Content-Length: 50

Body

```
{
 "error": false,
 "upload_id": "1234:nqm6jgvideo.mp4"
}
```

2: Upload a video chunk

Endpoint

PUT /api/videos/upload/continue

Parameters

| Name | Description |
| --- | --- |
| upload_id | Upload id returned from /api/videos/upload/new |
| chunk | Binary data chunk. Must be at least 5MB unless it is last chunk |
| chunk_index | A one based index of where this chunk appears in the file |

Request

Route

PUT /api/videos/upload/continue

Headers

Authorization: Bearer eyJ0eXAiOiJKV1QiLCJhbGciOiJIUzI1NiJ9.eyJleHAiOjE0ODc3NzA4MzAsImF1ZCI6ZmFsc2UsInN1YiI6NDR9._dW-UdbN9V4vd3thNPsFvnW-XYKIS9BWiiK4wRhgmec Host: example.org Content-Type: multipart/form-data; boundary=----------XnJLe9ZIbbGUYtzPQJ16u1

Cookie:

Body

------------XnJLe9ZIbbGUYtzPQJ16u1

Content-Disposition: form-data; name="upload_id"

1234:video.mp4

------------XnJLe9ZIbbGUYtzPQJ16u1

Content-Disposition: form-data; name="chunk"; filename="video.mp4"

Content-Type: video/mp4

Content-Length: 2107842

[uploaded data]

------------XnJLe9ZIbbGUYtzPQJ16u1

```
Content-Disposition: form-data; name="chunk_index"

1
----------------XnJLe9ZIbbGUYtzPQJ16u1--
```

Response

Response Fields

| Name | Description |
|---|---|
| chunk_id | A unique identifier for this chunk |

Status

```
200
```

Headers

```
X-Frame-Options: SAMEORIGIN
X-XSS-Protection: 1; mode=block
X-Content-Type-Options: nosniff
Content-Type: application/json; charset=utf-8
ETag: W/"1dc8308d963a9d0b8b686a3a608f8ef8"
Cache-Control: max-age=0, private, must-revalidate
X-Request-Id: d8bccba8-5b63-4063-a630-dd0a3499bc6b
X-Runtime: 0.018058
Content-Length: 37
```

Body

```
{
  "error": false,
  "chunk_id": "chunk_id"
}
```

3: Assemble chunks and complete upload

Endpoint

POST /api/videos/upload/complete

Parameters

| Name | Description |
| --- | --- |
| upload_id | Upload id returned from /api/videos/upload/new |
| chunks | Array of chunk ids. They will be assembled in the order given |
| campaign_id | Campaign ID |
| title | Video Title |
| description | Video Description |
| tags | Comma-separated list of keywords |
| thumbnail | Video thumbnail |
| latitude | Latitude coordinate where video was taken |
| longitude | Longitude coordinate where video was taken |
| account_ids | DEPRECATED - Use exclude_account_ids instead: IDs of personal social accounts to publish to |
| exclude_account_ids | IDs of personal and campaign accounts to exclude, all are included by default |

Request

105

Route

POST /api/videos/upload/complete

Headers

Authorization: Bearer eyJ0eXAiOiJKV1QiLCJhbGciOiJIUzI1NiJ9.eyJleHAiOjE0ODc3NzA4MzAsImF1ZCI6ZmFsc2UsInN1YiI6NDV9.GcVs3qaxOfBdD5zFL--_tW1feSH2cvIoIA68B4C1S4U Content-Type: application/json Host: example.org Cookie:

Body

```
{
  "upload_id": "1234;video.mp4",
  "chunks": [
    "chunk1id",
    "chunk2id"
  ],
  "campaign_id": 17,
  "title": "Title of Video",
  "description": "This describes the video perfectly."
}
```

106

Response

Status

200

Headers

X-Frame-Options: SAMEORIGIN

X-XSS-Protection: 1; mode=block

X-Content-Type-Options: nosniff

Content-Type: application/json; charset=utf-8

ETag: W/"d44c1f2a6531d774fda6e6eba865f1ba"

Cache-Control: max-age=0, private, must-revalidate

X-Request-Id: c59dbb5d-cd3f-49ed-b44b-7cc1a259ba1e

X-Runtime: 0.039062

Content-Length: 15

Body

```
{
  "error": false
}
```

Get all videos for campaign

Endpoint

GET /api/campaigns/:campaign_id/videos

Parameters

| Name | Description |
|---|---|
| page | Page offset for pagination |
| per_page | Number of records to display per page |
| campaign_id | Campaign ID |
| user_id | Filter by uploader id |

Request

Route

GET /api/campaigns/15/videos?user_id=41

Headers

Authorization: Bearer eyJ0eXAiOiJKV1QiLCJhbGciOiJIUzI1NiJ9.eyJleHAiOjE0ODc3NzA4MzAs ImF1ZCI6ZmFsc2UsInN1Yi I6Mzl9.Ko8RAEc72nUaVn2m3qBkl5-Dq-eZ3oAf36icnyIWbPo Host: example.org Cookie:

Query Parameters user_id=41

Response

Status

200

Headers

X-Frame-Options: SAMEORIGIN

X-XSS-Protection: 1; mode=block

X-Content-Type-Options: nosniff

Per-Page: 25

Total: 1

Content-Type: application/json; charset=utf-8

ETag: W/"265f643dc353dde9fea63e940dd092d3"

Cache-Control: max-age=0, private, must-revalidate

X-Request-Id: aca51612-6158-4234-9431-0fec720360ec

X-Runtime: 0.019041

Content-Length: 789

Body

```
[
 {
  "id": 6,
  "video": {
   "/home/jon/dev/congo-backend/tmp/podcastio-dev/uploads/video/video/6/video.mp4"
  },
  "audio": null,
  "title": "Test video",
```

```
"description": "Test video from FactoryGirl.",
"thumbnail": null,
"campaign_id": 15,
"created_at": "2017-02-21T13:40:30.609Z",
"updated_at": "2017-02-21T13:40:30.609Z",
"latitude": null,
"longitude": null,
"creator_id": 41,
"video_length_seconds": 13,
"tags_list": [
  "my",
  "awesome",
  "keywords"
],
"status": "pending",
"published_videos": [
  {
    "id": 3,
    "created_at": "2017-02-21T13:40:30.619Z",
    "link": "Link Address:www.youtube/watch?v=UID",
    "status": "pending",
    "account_type": "Youtube",
    "account_owner_type": "Campaign",
    "account_link": {
      "id": 14,
      "type": "YoutubeAccount",
      "account_id": "1739444582",
      "name": null,
      "enabled": true,
      "profile_image_url": null,
      "owner_type": "Campaign",
      "owner_id": 15
```

```
      }
    }
   ]
  }
]
```

Get all videos for logged in user

Endpoint

```
GET /api/videos
```

Parameters

| Name | Description |
|------|-------------|
| page | Page offset for pagination |
| per_page | Number of records to display per page |

Request

Route

```
GET /api/videos
```

Headers

```
Authorization: Bearer eyJ0eXAiOiJKV1QiLCJhbGciOiJIUzI1NiJ9.eyJleHAiOjE0ODc3NzA4MzAs
ImF1ZCI6ZmFsc2UsInN1YiI6NDJ9.1NGeYa_B0zmKXOodlERhIuZ4WcJUpOwCNvU90f7NqEI
Host: example.org
Cookie:
```

Response

Status

```
200
```

Headers

X-Frame-Options: SAMEORIGIN

X-XSS-Protection: 1; mode=block

X-Content-Type-Options: nosniff

Per-Page: 25

Total: 1

Content-Type: application/json; charset=utf-8

ETag: W/"f98cca02a62d6e37a048853ad55d34a8"

Cache-Control: max-age=0, private, must-revalidate

X-Request-Id: 89af0193-cc2e-4193-aff2-d4c5d80ec9c9

X-Runtime: 0.015205

Content-Length: 455

Body

```
[
 {
  "id": 7,
  "video": {
   "/home/jon/dev/congo-backend/tmp/podcastio-dev/uploads/video/video/7/video.mp4"
  },
  "audio": null,
  "title": "Test video",
  "description": "Test video from FactoryGirl.",
  "thumbnail": null,
  "campaign_id": 16,
  "created_at": "2017-02-21T13:40:30.705Z",
  "updated_at": "2017-02-21T13:40:30.705Z",
  "latitude": null,
  "longitude": null,
  "creator_id": 42,
  "video_length_seconds": 13,
  "tags_list": [
```

```
    "my",
    "awesome",
    "keywords"
  ],
  "status": "pending",
  "published_videos": [

]
 }
]
```

Get all videos for specified user

Endpoint

```
GET /api/users/:user_id/videos
```

Parameters

| Name | Description |
|---|---|
| page | Page offset for pagination |
| per_page | Number of records to display per page |
| user_id | Unique user ID |

Request

Route

```
GET /api/users/35/videos
```

Headers

```
Authorization: Bearer eyJ0eXAiOiJKV1QiLCJhbGciOiJIUzI1NiJ9.eyJleHAiOjE0ODc3NzA4MzAs ImF1ZCI6ZmFsc2UsInN1YiI6MzN9.XmHk8Qm_6AEAHMZIUA5Kv5NU7rLcPzcnvLp0H_RzwC Q
```

Host: example.org

Cookie:

Response

Status

200

Headers

X-Frame-Options: SAMEORIGIN

X-XSS-Protection: 1; mode=block

X-Content-Type-Options: nosniff

Per-Page: 25

Total: 1

Content-Type: application/json; charset=utf-8

ETag: W/"a96878f5b59bdd3c303742a4534a4ed8"

Cache-Control: max-age=0, private, must-revalidate

X-Request-Id: 3905763e-abd4-4d09-8988-bf9c4421f2d4

X-Runtime: 0.020855

Content-Length: 455

Body

```
[
 {
  "id": 4,
  "video": {
   "/home/jon/dev/congo-backend/tmp/podcastio-dev/uploads/video/video/4/video.mp4"
  },
  "audio": null,
  "title": "Test video",
  "description": "Test video from FactoryGirl.",
  "thumbnail": null,
```

```
  "campaign_id": 13,
  "created_at": "2017-02-21T13:40:30.428Z",
  "updated_at": "2017-02-21T13:40:30.428Z",
  "latitude": null,
  "longitude": null,
  "creator_id": 35,
  "video_length_seconds": 13,
  "tags_list": [
    "my",
    "awesome",
    "keywords"
  ],
  "status": "pending",
  "published_videos": [

}
 }
]
```

Upload a Video

This endpoint is for uploading an entire video with one request. Please use the resumable upload API instead if possible.

Endpoint

```
POST /api/videos
```

Parameters

| Name | Description |
| --- | --- |
| video[video] | Video File |
| video[campaign_id] | Campaign ID |

| | |
|---|---|
| video[title] | Video Title |
| video[description] | Video Description |
| video[tags] | Comma-separated list of keywords |
| video[thumbnail] | Video thumbnail |
| video[latitude] | Longitude coordinate where video was taken |
| video[longitude] | Latitude coordinate where video was taken |
| video[account_ids] | DEPRECATED - Use exclude_account_ids instead: IDs of personal social accounts to publish to |
| video[exclude_account_ids] | IDs of personal and campaign accounts to exclude, all are included by default |

Request

Route

```
POST /api/videos
```

Headers

```
Authorization: Bearer eyJ0eXAiOiJKV1QiLCJhbGciOiJIUzI1NiJ9.eyJleHAiOjE0ODc3NzA4MjksImF1ZCI6ZmFsc2UsInN1Yi16MjZ9.L6ykrf6LMmKVXmJboufru42o7OZt0f-c2_BWznZCBxM
Host: example.org
Content-Type: multipart/form-data; boundary=----------XnJLe9ZIbbGUYtzPQJ16u1
Cookie:
```

Body

```
------------XnJLe9ZIbbGUYtzPQJ16u1
Content-Disposition: form-data; name="video[video]"; filename="video.mp4"
Content-Type: video/mp4
```

Content-Length: 2107842

[uploaded data]

------------XnJLe9ZIbbGUYtzPQJ16u1

Content-Disposition: form-data; name="video[campaign_id]"

9

------------XnJLe9ZIbbGUYtzPQJ16u1

Content-Disposition: form-data; name="video[title]"

Title of Video

------------XnJLe9ZIbbGUYtzPQJ16u1

Content-Disposition: form-data; name="video[description]"

This describes the video perfectly.

------------XnJLe9ZIbbGUYtzPQJ16u1

Content-Disposition: form-data; name="video[exclude_account_ids][]"

11

------------XnJLe9ZIbbGUYtzPQJ16u1

Content-Disposition: form-data; name="video[exclude_account_ids][]"

10

------------XnJLe9ZIbbGUYtzPQJ16u1--

Response

Response Fields

| Name | Description |
| --- | --- |
| error | True/False |

| | |
|---|---|
| messages | Array of error messages |

Status

```
200
```

Headers

```
X-Frame-Options: SAMEORIGIN
X-XSS-Protection: 1; mode=block
X-Content-Type-Options: nosniff
Content-Type: application/json; charset=utf-8
ETag: W/"d44c1f2a6531d774fda6e6eba865f1ba"
Cache-Control: max-age=0, private, must-revalidate
X-Request-Id: d6a2fd98-765e-40d6-b878-0ea828be33c7
X-Runtime: 0.157301
Content-Length: 15
```

Body

```
{
 "error": false
}.
```

What is claimed is:

1. A method to process video data, the method comprising:
   using at least one processor, accessing a file including a video payload and metadata, the metadata including a publication identifier identifying a publication entity;
   using the at least one processor, using the publication identifier, identifying a bumper video segment and retrieving the bumper video segment from a storage device;
   using the at least one processor, concatenating the video payload with the bumper video segment to create a concatenated video in which the bumper video segment either precedes or proceeds the video payload;
   using the publication identifier, identifying at least one third-party video service to which to publish the concatenated video; and
   transmitting the concatenated video, together with publication credentials, to the third-party video service.

2. The method of claim 1, including, using the publication identifier, identifying an introduction bumper video segment and an ending bumper video segment, and retrieving the introduction bumper video segment and the ending bumper video segment from the storage device.

3. The method of claim 2, including concatenating the video payload with the introduction bumper video segment so that the introduction bumper video segment precedes the video payload in the concatenated video, and concatenating the video payload with the ending bumper video segment so that the ending bumper video segment proceeds the video payload in the concatenated video.

4. The method of claim 1, wherein the publication identifier is a user identifier, indicating an individual user associated with the video payload.

5. The method of claim 1, wherein the publication identifier is a corporate identifier, indicating a corporate entity associated with a mobile application used to capture the video payload.

6. The method of claim 1, including, using the publication identifier, identifying a moderation control for a publication entity, and to selectively presenting the concatenated video to the publication entity for approval based on the moderation control.

7. The method of claim 6, including receiving an approval for publication of the concatenated video from the publication entity, and transmitting the concatenated video to the third-party video service responsive to receipt of the approval.

8. The method of claim 6, including receiving a rejection of the concatenated video from the publication entity, and selectively not transmitting the concatenated video to the third-party service responsive to receipt of receipt of the rejection.

9. A system, the system comprising:
   at least one processor; and
   at least one memory storing instructions that, when executed by the at least one processor, configure the system to:
   receive an upload file including a video payload and metadata, the metadata including a publication identifier identifying a publication entity;
   using the publication identifier, identifying a bumper video segment and retrieving the bumper video segment from a storage device;
   concatenate the video payload with the bumper video segment to create a concatenated video in which the bumper video segment either precedes or proceeds the video payload;
   using the publication identifier, identifying at least one third-party video service to which to publish the concatenated video; and
   transmit the concatenated video, together with publication credentials, to the third-party video service.

10. The system of claim 9, including, using the publication identifier, identifying an introduction bumper video segment and an ending bumper video segment, and retrieving the introduction bumper video segment and the ending bumper video segment from the storage device.

11. The system of claim 10, including concatenating the video payload with the introduction bumper video segment so that the introduction bumper video segment precedes the video payload in the concatenated video, and concatenating the video payload with the ending bumper video segment so that the ending bumper video segment proceeds the video payload in the concatenated video.

12. The system of claim 9, wherein the publication identifier is a user identifier, indicating an individual user associated with the video payload.

13. The system of claim 9, wherein the publication identifier is a corporate identifier, indicating a corporate entity associated with a mobile application used to capture the video payload.

14. The system of claim 9, including using the publication identifier, identifying a moderation control for a publication entity, and to selectively presenting the concatenated video to the publication entity for approval based on the moderation control.

15. The system of claim 14, including receiving an approval for publication of the concatenated video from the publication entity, and transmitting the concatenated video to the third-party video service responsive to receipt of the approval.

16. The system of claim 14, including receiving a rejection of the concatenated video from the publication entity, and selectively not transmitting the concatenated video to the third-party service responsive to receipt of receipt of the rejection.

17. A method to process video data, the method comprising:
   using at least one processor, accessing a file including a video payload and metadata, the metadata including a publication identifier identifying a publication entity;
   using the at least one processor, using the publication identifier, identifying a bumper video segment and retrieving the bumper video segment from a storage device;
   using the at least one processor, concatenating the video payload with the bumper video segment to create a concatenated video in which the bumper video segment either precedes or proceeds the video payload;
   using the publication identifier, identifying a plurality of third-party video services to which to publish the concatenated video; and
   transmitting the concatenated video, together with publication credentials, to the plurality of third-party video services.

18. The method of claim 17, including, using the publication identifier, identifying an introduction bumper video segment and an ending bumper video segment, and retrieving the introduction bumper video segment and the ending bumper video segment from the storage device.

19. The method of claim 18, including concatenating the video payload with the introduction bumper video segment so that the introduction bumper video segment precedes the video payload in the concatenated video, and concatenating the video payload with it the ending bumper video segment so that the ending bumper video segment proceeds the video payload in the concatenated video.

20. The method of claim 17, wherein the publication identifier is a user identifier, indicating an individual user associated with the video payload.

\* \* \* \* \*